US012800498B2

(12) United States Patent
Deisseroth et al.

(10) Patent No.: US 12,800,498 B2
(45) Date of Patent: Nov. 17, 2026

(54) VOLUMETRIC NEXT-GENERATION IN SITU SEQUENCER

(71) Applicant: The Board of Trustees of the Leland Stanford Junior University, Stanford, CA (US)

(72) Inventors: Karl A. Deisseroth, Stanford, CA (US); Ethan B. Richman, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 233 days.

(21) Appl. No.: 18/561,468

(22) PCT Filed: May 20, 2022

(86) PCT No.: PCT/US2022/030232
§ 371 (c)(1),
(2) Date: Nov. 16, 2023

(87) PCT Pub. No.: WO2022/246181
PCT Pub. Date: Nov. 24, 2022

(65) Prior Publication Data

US 2024/0248038 A1 Jul. 25, 2024

Related U.S. Application Data

(60) Provisional application No. 63/191,460, filed on May 21, 2021.

(51) Int. Cl.

| | |
|---|---|
| ***G02B 21/00*** | (2006.01) |
| ***G01N 21/64*** | (2006.01) |

(52) U.S. Cl.
CPC ..... *G01N 21/6452* (2013.01); *G01N 21/6456* (2013.01); *G02B 21/0024* (2013.01)

(58) Field of Classification Search
CPC .......................... G02B 21/0024; G02B 21/00; G02B 21/0004; G02B 21/0076; G02B 21/02;
(Continued)

(56) References Cited

U.S. PATENT DOCUMENTS 3,687,808 A 8/1972 Merigan, Jr.
4,318,846 A 3/1982 Khanna et al.
(Continued)

FOREIGN PATENT DOCUMENTS

CN 101643732 A 2/2010
CN 102220431 A 10/2011
(Continued)

OTHER PUBLICATIONS

Deng et al., (2018) "DNA-Sequence-Encoded Rolling Circle Amplicon for Single-Cell RNA Imaging", Chem, 4:1373-1386.
(Continued)

*Primary Examiner* — Arnel C Lavarias
(74) *Attorney, Agent, or Firm* — Brian E. Davy; Bozicevic, Field & Francis LLP

(57) ABSTRACT

A sequencer for automated in situ sequencing of volumetric tissue samples is provided. In particular, an automated volumetric in situ sequencing device capable of operating on multiple samples in parallel is provided. Methods of fabrication and use of the sequencer are also provided.

17 Claims, 38 Drawing Sheets

(58) Field of Classification Search
CPC ............... G02B 21/33; G01N 21/6452; G01N 21/6456; G01N 21/6458; G01N 2021/6463; G01N 21/6486
USPC ......................... 359/368, 362, 363, 369, 656
See application file for complete search history.

(56) References Cited

U.S. PATENT DOCUMENTS

| | | | |
|---|---|---|---|
| 4,663,161 | A | 5/1987 | Mannino et al. |
| 4,757,141 | A | 7/1988 | Fung et al. |
| 4,797,368 | A | 1/1989 | Carter et al. |
| 4,849,336 | A | 7/1989 | Miyoshi et al. |
| 4,871,488 | A | 10/1989 | Mannino et al. |
| 4,945,050 | A | 7/1990 | Sanford et al. |
| 4,946,778 | A | 8/1990 | Ladner |
| 5,034,506 | A | 7/1991 | Summerton |
| 5,036,006 | A | 7/1991 | Sanford et al. |
| 5,066,580 | A | 11/1991 | Lee |
| 5,067,805 | A | 11/1991 | Corle et al. |
| 5,091,519 | A | 2/1992 | Cruickshank |
| 5,100,792 | A | 3/1992 | Sanford et al. |
| 5,135,855 | A | 8/1992 | Moss et al. |
| 5,139,941 | A | 8/1992 | Muzyczka et al. |
| 5,151,507 | A | 9/1992 | Hobbs et al. |
| 5,173,414 | A | 12/1992 | Lebkowski et al. |
| 5,179,022 | A | 1/1993 | Sanford et al. |
| 5,188,934 | A | 2/1993 | Menchen et al. |
| 5,198,537 | A | 3/1993 | Huber et al. |
| 5,219,740 | A | 6/1993 | Miller et al. |
| 5,344,757 | A | 9/1994 | Holtke et al. |
| 5,354,657 | A | 10/1994 | Holtke et al. |
| 5,366,860 | A | 11/1994 | Bergot et al. |
| 5,371,015 | A | 12/1994 | Sanford et al. |
| 5,387,742 | A | 2/1995 | Cordell |
| 5,399,346 | A | 3/1995 | Anderson et al. |
| 5,478,744 | A | 12/1995 | Sanford et al. |
| 5,489,677 | A | 2/1996 | Sanghvi |
| 5,535,052 | A | 7/1996 | Jorgens |
| 5,538,871 | A | 7/1996 | Nuovo et al. |
| 5,539,082 | A | 7/1996 | Nielsen |
| 5,580,859 | A | 12/1996 | Felgner et al. |
| 5,589,466 | A | 12/1996 | Felgner et al. |
| 5,602,240 | A | 2/1997 | De Mesmaeker |
| 5,612,818 | A | 3/1997 | Kumagai et al. |
| 5,619,371 | A | 4/1997 | Pontius |
| 5,676,950 | A | 10/1997 | Small et al. |
| 5,688,648 | A | 11/1997 | Mathies et al. |
| 5,702,888 | A | 12/1997 | Holtke et al. |
| 5,714,331 | A | 2/1998 | Buchardt |
| 5,719,262 | A | 2/1998 | Buchardt |
| 5,789,245 | A | 8/1998 | Dubensky, Jr. et al. |
| 5,831,005 | A | 11/1998 | Zuckerman et al. |
| 5,843,723 | A | 12/1998 | Dubensky, Jr. et al. |
| 5,847,162 | A | 12/1998 | Lee et al. |
| 5,990,479 | A | 11/1999 | Weiss et al. |
| 6,054,274 | A | 4/2000 | Sampson et al. |
| 6,094,300 | A | 7/2000 | Kashima et al. |
| 6,207,392 | B1 | 3/2001 | Weiss et al. |
| 6,235,502 | B1 | 5/2001 | Weissman et al. |
| 6,251,303 | B1 | 6/2001 | Bawendi et al. |
| 6,291,187 | B1 | 9/2001 | Kingsmore et al. |
| 6,300,093 | B1 | 10/2001 | Kindsvogel |
| 6,316,229 | B1 | 11/2001 | Lizardi et al. |
| 6,319,426 | B1 | 11/2001 | Bawendi et al. |
| 6,322,901 | B1 | 11/2001 | Bawendi et al. |
| 6,323,009 | B1 | 11/2001 | Lasken et al. |
| 6,344,329 | B1 | 2/2002 | Lizardi |
| 6,368,801 | B1 | 4/2002 | Faruqi |
| 6,423,551 | B1 | 7/2002 | Weiss et al. |
| 6,426,513 | B1 | 7/2002 | Bawendi et al. |
| 6,444,143 | B2 | 9/2002 | Bawendi et al. |
| 6,444,661 | B1 | 9/2002 | Barton |
| 6,558,928 | B1 | 5/2003 | Landegren et al. |
| 6,566,118 | B1 | 5/2003 | Atkinson et al. |
| 6,576,291 | B2 | 6/2003 | Bawendi et al. |
| 6,596,535 | B1 | 7/2003 | Carter |
| 6,649,811 | B2 | 11/2003 | Pasinetti |
| 6,989,264 | B2 | 1/2006 | Atkinson et al. |
| 6,995,006 | B2 | 2/2006 | Atkinson et al. |
| 7,335,898 | B2 | 2/2008 | Donders et al. |
| 7,399,845 | B2 | 7/2008 | Seth |
| 7,479,630 | B2 | 1/2009 | Bandura |
| 7,569,686 | B1 | 8/2009 | Bhat et al. |
| 7,632,679 | B2 | 12/2009 | Jessell et al. |
| 8,497,069 | B2 | 7/2013 | Hutchison, III et al. |
| 8,834,546 | B2 | 9/2014 | Deisseroth et al. |
| 9,175,095 | B2 | 11/2015 | Deisseroth et al. |
| 9,279,973 | B2 | 3/2016 | Takaya |
| 9,359,449 | B2 | 6/2016 | Deisseroth et al. |
| 9,365,628 | B2 | 6/2016 | Deisseroth et al. |
| 9,376,717 | B2 | 6/2016 | Gao et al. |
| 9,423,601 | B2 | 8/2016 | Toda et al. |
| 9,458,208 | B2 | 10/2016 | Deisseroth et al. |
| 9,791,409 | B2 | 10/2017 | Gordon et al. |
| 9,969,783 | B2 | 5/2018 | Deisseroth et al. |
| 10,000,796 | B2 | 6/2018 | Samusik et al. |
| 10,006,082 | B2 | 6/2018 | Samusik et al. |
| 10,052,383 | B2 | 8/2018 | Deisseroth et al. |
| 10,138,509 | B2 | 11/2018 | Church et al. |
| 10,196,431 | B2 | 2/2019 | Deisseroth et al. |
| 10,220,092 | B2 | 3/2019 | Deisseroth et al. |
| 10,227,639 | B2 | 3/2019 | Levner et al. |
| 10,266,888 | B2 | 4/2019 | Daugharthy et al. |
| 10,323,272 | B1 | 6/2019 | Rabbani et al. |
| 10,364,457 | B2 | 7/2019 | Wassie et al. |
| 10,478,499 | B2 | 11/2019 | Deisseroth et al. |
| 10,494,662 | B2 | 12/2019 | Church et al. |
| 10,568,307 | B2 | 2/2020 | Deisseroth et al. |
| 10,568,516 | B2 | 2/2020 | Yang et al. |
| 10,583,309 | B2 | 3/2020 | Deisseroth et al. |
| RE47,983 | E | 5/2020 | Gao et al. |
| 10,656,158 | B2 | 5/2020 | Rojas |
| 10,787,701 | B2 | 9/2020 | Chee |
| 10,829,814 | B2 | 11/2020 | Fan et al. |
| 10,961,566 | B2 | 3/2021 | Chee |
| 11,008,608 | B2 | 5/2021 | Samusik et al. |
| 11,021,737 | B2 | 6/2021 | Church et al. |
| 11,066,701 | B2 | 7/2021 | Mir |
| 11,078,520 | B2 | 8/2021 | Church et al. |
| 11,085,072 | B2 | 8/2021 | Church et al. |
| 11,098,303 | B2 | 8/2021 | Zhuang et al. |
| 11,111,521 | B2 | 9/2021 | Church et al. |
| 11,168,350 | B2 | 11/2021 | Nolan et al. |
| 11,187,581 | B2 | 11/2021 | Kokota |
| 11,293,051 | B2 | 4/2022 | Church et al. |
| 11,293,052 | B2 | 4/2022 | Church et al. |
| 11,293,054 | B2 | 4/2022 | Levner et al. |
| 11,299,767 | B2 | 4/2022 | Church et al. |
| 11,299,770 | B2 | 4/2022 | Samusik et al. |
| 11,377,689 | B2 | 7/2022 | Beechem et al. |
| 11,408,094 | B2 | 8/2022 | Fu |
| 11,447,807 | B2 | 9/2022 | Church et al. |
| RE49,304 | E | 11/2022 | Gao et al. |
| 11,542,554 | B2 | 1/2023 | Daugharthy et al. |
| 11,549,136 | B2 | 1/2023 | Church et al. |
| 11,566,276 | B2 | 1/2023 | Church et al. |
| 11,566,277 | B2 | 1/2023 | Church et al. |
| 11,639,518 | B2 | 5/2023 | Church et al. |
| 11,649,485 | B2 | 5/2023 | Yin |
| 11,656,447 | B2 | 5/2023 | Tsia et al. |
| 12,031,127 | B2 | 7/2024 | Zador et al. |
| 12,060,603 | B2 | 8/2024 | Bava |
| 12,157,124 | B2 | 12/2024 | Cox et al. |
| 12,188,085 | B2 | 1/2025 | Bava |
| 12,359,253 | B2 | 7/2025 | Wang et al. |
| 2002/0045045 | A1 | 4/2002 | Adams et al. |
| 2003/0017264 | A1 | 1/2003 | Treadway et al. |
| 2003/0092624 | A1 | 5/2003 | Wang et al. |
| 2005/0112639 | A1 | 5/2005 | Wang et al. |
| 2005/0239184 | A1 | 10/2005 | Ohara et al. |
| 2006/0141501 | A1 | 6/2006 | Friend et al. |
| 2008/0124735 | A1 | 5/2008 | Schuster et al. |
| 2008/0198343 | A1 | 8/2008 | Sewell et al. |
| 2009/0011943 | A1 | 1/2009 | Drmanac et al. |

(56) References Cited

U.S. PATENT DOCUMENTS

| | | | |
|---|---|---|---|
| 2009/0093403 | A1 | 4/2009 | Zhang et al. |
| 2009/0109416 | A1 | 4/2009 | Dougherty et al. |
| 2009/0262183 | A1 | 10/2009 | Hayashi et al. |
| 2010/0027109 | A1 | 2/2010 | Liebel et al. |
| 2010/0055733 | A1 | 3/2010 | Lutolf et al. |
| 2010/0120129 | A1 | 5/2010 | Amshey |
| 2011/0256183 | A1 | 10/2011 | Frank et al. |
| 2012/0003657 | A1 | 1/2012 | Myllykangas et al. |
| 2013/0045872 | A1 | 2/2013 | Zhou et al. |
| 2013/0178372 | A1 | 7/2013 | Geiss et al. |
| 2013/0266512 | A1 | 10/2013 | Fox et al. |
| 2013/0338038 | A1 | 12/2013 | Dubridge et al. |
| 2014/0162892 | A1 | 6/2014 | Mir |
| 2014/0170654 | A1 | 6/2014 | Landegren et al. |
| 2015/0144490 | A1 | 5/2015 | Deisseroth et al. |
| 2015/0377886 | A1 | 12/2015 | Ciceri et al. |
| 2016/0080632 | A1 | 3/2016 | Iwase et al. |
| 2016/0129437 | A1 | 5/2016 | Kayyem et al. |
| 2016/0169923 | A1 | 6/2016 | Holmes et al. |
| 2016/0252715 | A1 | 9/2016 | Nakano et al. |
| 2016/0377524 | A1 | 12/2016 | Martin et al. |
| 2017/0068086 | A1 | 3/2017 | Tomer et al. |
| 2017/0145510 | A1 | 5/2017 | Oliphant |
| 2017/0211133 | A1 | 7/2017 | Landegren et al. |
| 2018/0017525 | A1 | 1/2018 | Gordon et al. |
| 2018/0094320 | A1 | 4/2018 | Li |
| 2018/0119219 | A1 | 5/2018 | Chen et al. |
| 2018/0208975 | A1 | 7/2018 | Peterson et al. |
| 2018/0216161 | A1 | 8/2018 | Chen et al. |
| 2018/0267283 | A1 | 9/2018 | Matsumoto |
| 2018/0340221 | A1 | 11/2018 | Davis et al. |
| 2019/0002971 | A1 | 1/2019 | Koslover et al. |
| 2019/0055594 | A1 | 2/2019 | Samusik et al. |
| 2019/0085383 | A1 | 3/2019 | Church et al. |
| 2019/0093156 | A1 | 3/2019 | Bava et al. |
| 2019/0110281 | A1 | 4/2019 | Zhou et al. |
| 2019/0154679 | A1 | 5/2019 | Doyle et al. |
| 2019/0179127 | A1 | 6/2019 | Mertz et al. |
| 2019/0284603 | A1 | 9/2019 | Shema-Yaacoby et al. |
| 2020/0199667 | A1 | 6/2020 | Erickstad et al. |
| 2020/0277663 | A1 | 9/2020 | Ramachandran Iyer et al. |
| 2020/0341259 | A1 | 10/2020 | Chan et al. |
| 2021/0130810 | A1 | 5/2021 | Schwartz et al. |
| 2021/0164039 | A1 | 6/2021 | Wang et al. |
| 2021/0238662 | A1 | 8/2021 | Bava et al. |
| 2021/0238665 | A1 | 8/2021 | Samusik et al. |
| 2021/0238674 | A1 | 8/2021 | Bava et al. |
| 2021/0262018 | A1 | 8/2021 | Bava et al. |
| 2021/0293693 | A1 | 9/2021 | Bharadwaj et al. |
| 2021/0340621 | A1 | 11/2021 | Daugharthy et al. |
| 2021/0388424 | A1 | 12/2021 | Bava |
| 2022/0015638 | A1 | 1/2022 | Zeng et al. |
| 2022/0016624 | A1 | 1/2022 | Daugharthy et al. |
| 2022/0025398 | A1 | 1/2022 | Hrvatin et al. |
| 2022/0083832 | A1 | 3/2022 | Shah |
| 2022/0084628 | A1 | 3/2022 | Shah |
| 2022/0084629 | A1 | 3/2022 | Shah |
| 2022/0251642 | A1 | 8/2022 | Church et al. |
| 2022/0290228 | A1 | 9/2022 | Hauling et al. |
| 2022/0316004 | A1 | 10/2022 | Miller et al. |
| 2022/0364160 | A1 | 11/2022 | Nolan et al. |
| 2022/0372570 | A1 | 11/2022 | Costa |
| 2022/0380838 | A1 | 12/2022 | Kühnemund et al. |
| 2022/0403458 | A1 | 12/2022 | Bava |
| 2023/0012607 | A1 | 1/2023 | Kühnemund et al. |
| 2023/0013775 | A1 | 1/2023 | Chen et al. |
| 2023/0026886 | A1 | 1/2023 | Chen |
| 2023/0034039 | A1 | 2/2023 | Shahjamali |
| 2023/0037182 | A1 | 2/2023 | Bava et al. |
| 2023/0061542 | A1 | 3/2023 | Kühnemund |
| 2023/0077364 | A1 | 3/2023 | Patterson et al. |
| 2023/0081232 | A1 | 3/2023 | Weisenfeld et al. |
| 2023/0109070 | A1 | 4/2023 | Richman et al. |
| 2023/0115903 | A1 | 4/2023 | Hernández Neuta et al. |
| 2023/0126825 | A1 | 4/2023 | Nagendran et al. |
| 2023/0143569 | A1 | 5/2023 | Ramachandran Iyer et al. |
| 2023/0227894 | A1 | 7/2023 | Nilsson et al. |
| 2023/0238078 | A1 | 7/2023 | Lozano et al. |
| 2023/0242974 | A1 | 8/2023 | Costa et al. |
| 2023/0279480 | A1 | 9/2023 | Kühnemund |
| 2023/0314327 | A1 | 10/2023 | Hoffman |
| 2023/0314328 | A1 | 10/2023 | Costa |
| 2023/0323437 | A1 | 10/2023 | Chen et al. |
| 2023/0324421 | A1 | 10/2023 | Zhang et al. |
| 2023/0351619 | A1 | 11/2023 | Tentori et al. |
| 2024/0019353 | A1 | 1/2024 | Wang et al. |
| 2024/0033743 | A1 | 2/2024 | Tentori et al. |
| 2024/0132938 | A1 | 4/2024 | Kühnemund |
| 2024/0144704 | A1 | 5/2024 | Wang et al. |
| 2024/0150816 | A1 | 5/2024 | Feng et al. |
| 2024/0151937 | A1 | 5/2024 | Hoffman |
| 2024/0167081 | A1 | 5/2024 | Bava et al. |
| 2024/0167956 | A1 | 5/2024 | Hoffman et al. |
| 2024/0168273 | A1 | 5/2024 | Monkowski et al. |
| 2024/0171723 | A1 | 5/2024 | Shutov et al. |
| 2024/0171833 | A1 | 5/2024 | Hoffman et al. |
| 2024/0177348 | A1 | 5/2024 | Shutov et al. |
| 2024/0209346 | A1 | 6/2024 | Shastry |
| 2024/0233415 | A1 | 7/2024 | Hoffman |
| 2024/0248038 | A1 | 7/2024 | Deisseroth et al. |
| 2024/0254545 | A1 | 8/2024 | Wang et al. |
| 2024/0254553 | A1 | 8/2024 | Deisseroth et al. |
| 2024/0254554 | A1 | 8/2024 | Deisseroth et al. |
| 2024/0257912 | A1 | 8/2024 | Deisseroth et al. |
| 2024/0263228 | A1 | 8/2024 | Deisseroth et al. |
| 2024/0294973 | A1 | 9/2024 | Wang et al. |
| 2024/0305314 | A1 | 9/2024 | Hoffman et al. |
| 2024/0369471 | A1 | 11/2024 | Hoffman et al. |
| 2024/0376530 | A1 | 11/2024 | Wang et al. |
| 2024/0428880 | A1 | 12/2024 | Marks et al. |
| 2025/0012786 | A1 | 1/2025 | Skrynnyk et al. |
| 2025/0052979 | A1 | 2/2025 | Miller et al. |
| 2025/0061732 | A1 | 2/2025 | Li et al. |

FOREIGN PATENT DOCUMENTS

| | | | | | |
|---|---|---|---|---|---|
| CN | 103602719 | A | | 2/2014 | |
| CN | 104662165 | A | | 5/2015 | |
| CN | 110933725 | A | | 3/2020 | |
| DE | 102006042088 | | | 3/2008 | |
| EP | 2270205 | | | 1/2011 | |
| EP | 2794928 | B1 | | 2/2019 | |
| EP | 2971184 | B1 | | 4/2019 | |
| EP | 3578666 | A1 | | 12/2019 | |
| EP | 4045887 | A1 | | 8/2022 | |
| EP | 3425063 | B1 | | 6/2023 | |
| EP | 4108782 | B1 | | 6/2023 | |
| EP | 4513431 | A2 | | 2/2025 | |
| JP | 2005511058 | A | | 4/2005 | |
| JP | 2009518009 | A | | 5/2009 | |
| JP | 2010503030 | A | | 1/2010 | |
| JP | 2010026218 | A | * | 2/2010 | |
| JP | 2010098172 | A | * | 4/2010 | ......... G03F 7/70341 |
| JP | 2017207481 | A | | 11/2017 | |
| JP | 2017207605 | A | | 11/2017 | |
| JP | 2019128371 | A | * | 8/2019 | ............. G02B 21/33 |
| JP | 7706446 | B2 | | 7/2025 | |
| JP | 2025143377 | A | | 10/2025 | |
| KR | 20080091125 | A | | 10/2008 | |
| KR | 20140068264 | A | | 6/2014 | |
| WO | WO1998039352 | A1 | | 9/1998 | |
| WO | WO1999014226 | A2 | | 3/1999 | |
| WO | WO2001061037 | | | 8/2001 | |
| WO | WO2005033340 | A2 | | 4/2005 | |
| WO | WO 2005042759 | | | 5/2005 | |
| WO | WO2005078503 | | | 8/2005 | |
| WO | WO2010062775 | A2 | | 6/2010 | |
| WO | WO2012005595 | | | 1/2012 | |
| WO | WO2012110899 | | | 8/2012 | |
| WO | WO2012160083 | | | 11/2012 | |
| WO | WO2013173774 | | | 11/2013 | |
| WO | WO2014030066 | A2 | | 2/2014 | |
| WO | WO2015200139 | A1 | | 12/2015 | |
| WO | WO2017019481 | | | 2/2017 | |

(56) References Cited

FOREIGN PATENT DOCUMENTS

| | | | |
|---|---|---|---|
| WO | WO2017096248 | | 6/2017 |
| WO | WO2017147483 | | 8/2017 |
| WO | WO2017149550 | A1 | 9/2017 |
| WO | WO2018033528 | A1 | 2/2018 |
| WO | WO 2018089438 | | 5/2018 |
| WO | WO2018136856 | A1 | 7/2018 |
| WO | WO 2018175779 | | 9/2018 |
| WO | 2019016048 | A1 | 1/2019 |
| WO | WO2019199579 | A1 | 10/2019 |
| WO | WO2019222284 | A1 | 11/2019 |
| WO | WO2020030162 | A1 | 2/2020 |
| WO | WO2020160044 | A1 | 8/2020 |
| WO | WO2020176788 | A1 | 9/2020 |
| WO | WO2020214885 | A1 | 10/2020 |
| WO | WO2020240025 | A1 | 12/2020 |
| WO | WO2021076770 | A1 | 4/2021 |
| WO | WO2020148769 | A1 | 7/2021 |
| WO | WO2022093940 | A1 | 5/2022 |
| WO | WO2022178274 | A1 | 8/2022 |
| WO | WO2022236011 | A1 | 11/2022 |
| WO | WO2022246181 | A2 | 11/2022 |
| WO | WO2022246242 | A1 | 11/2022 |
| WO | WO2022246269 | A1 | 11/2022 |
| WO | WO2022246275 | A1 | 11/2022 |
| WO | WO2022246279 | A1 | 11/2022 |
| WO | WO2022251586 | A1 | 12/2022 |
| WO | WO2022261255 | A1 | 12/2022 |
| WO | WO2022261481 | A2 | 12/2022 |
| WO | WO2023278409 | A1 | 1/2023 |
| WO | WO2023018756 | A1 | 2/2023 |
| WO | WO2024103007 | A1 | 5/2024 |
| WO | WO2025014828 | A1 | 1/2025 |
| WO | WO2025136916 | A1 | 6/2025 |
| WO | WO2025189030 | A1 | 9/2025 |

OTHER PUBLICATIONS

Abbott et al., (2019) "A nanoelectrode array for obtaining intracellular recordings from thousands of connected neurons", Nat Biomed Eng., 4(2):232-241.

Abdelaal et al., (2020) "SpaGE: spatial gene enhancement using scRNA-seq", Nucleic Acids Res., 48(18):e107.

Achim et al., (2015) "High-throughput spatial mapping of single-cell RNA-seq data to tissue of origin", Nat Biotechnol. May 2015;33(5):503-9.

Akbalik et al., (2017) "Visualization of newly synthesized neuronal RNA in vitro and in vivo using click-chemistry", RNA Biol., 14(1):20-28.

Alfaro et al., (2021) "The emerging landscape of single-molecule protein sequencing technologies", Nat Methods., 18(6):604-617.

Alivisatos et al., (2013) "The brain activity map", Science 339:1284-1285.

Anonymus, (2018) "Starfish: Open-Source Image Based Transcriptomics and Proteomics Tools", http://github.com/spacetx/starfish.

Arganda-Carreras et al., (2017) "Trainable Weka Segmentation: a machine learning tool for microscopy pixel classification", Bioinformatics, 33(15):2424-2426.

Asakura et al., (2015) "Improvement of acquisition and analysis methods in multi-electrode array experiments with iPS cell-derived cardiomyocytes", J Pharmacol Toxicol Methods. 75:17-26.

Asp et al., (2020) "Spatially Resolved Transcriptomes-Next Generation Tools for Tissue Exploration", Bioessays., 42(10):e1900221.

Axelrod et al., (2021) "starfish: scalable pipelines for image-based transcriptomics", Journal of Open Source Software, 6(61):2440.

Becht et al., (2018) "Dimensionality reduction for visualizing single-cell data using UMAP", Nat. Biotechnol., 37, 38-44.

Battich et al., (2020) "Sequencing metabolically labeled transcripts in single cells reveals mRNA turnover strategies", Science, 367, 1151.

Battich et al., (2015) "Control of Transcript Variability in Single Mammalian Cells", Cell, 163:1596-1610.

Beach et al., (1989) "Patterns of gliosis in Alzheimer's disease and aging cerebrum", Glia., 2(6):420-36.

Bergen et al., (2020) "Generalizing RNA velocity to transient cell states through dynamical modeling", Nat. Biotechnol., 38:1408-1414.

Berry et al., (2021) "Nuclear RNA concentration coordinates RNA production with cell size in human cells", bioRxiv, 444432:1-41.

Bhatt et al., (2012) "Transcript Dynamics of Proinflammatory Genes Revealed by Sequence Analysis of Subcellular RNA Fractions", Cell, 150:279-290.

Biever et al., (2020) "Monosomes actively translate synaptic mRNAs in neuronal processes", Science, 31;367(6477):eaay4991.

Blondel et al., (2008) "Fast unfolding of communities in large networks", arXiv.2008: 1-12.

Boersma et al., (2019) "Multi-Color Single-Molecule Imaging Uncovers Extensive Heterogeneity in mRNA Decoding", Cell, 178(2):458-472.e19.

Bohlen et al., (2019) "Microglia in Brain Development, Homeostasis, and Neurodegeneration", Annu Rev Genet., 3:53:263-288.

Bolanos-Burgos et al., (2021) "Thiamine Deficiency Increases Intrinsic Excitability of Mouse Cerebellar Purkinje Cells", Cerebellum, 20(2):186-202.

Braselmann et al., (2020) "Illuminating RNA Biology: Tools for Imaging RNA in Live Mammalian Cells", Cell Chem Biol. 27(8):891-903.

Buccino et al., (2020) "Spikeinterface, a unified framework for spike sorting", Elife 9, e61834.

Braak et al., (1991) "Neuropathological stageing of Alzheimer-related changes", Acta Neuropathologica, 82:239-259.

Burke et al., (2017) "A Fluorescence in Situ Hybridization Method To Quantify mRNA Translation by Visualizing Ribosome-mRNA Interactions in Single Cells", ACS Cent Sci. 3(5):425-433.

Busche et al., (2020) "Synergy between amyloid-b and tau in Alzheimer's disease", Nature Neuroscience, 23:1183-1193.

Butt et al., (2018) "Neuroglia: Realising their true potential", Brain Neurosci Adv., 4:2:2398212818817495.

Buxbaum et al., (2015) "In the right place at the right time: Visualizing and understanding mRNA localization", Nat Rev Mol Cell Biol, 16(2): 95-109.

Cadwell et al., (2016) "Electrophysiological, transcriptomic and morphologic profiling of single neurons using Patch-seq", Nat Biotechnol., 34(2):199-203.

Cao et al., (2020) "Sci-fate characterizes the dynamics of gene expression in single cells" Nat Biotechnol, 38(8): 980-988.

Cao et al., (2019) "The single-cell transcriptional landscape of mammalian organogenesis", Nature., 566(7745):496-502. CHATTERJEE et al., (2018) "Nontoxic, double-deletion-mutant rabies viral vectors for retrograde targeting of projection neurons", Nat Neurosci., 21(4):638-646.

Chatterjee et al., (2018) "Nontoxic, double-deletion-mutant rabies viral vectors for retrograde targeting of projection neurons", Nat Neurosci., 21(4):638-646.

Chen et al., (2015) "Expansion Microscopy", Science, 347(6221):543-8.

Chen et al., (2017) "Comprehensive analysis of nucleocytoplasmic dynamics of mRNA in *Drosophila* cells", PLOS Genet., 13:el006929.

Chen et al., (2020) "Spatial Transcriptomics and In Situ Sequencing to Study Alzheimer's Disease", Cell, 182(4):976-991.e19.

Churko et al., (2018) "Defining human cardiac transcription factor hierarchies using integrated single-cell heterogeneity analysis", Nature Communications, 9.

Christoph et al., (2018) "Electromechanical vortex filaments during cardiac fibrillation", Nature 555:667-672.

Codeluppi et al., (2018) "Spatial organization of the somatosensory cortex revealed by osmFISH", Nat Methods, 15(11):932-935.

Coelho et al., (2009) "Nuclear segmentation in microscope cell images: a hand-segmented dataset and comparison of algorithms", Proc IEEE Int Symp Biomed Imaging, 5193098:518-521.

Consortium et al., (2020) "A single-cell transcriptomic atlas characterizes ageing tissues in the mouse", Nature, 583(7817):590-595.

Consortium et al., (2018) "Single-cell transcriptomics of 20 mouse organs creates a Tabula Muris", Nature, 562(7727):367-372.

(56) References Cited

OTHER PUBLICATIONS

Cox et al., (2017) RNA editing with CRISPR-Cas13. Science, 358(6366):1019-1027.
Cui et al., (2019) "Single-Cell Transcriptome Analysis Maps the Developmental Track of the Human Heart", Cell Rep, 26(7):1934-1950.
Das et al., (2021) "Intracellular mRNA transport and localized translation", Nat Rev Mol Cell Biol., 22(7):483-504.
Dieck et al., (2015) "Direct visualization of newly synthesized target proteins in situ", Nat Methods., 12(5):411-4.
Dixit et al., (2016) "Perturb-Seq: Dissecting Molecular Circuits with Scalable Single-Cell RNA Profiling of Pooled Genetic Screens", Cell, 167(7):1853-1866.e17.
Djebali et al., (2012) "Landscape of transcription in human cells", Nature, 489(7414):101-8.
Dominissini et al., (2012) "The topology of the human and mouse m6A RNA methylomes revealed by m6A-seq", Nature, 485(7397):201-206.
Edens et al., (2019) "FMRP Modulates Neural Differentiation through m(6)A-Dependent mRNA Nuclear Export", Cell Rep., 28(4):845-854.e5.
Eng et al., (2019) "Transcriptome-scale super-resolved imaging in tissues by RNA seqFISH", Nature, 568(7751):235-239.
Engel et al., (2018) "The Role of m6A/m-RNA Methylation in Stress Response Regulation", Neuron, 99(2):389-403.e9.
Erhard et al., (2019) "scSLAM-seq reveals core features of transcription dynamics in single cells", Nature, 571(7765):419-423.
Fazal et al., (2019) "Atlas of Subcellular RNA Localization Revealed by APEX-Seq", Cell, 178(2):473-490.e26.
Fei et al., (2020) "YTHDF2 promotes mitotic entry and is regulated by cell cycle mediators", PLoS Biol., 18(4):e3000664.
Feiner et al., (2016) "Engineered hybrid cardiac patches with multifunctional electronics for online monitoring and regulation of tissue function", Nat Mater., 15(6):679-85.
Feltham et al., (1971) "Platinized platinum electrodes", Chem. Rev., 71, 177-193.
Fernandopulle et al., (2021) "RNA transport and local translation in neurodevelopmental and neurodegenerative disease", Nat Neurosci, 24(5):622-632.
Fishell et al., (2013) "The neuron identity problem: form meets function", Neuron 80(3):602-12.
Franti et al., (2018) "K-means properties on six clustering benchmark datasets", Applied Intelligence, 48(2): 4743-4759.
Friedman et al., (2018) "Diverse Brain Myeloid Expression Profiles Reveal Distinct Microglial Activation States and Aspects of Alzheimer's Disease Not Evident in Mouse Models", Cell Rep., 22(3):832-847.
Friedman et al., (2018) "Single-Cell Transcriptomic Analysis of Cardiac Differentiation from Human PSCs Reveals HOPX-Dependent Cardiomyocyte Maturation", Cell Stem Cell, 23(4):586-598.e8.
Fu et al., (2016) "Stable long-term chronic brain mapping at the single-neuron level", Nat Methods, 13(10):875-82.
Fuzik et al., (2016) "Integration of electrophysiological recordings with single-cell RNA-seq data identifies neuronal subtypes", Nat Biotechnol., 34(2):175-183.
Gala et al., (2021) "Consistent cross-modal identification of cortical neurons with coupled autoencoders", Nature Computational Science, 1:120-127.
Gao et al., (2020) "Intracellular neuronal recording in awake nonhuman primates", Nature Protoc., 15(11):3615-3631.
Gao et al., (2018) "Tracing the temporal-spatial transcriptome landscapes of the human fetal digestive tract using single-cell RNA-sequencing", Nat Cell Biol., 20(6):721-734.
Garg et al., (2018) "Human induced pluripotent stem cell-derived cardiomyocytes as models for cardiac channelopathies", Circulation Research, 123:224-243.
Gao et al., (2023) "ClusterMap—Compare multiple Single cell RNA-seq profiling", 57 pages. https://xgaoo.github.io/ClusterMap/ClusterMap.html. [last accessed: Jul. 12, 2023].
Glock et al., (2021) "The translatome of neuronal cell bodies, dendrites, and axons", Proc Natl Acad Sci., 118(43):e2113929118.
Goddard et al., (2017) "UCSF ChimeraX: Meeting modern challenges in visualization and analysis", Protein Sci., 27(1):14-25.
Goddard et al., (2006) "Visualizing density maps with UCSF Chimera", J Struct Biol., 157(1):281-7.
Goltsev et al., (2018) "Deep profiling of mouse splenic architecture with CODEX multiplexed imaging", Cell, 174(4):968-981.e15.
Gonzalez et al., (2009) "Digital Image Processing: Image Compression", 3rd edn, 547-645.
Grubman et al., (2019) "A single-cell atlas of entorhinal cortex from individuals with Alzheimer's disease reveals cell-type-specific gene expression regulation", Nat Neurosci., 22(12):2087-2097.
Grueninger et al., (2010) "Phosphorylation of Tau at S422 is enhanced by Ab in TauPS2APP triple transgenic mice", Neurobiol. Dis., 37:294-306.
Habib et al., (2020) "Disease-associated astrocytes in Alzheimer's disease and aging", Nat. Neurosci., 23:701-706.
Halpem et al., (2015) "Nuclear Retention of mRNA in Mammalian Tissues", Cell Rep., 13:2653-2662.
Halstead et al., (2015) "Translation. An RNA biosensor for imaging the first round of translation from single cells to living animals", Science. 347(6228):1367-1671.
Han et al., (2018) "Mapping the Mouse Cell Atlas by Microwell-Seq", Cell, 172(5):1091-1107.e17.
Hansen et al., (2018) "Microglia in Alzheimer's disease", J Cell Biol., 217(2):459-472.
Harcourt et al., (2017) "Chemical and structural effects of base modifications in messenger RNA", Nature, 541(7637):339-346.
Hao et al., (2021) "Integrated analysis of multimodal single-cell data", Cell, 184(13):3573-3587.e29.
Hardy et al., (2002) "The amyloid hypothesis of Alzheimer's disease: progress and problems on the road to therapeutics", Science, 297:353-356.
He et al., (2020) "Integrating spatial gene expression and breast tumor morphology via deep learning", Nat Biomed Eng., 4(8):827-834.
Heideman et al., (1994) "Gauss and the history of the fast Fourier transform", IEEE ASSP Magazine, 1(4): 14-21.
Hendriks et al., (2019) "NASC-seq monitors RNA synthesis in single cells", Nat Commun., 10(1):3138.
Henstrindge et al., (2019) "Beyond the neuron-cellular interactions early in Alzheimer disease pathogenesis", Nat Rev Neurosci., 20(2):94-108.
Hernandez-Ochoa et al., (2012) "Voltage clamp methods for the study of membrane currents and SR Ca(2+) release in adult skeletal muscle fibres", Prog Biophys Mol Biol., 108(3):98-118.
Hess et al., (2013) "The fat mass and obesity associated gene (Fto) regulates activity of the dopaminergic midbrain circuitry", Nat Neurosci., 16(8):1042-1048.
Hsu et al., (2017) "Ythdc2 is an N(6)-methyladenosine binding protein that regulates mammalian spermatogenesis", Cell Res., 27(9):1115-1127.
Huang et al., (2008) "Bioinformatics enrichment tools: paths toward the comprehensive functional analysis of large gene lists", Nucleic Acids Res., 37(1):1-13.
Huang et al., (2009) "Systematic and integrative analysis of large gene lists using DAVID Bioinformatics Resources", Nature Protoc., 4(1):44-57.
Huang et al., (2018) "Recognition of RNA N(6)-methyladenosine by IGF2BP proteins enhances mRNA stability and translation", Nat Cell Biol., 20(3):285-295.
Huang et al., (2021) "Manifold learning analysis suggests novel strategies for aligning single-cell multi-modalities and revealing functional genomics for neuronal electrophysiology", bioRxiv, 410555.
Hunter et al., (2007) "Matplotlib: a 2D graphics environment", Comput Sci Eng., 9(3): 90-95.
Ingolia et al., (2009) "Genome-wide analysis in vivo of translation with nucleotide resolution using ribosome profiling", Science, 324(5924):218-23.
Ingolia et al., (2016) "Ribosome Footprint Profiling of Translation throughout the Genome", Cell, 165(1):22-33.

(56) References Cited

OTHER PUBLICATIONS

International Search Report and Written Opinion for Application No. PCT/US2022/028012, mailed Aug. 17, 2022.
International Preliminary Report on Patentability for Application No. PCT/US2022/028012, mailed Nov. 16, 2023.
International Search Report and Written Opinion for Application No. PCT/US2021/05682, mailed Feb. 10, 2022.
International Preliminary Report on Patentability for Application No. PCT/US2021/05682, mailed May 11, 2023.
International Search Report and Written Opinion for Application No. PCT/US2022/035271, mailed Oct. 11, 2022.
International Preliminary Report on Patentability for Application No. PCT/US2022/035271, mailed Jan. 11, 2024.
International Search Report and Written Opinion for Application No. PCT/US2022/017016, mailed May 24, 2022.
International Preliminary Report on Patentability for Application No. PCT/US2022/017016, mailed Aug. 31, 2023.
Invitation to Pay Additional Fees for Application No. PCT/US2022/031275, mailed Sep. 8, 2022.
International Search Report and Written Opinion for Application No. PCT/US2022/031275, mailed Oct. 31, 2022.
International Preliminary Report on Patentability for Application No. PCT/US2022/031275, mailed Dec. 7, 2023.
International Search Report and Written Opinion for Application No. PCT/US2022/039895, mailed Nov. 17, 2022.
International Preliminary Report on Patentability for Application No. PCT/US2022/039895, mailed Feb. 22, 2024.
Jan et al., (2014) "Principles of ER cotranslational translocation revealed by proximity-specific ribosome profiling", Science, 346(6210):1257521.
Jao et al.,(2008) "Exploring RNA transcription and turnover in vivo by using click chemistry", Proc Natl Acad Sci USA, 105(41):15779-84.
Johnson et al., (2007) "Adjusting batch effects in microarray expression data using empirical Bayes methods", Biostatistics 8:118-127.
Oliphant et al., (2004) "SciPy Tutorial", pp. 1-42.
Jonkhout et al., (2017) "The RNA modification landscape in human disease", RNA, 23(12):1754-1769.
Jun et al., (2017) "Fully integrated silicon probes for high-density recording of neural activity", Nature, 551(7679):232-236.
Karbassi et al., (2020) "Cardiomyocyte maturation: advances in knowledge and implications for regenerative medicine", Nature Reviews Cardiology, 17:341-359.
Katz et al., (2016) "Mapping translation "hot-spots" in live cells by tracking single molecules of mRNA and ribosomes", Elife, 13:5:e10415.
Keller et al., (2015) "Visualizing whole-brain activity and development at the single-cell level using light-sheet microscopy", Neuron, 85(3):462-83.
Keren-Shaul et al., (2017) "A Unique Microglia Type Associated with Restricting Development of Alzheimer's Disease", Cell, 169:1276-1290. el7.
Kishi et al., (2019) "SABER amplifies FISH: enhanced multiplexed imaging of RNA and DNA in cells and tissues", Nat Methods, 16(6):533-544.
Kobak et al., (2020) "Sparse reduced-rank regression for exploratory visualization of multimodal data sets", BioRxiv, 10.1101/302208.
Kodandaramaiah et al., (2012) "Automated whole-cell patch-clamp electrophysiology of neurons in vivo", Nat Methods, 9(6):585-7.
Koh et al., (2016) "A quantitative FastFUCCI assay defines cell cycle dynamics at a single-cell levell", J Cell Sci., 130(2):512-520.
Koos et al., (2014) "Analysis of protein interactions in situ by proximity ligation assays", Curr Top Microbiol Immunol., 377:111-26.
Kumar et al., (2021) "Deciphering Epitranscriptome: Modification of mRNA Bases Provides a New Perspective for Post-transcriptional Regulation of Gene Expression", Front Cell Dev Biol., 9:628415.
La Manno et al., (2018) "RNA velocity of single cells", Nature, 560:494-498.
Lau et al., (2020) "Single-nucleus transcriptome analysis reveals dysregulation of angiogenic endothelial cells and neuroprotective glia in Alzheimer's disease", Proc Natl Acad Sci USA, 117(41):25800-25809.
Lee et al., (2019) "Activation of PDGF pathway links LMNA mutation to dilated cardiomyopathy", Nature, 572(7769): 335-340.
Lee et al., (2019) "PyWavelets: A Python package for wavelet analysis", Journal of Open Source Software 4.36 (2019): 1237.
Lee et al., (2021) "Trem2 restrains the enhancement of tau accumulation and neurodegeneration by b-amyloid pathology", Neuron, 109:1283-1301. e6.
Lein et al., (2007) "Genome-wide atlas of gene expression in the adult mouse brain", Nature, 445(7124):168-176.
Li et al., (2019) "Cyborg Organoids: Implantation of Nanoelectronics via Organogenesis for Tissue-Wide Electrophysiology", Nano Lett., 19(8):5781-5789.
Li et al., (2016) "Epitranscriptome sequencing technologies: decoding RNA modifications" Nat Methods, 14(1):23-31.
Liu et al., (2016) "On the Dependency of Cellular Protein Levels on mRNA Abundance", Cell, 165(3):535-50.
Li et al., (2021) "In situ electro-sequencing in three-dimensional tissues", bioRxiv, pp. 1-59.
Lian et al., (2012) "Robust cardiomyocyte differentiation from human pluripotent stem cells via temporal modulation of canonical Wnt signaling", Proc. Natl. Acad. Sci. USA, 109:E1848-E1857.
Lian et al., (2013) "Directed cardiomyocyte differentiation from human pluripotent stem cells by modulating Wnt/p-catenin signaling under fully defined conditions", Nat. Protoc., 8:162-175.
Liu et al., (2020) "Intrinsically stretchable electrode array enabled in vivo electrophysiological mapping of atrial fibrillation at cellular resolution", Proc Natl Acad Sci USA, 117(26):14769-14778.
Liu et al., (2013) "Multifunctional three-dimensional macroporous nanoelectronic networks for smart materials", Proc Natl Acad Sci USA. 110(17):6694-9.
Liu et al., (2013) "Probing N6-methyladenosine RNA modification status at single nucleotide resolution in mRNA and long non-coding RNA", RNA, 19(12):1848-1856.
Liu et al., (2015) "Syringe-injectable electronics", Nat Nanotechnol, 10(7):629-636.
Long et al., (2015) "Learning Transferable Features with Deep Adaptation Networks", Proceedings of the 32 nd International Conference on Machine Learning, 37:1-9.
Ma et al., (2015) "Self-organizing human cardiac microchambers mediated by geometric confinement", Nat. Commun., 6:7413.
Machiraju et al., (2019) "Current methods for the maturation of induced pluripotent stem cell-derived cardiomyocytes", World J Stem Cells, 11(1):33-43.
Mahdessian et al., (2021) "Spatiotemporal dissection of the cell cycle with single-cell proteogenomics", Nature, 590(7847):649-654.
Maier et al., (2009) "Correlation of mRNA and protein in complex biological samples", FEBS Lett., 583(24):3966-73.
Masters et al., (2015) "Alzheimer's disease", Nat Rev Dis Primers, 1:15056.
Mathys et al., (2019) "Single-cell transcriptomic analysis of Alzheimer's disease", Nature, 570(7761): 332-337.
Higham et al., (2016) "Linear Algebra" Chapter 9 in: MATLAB Guide. 3rd Edition. Siam, Eds., pp. 135-158.
McCabe et al., (2005) "Automated quantitative analysis (AQUA) of in situ protein expression, antibody concentration, and prognosis", J Natl Cancer Inst., 97(24):1808-15.
McGuinness et al., (2014) "m6A RNA methylation: the implications for health and disease", Journal of Cancer Science and Clinical Oncology, 1(1):105.
McInnes et al., (2018) "UMAP: Uniform Manifold Approximation and Projection", Journal of Open Source Software, 3(29): 861.
McKinney et al., (2010) "Data structures for statistical computing in Python", Proc of the 9th Python in Science Conference, 56-61.
MacQueen et al., (1967) "Some methods for classification and analysis of multivariate observations", Berkeley Symp on Math Statist and Prob. 5.1:281-297.
Meservey et al., (2021) "mRNA Transport and Local Translation in Glia", Trends Cell Biol, 31(6):419-423.

(56) References Cited

OTHER PUBLICATIONS

Meyer et al., (2012) "Comprehensive analysis of mRNA methylation reveals enrichment in 3'UTRs and near stop codons", Cell, 149(7):1635-46.
Moen et al., (2019) "Deep learning for cellular image analysis", Nat Methods, 16(12):1233-1246.
Moon et al., (2019) "Visualizing structure and transitions in high-dimensional biological data", Nat. Biotechnol., 37:1482-1492.
Morisaki et al., (2016) "Real-time quantification of single RNA translation dynamics in living cells", Science, 352(6292):1425-9.
Müller et al., (2013) "Making myelin basic protein—from mRNA transport to localized translation", Front Cell Neurosci., 7:169.
Nitzan et al., (2019) "Gene expression cartography", Nature, 576(7785):132-137.
Padovan-Merhar et al., (2015) "Single Mammalian Cells Compensate for Differences in Cellular Volume and DNA Copy Number through Independent Global Transcriptional Mechanisms", Mol. Cell, 58:339-352.
Park et al., (2021) "Segmentation-free inference of cell types from in situ transcriptomics data", Nat Commun., 12(1):3545.
Pedregosa et al., (2011) "Scikit-learn: machine learning in Python" J Machine Learn Res., 12: 2825-2830.
Perez et al., (2011) "Python: an ecosystem for scientifc computing", Comput Sci Eng., 13(2): 13-21.
Perez et al., (2007) "IPython: A System for Interactive Scientific Computing", Computing in Science & Engineering, 9:21-29.
Perkel et al., (2019) "Starfish enterprise: finding RNA patterns in single cells", Nature, 572(7770):549-551.
Petukhov et al., (2020) "Bayesian segmentation of spatially resolved transcriptomics data", bioRxiv,pp. 1-34.
Pimenova et al., (2018) "Untangling Genetic Risk for Alzheimer's Disease", Biol Psychiatry, 83(4):300-310.
Qian et al., (2019) "Probabilistic cell typing enables fine mapping of closely related cell types in situ", Nat Methods, 17(1):101-106.
Qiu et al., (2022) "Mapping transcriptomic vector fields of single cells", Cell, 185(4):690-711.e45.
Qiu et al., (2020) "Massively parallel and time-resolved RNA sequencing in single cells with scNT-seq", Nat Methods, 17(10):991-1001.
Qu et al., (2014) "Layer-Enriched Tissue Dissection Of The Mouse Placenta In Late Gestation. In: The Guide To Investigation Of Mouse Pregnancy", Academic Press, Eds. 529-535.
Quadrato et al., (2016) "The promises and challenges of human brain organoids as models of neuropsychiatric disease", Nat Med, 22:1220-1228.
Rabani et al., (2011) "Metabolic labeling of RNA uncovers principles of RNA production and degradation dynamics in mammalian cells", Nat Biotechnol., 29(5): 436-442.
Rokach et al., (2005) "Clustering methods", In Data mining and knowledge discovery handbook, pp. 321-352.
Rodriguez et al., (2014) "Clustering by fast search and find of density peaks", Science, 344(6191):1492-1496.
Rosenberg et al., (2018) "Single-cell profiling of the developing mouse brain and spinal cord with split-pool barcoding", Science, 360(6385):176-182.
Roundtree et al., (2017) "Dynamic RNA Modifications in Gene Expression Regulation", Cell, 169(7):1187-1200.
Roundtree et al., (2017) "YTHDC1 mediates nuclear export of N(6)-methyladenosine methylated mRNAs", Elife, 6:e31311.
Rueden et al., (2017) "ImageJ2: ImageJ for the next generation of scientific image data", BMC Bioinformatics, 18(1):529.
Sakaue-Sawano et al., (2008) "Visualizing spatiotemporal dynamics of multicellular cell-cycle progression", Cell, 132(3):487-98.
Sakers et al., (2017) "Astrocytes locally translate transcripts in their peripheral processes", Proc Natl Acad Sci, 114(19):E3830-E3838.
Sanders et al., (2019) "A framework for the investigation of rare genetic disorders in neuropsychiatry", Nat Med, 25:1477-1487.
Saunders et al., (2018) "Molecular Diversity and Specializations among the Cells of the Adult Mouse Brain", Cell, 174(4):1015-1030.e16.
Scala et al., (2020) "Phenotypic variation of transcriptomic cell types in mouse motor cortex", Nature, 598: 144-150.
Seaborn (2024)"statistical data visualization" Seaborn: http://seaborn.pydata.org.
Sharp et al., (2020) "Cell division requires RNA eviction from condensing chromosomes", J. Cell Biol., 219(11):1-26.
Shi et al., (2017) "YTHDF3 facilitates translation and decay of N6-methyladenosine-modified RNA", Cell Res., 27(3):315-328.
Shi et al., (2019) "Where, When, and How: Context-Dependent Functions of RNA Methylation Writers, Readers, and Erasers", Mol. Cell, 74:640-650.
Schlegel et al., (2020) "Charged pore-lining residues are required for normal channel kinetics in the eukaryotic mechanosensitive ion channel MSL1", Channels, 14(1):310-325.
Schmidt et al., (2018) "Cell detection with star-convex polygons. Medical Image Computing and Computer Assisted Intervention Conference (MICCAI)", Lecture Notes in Computer Science book series, 11071:265-273.
Schwanhausser et al., (2011) "Global quantification of mammalian gene expression control", Nature, 473(7347):337-42.
Shah et al., (2017) "seqFISH accurately detects transcripts in single cells and reveals robust spatial organization in the hippocampus", Neuron, 94(4):752-758.e1.
Sherman et al., (2021) "DAVID: a web server for functional enrichment analysis and functional annotation of gene lists (2021 update)", Nucleic Acids Research, 50(W1):W216-W221
Seabold et al., (2010) "Statsmodels: Econometric and statistical modeling with Python", Proceedings of the 9th Python in Science Conference, pp. 92-96.
Sountoulidis et al., (2020) "Scrinshot enables spatial mapping of cell states in tissue sections with single-cell resolution", PLOS Biology, 18(11):e3000675, XP055908911.
Sousa Abreu et al., (2009) "Global signatures of protein and mRNA expression levels", Mol Biosyst., 5(12):1512-26.
Stahl et al., (2016) "Visualization and analysis of gene expression in tissue sections by spatial transcriptomics", Science, 353(6294):78-82.
Stark et al., (2019) "RNA sequencing: the teenage years", Nat Rev Genet., 20(11):631-656.
Stickels et al., (2021) "Highly sensitive spatial transcriptomics at near-cellular resolution with Slide-seqV2", Nat Biotechnol., 39(3):313-319.
Strell et al., (2019) "Placing RNA in context and space—methods for spatially resolved transcriptomics", FEBS J., 286(8):1468-1481.
Stuart et al., (2019) "Comprehensive integration of single-cell data", Cell, 177(7):1888-1902.e21.
Stuart et al., (2019) "Integrative single-cell analysis", Nat Rev Genet., 20(5):257-272.
Styren et al., (2000) "X-34, a fluorescent derivative of Congo red: a novel histochemical stain for Alzheimer's disease pathology", J Histochem Cytochem., 48(9):1223-1232.
Sun et al., (2021) "Integrating barcoded neuroanatomy with spatial transcriptional profiling enables identification of gene correlates of projections", Nature Neuroscience, Nature Publishing Group US, 24(6):873-885.
Takebe et al., (2015) "Vascularized and complex organ buds from diverse tissues via mesenchymal cell-driven condensation", Cell Stem Cell, 16:556-565.
Tanenbaum et al., (2015) "Regulation of mRNA translation during mitosis", Elife, 4:e07957:1-19.
Tang et al., (2009) "mRNA-Seq whole-transcriptome analysis of a single cell", Nat Methods, 6:377-382.
Thomas et al., (2017) "A review on cell detection and segmentation in microscopic images", 2017 International Conference on Circuit, Power and Computing Technologies (ICCPCT), 5 pages.
Thirumurugan el al., (2013) "Click Chemistry for Drug Development and Diverse Chemical-Biology Applications", Chem. Rev., 113(7):1-75.
Tian et al., (2012) "Macroporous nanowire nanoelectronic scaffolds for synthetic tissues", Nat Mater, 11(11):986-994.
Tirosh et al., (2016) "Dissecting the multicellular ecosystem of metastatic melanoma by single-cell RNA-seq", Science, 352(6282):189-196.

(56) References Cited

OTHER PUBLICATIONS

Toga et al., (2006) "Towards multimodal atlases of the human brain", Nat Rev Neurosci., 7(12):952-966.
Traag et al., (2019) "From Louvain to Leiden: guaranteeing well-connected communities", Sci Rep., 9(1):5233.
Van Den Berge et al., (2020) "Trajectory-based differential expression analysis for single-cell sequencing data", Nat Commun., 11(1):1201.
Van Der Walt et al., (2014) "scikit-image: image processing in Python", Peer J., 2:e453.
Vaninsberghe et al., (2021) "Single-cell Ribo-seq reveals cell cycle-dependent translational pausing", Nature, 597(7877):561-565.
Van't Sant et al., (2021) "In vivo 5-ethynyluridine (EU) labelling detects reduced transcription in Purkinje cell degeneration mouse mutants, but can itself induce neurodegeneration", Acta Neuropathol Commun., 9(1):94.
Vercauteren et al., (2009) "Diffeomorphic demons: efficient non-parametric image registration", NeuroImage, 45:S61-S72.
Viventi et al., (2011) "Flexible, foldable, actively multiplexed, high-density electrode array for mapping brain activity in vivo", Nat Neurosci., 14(12):1599-605.
Vogel et al., (2012) "Insights into the regulation of protein abundance from proteomic and transcriptomic analyses", Nat Rev Genet., 13(4):227-32.
Wang et al., (2014) "N6-methyladenosine-dependent regulation of messenger RNA stability", Nature, 505(7481):117-120.
Weber et al., (2017) "Cell-accurate optical mapping across the entire developing heart", Elife 6, e28307.
Weigert et al., (2020) "Star-convex polyhedra for 3D object detection and segmentation in microscopy", in 2020 IEEE Winter Conference on Applications of Computer Vision (WACV) (IEEE, 2020), 3655-3662.
Williams et al., (2014) "Targeting and plasticity of mitochondrial proteins revealed by proximity-specific ribosome profiling", Science, 346(6210):748-751.
Widagdo et al., (2018) "The m6A-epitranscriptomic signature in neurobiology: from neurodevelopment to brain plasticity", J Neurochem., 147(2):137-152.
Wolf et al., (2018) "SCANPY: large-scale single-cell gene expression data analysis", Genome Biol., 19(1):15.
Wu et al., (2016) "Translation dynamaics of single mRNAs in live cells and neurons", Science, 352(6292):14300-14305.
Xia et al., (2019) "Spatial transcriptome profiling by MERFISH reveals subcellular RNA compartmentalization and cell cycle-dependent gene expression", Proc Natl Acad Sci, 116(39):19490-19499.
Xiao et al., (2016) "Nuclear m(6)A Reader YTHDC1 Regulates mRNA Splicing", Mol Cell., 61(4):507-519.
Xu et al. (2020) "Behavioral state coding by molecularly defined paraventricular hypothalamic cell type ensembles", Science 370(6514): eabb2494.
Yan et al., (2016) "Dynamics of Translation of Single mRNA Molecules In Vivo", Cell, 165(4):976-989.
Yao et al., (2021) "A taxonomy of transcriptomic cell types across the isocortex and hippocampal formation", Cell, 184(12):3222-3241.e26.
Zechel et al., (2014) "Topographical transcriptome mapping of the mouse medial ganglionic eminence by spatially resolved RNA-seq", Genome Biol., 15(10):486.
Zeisel et al., (2018) "Molecular Architecture of the Mouse Nervous System", Cell, 174(4):999-1014.e22.
Zhang et al., (2019) "Functional cardiac fibroblasts derived from human pluripotent stem cells via second heart field progenitors", Nat. Commun., 10:2238.
Zhao et al., (2017) "m6A-dependent maternal mRNA clearance facilitates zebrafish maternal-to-zygotic transition", Nature, 542(7642):475-478.
Zhao et al., (2016) "Post-transcriptional gene regulation by mRNA modifications", Nat Rev Mol Cell Biol., 18(1):31-42.
Zhou et al., (2020) "Encoding Method of Single-cell Spatial Transcriptomics Sequencing", Int J Biol Sci., 16(14):2663-2674.
Zhou et al., (2020) "Human and mouse single nucleus transcriptomics reveal TREM2-dependent and TREM2-independent cellular responses in Alzheimer's disease", Nat Med., 26(1):131-142.
Zhu et al., (2020) "Single-cell multimodal omics: the power of many", Nat Methods., 17(1):11-14.
Bagasra, (2007) "Protocols for the in situ PCR-amplification and detection of mRNA and DNA sequences", Nat Protocols, 2(11):2782-2795.
Achim et al. (2015) "High-throughput spatial mapping of single-cell RNA-seq data to tissue of origin", Nature biotechnology, 33:5 503-509.
Baner et al. (1998) "Signal amplification of padlock probes by rolling circle replication", Nucleic acids research, 26:22 5073-5078.
Bleton (2016) "Heloise et al. Cognitive Tasks and Cerebral Blood Flow Through Anterior Cerebral Arteries: a Study via Functional Transcranial Doppler Ultrasound Recordings", BMC Medical Imaging, 16: 1-12.
Boersma et al. (2019) "Multi-color single-molecule imaging uncovers extensive heterogeneity in mRNA decoding", Cell, 178:2 458-472, e1-e19.
Burke et al. (2017) "A Fluorescence in situ hybridization method to quantify mRNA translation by visualizing ribosome-mRNA interactions in single cells", ACS central science, 3:5 425-433.
Cao et al. (2019) "The single-cell transcriptional landscape of mammalian organogenesis", Nature, 566: 7745 496-502.
Faruqi et al. (2001) "High-throughput genotyping of single nucleotide polymorphisms with rolling circle amplification", BMC genomics, 2:4 1-10.
Hrvatin et al. (2018) "Single-cell analysis of experience-dependent transcriptomic states in the mouse visual cortex", Nature neuroscience, 21:1 120-129.
Lizardi et al. (1998) "Mutation Detection and Single-molecule Counting Using Isothermal Rolling-circle Amplification", Nature Genetics, 19:3 225-232.
Moffitt et al. (2018) "Molecular spatial and functional single-cell profiling of the hypothalamic preoptic region", Science, 362:6416 eaau5324 1-14.
PCT/US2020/055800 International Search Report and Written Opinion dated Feb. 22, 2021.
PCT/US2022/030232 International Search Report and Written Opinion dated Oct. 26, 2022.
PCT/US2022/030321 International Search Report and Written Opinion dated Oct. 6, 2022.
PCT/US2022/030363 International Search Report and Written Opinion dated Sep. 1, 2022.
PCT/US2022/030370 International Search Report and Written Opinion dated Sep. 1, 2022.
PCT/US2022/030374 International Search Report and Written Opinion dated Sep. 1, 2022.
PCT/US2024/046583 International Search Report and Written Opinion dated Jan. 2, 2025.
PCT/US2024/060469 International Search Report and Written Opinion dated May 7, 2025.
Rosales (2016) "The design of reversible hydrogels to capture extracellular matrix dynamics", Nature Reviews Materials 1:2 15012 1-15.
Schweitzer et al. (2000) "Immunoassays with rolling circle DNA amplification: a versatile platform for ultrasensitive antigen detection", Proceedings of the National Academy of Sciences, 97:18 10113-10119.
Schweitzer et al. (2002) "Multiplexed protein profiling on microarrays by rolling-circle amplification", Nature biotechnology, 20:4 359-365.
Tam et al. (2017) "Engineering cellular microenvironments with photo-and enzymatically responsive hydrogels: toward biomimetic 3D cell culture models", Accounts of chemical research, 50:4 703-713.
Wang et al. (2020) "Spatial organization of the transcriptome in individual neuros", BioRxiv, 1-45.
Weibrecht et al. (2012) "Visualising individual sequence-specific protein-DNA interactions in situ", New biotechnology, 29:5 589-598.

(56) References Cited

OTHER PUBLICATIONS

Wetmur (1991) "DNA probes: applications of the principles of nucleic acid hybridization", Critical Reviews in Biochemistry and Molecular Biology, 26:3-4 227-259.
Zeisel et al. (2015) "Cell types in the mouse cortex and hippocampus revealed by single-cell RNA-seq", Science, 347:6226 1138-1142.
Zhang et al. (2016) "Proximity-dependent Assay for Specific RNA-protein Interactions in Intact Cells", RNA, 22:11 1785-1792.
U.S. Appl. No. 18/564,338, filed Nov. 27, 2023.
U.S. Appl. No. 18/682,160, filed Feb. 8, 2024.
Angelo et al. (2014) "Multiplexed ion beam imaging (MIBI) of human breast tumors", Nat Med. pp. 436-442, 20(4), Springer, Berlin, Germany.
Alon et al., (2021) "Expansion sequencing: Spatially precise in situ transcriptomics in intact biological systems", Science, 371(481):1-14.
Bendall et al.(2011) "Single-cell mass cytometry of differential immune and drug responses across a human hematopoietic continuum", Science, pp. 687-696, vol. 332, Issue 6030, American Association for the Advancement of Science, Washington, D.C.
Chen et al., (2015) "Spatially resolved, highly multiplexed RNA profiling in single cells.", Science, 348:aaa6090.
Chen et al. (2016) Nanoscale imaging of RNA with expansion microscopy. Nat. Methods 13:679-684.
Chen et al., (2018) "Efficient in situ barcode sequencing using padlock probe-based BaristaSeq", Nucleic Acids Res, 46(4):1-10.
Chen et al., (2019) "High-Throughput Mapping of Long-Range Neuronal Projection Using In Situ Sequencing", Cell, 179(3):772-786.
Chen et al., (2024) "Branched chemically modified poly(A) tails enhance the translation capacity of mRNA", Nature Biotechnology, pp. 1-29.
Clausson et al., (2015) "Compaction of rolling circle amplification products increases signal integrity and signal-to-noise ratio", Scientific reports, 5(12317):1-10.
Crosetto et al., (2015) "Spatially resolved transcriptomics and beyond.", Nat Rev Genet, 16(1):57-66.
Fredriksson et al. (2002) "Protein detection using proximity-dependent DNA ligation assays", Nat Biotechnol, pp. 473-477, 20, Springer, Berlin, Germany.
Flow cytometry from Wikipedia. Printed on Jul. 6, 2020.
Gyllborg et al., (2020) "Hybridization-based in situ sequencing (HybISS) for spatially resolved transcriptomics in human and mouse brain tissue", Nucleic Acids Research, 48(19)1-11.
He et al., (2021) "ClusterMap for multi-scale clustering analysis of spatial gene expression", Nature Communications, 12(5909):1-13.
Ke et al., (2013) "In situ sequencing for RNA analysis in preserved tissue and cells.", Nat. Methods, 10:857-860.
Kebschull et al., (2020) "Cerebellar nuclei evolved by repeatedly duplicating a conserved cell-type set", Science 370(6523):1-26.
Larsson et al.(2010) "In situ detection and genotyping of individual mRNA molecules", Nature Methods, pp. 395-397, (7), Nature, London, United Kingdom.
Lee et al., (2014) Highly multiplexed subcellular RNA sequencing in situ., Science, 343:1360-1363.
Lee et al., (2015) "Fluorescent in situ sequencing (FISSEQ) of RNA for gene expression profiling in intact cells and tissues.", Nat. Protoc. 10:442-458.
Lein et al., (2017) "The promise of spatial transcriptomics for neuroscience in the era of molecular cell typing."Science, 358:64-69.
Lerner et al., (2016) "Communication in neural circuits: tools, opportunities, and challenges.", Cell 164:1136-1150.
Lubeck et al., (2012) "Single-cell in situ RNA profiling by sequential hybridization.", Nat. Methods, 9:743-748.
Millard et al., 2006 "Detection of infectious haematopoietic necrosis virus and infectious salmon anameia virus by molecular padlock amplification". Journal of Fish Diseases, vol. 29, pp. 201-213.
Moffitt et al., (2016) "High-performance multiplexed fluorescence in situ hybridization in culture and tissue with matrix imprinting and clearing.", Proc. Natl. Acad. Sci. U.S.A. 113:14456-14461.
Mondal et al., (2018) "Highly multiplexed single-cell in situ RNA and DNA analysis with bioorthogonal cleavable fluorescent oligonucleotides", Chem. Sci, 9:2909-2917.
Mota et al., (2022) "Simultaneous visualization of DNA loci in single cells by combinatorial multi-color iFISH", Scientific data, 9(47):1-15.
Nawy et al., (2014) "In situ sequencing", Nat Methods, 11(1):29.
Nguyen et al., (2020) "3D mapping and accelerated super-resolution imaging of the human genome using in situ sequencing", Nature methods, 17(8):822-832.
Payne et al., (2021) "In situ genome sequencing resolves DNA sequence and structure in intact biological samples", Science, 371(908):1-14.
Player et al. (2001) "Single-copy gene detection using branched DNA (bDNA) in situ hybridization", J. Histochem. Cytochem, pp. 603-612, vol. 49, Issue 5, The Histochemical Society, Inc., Bethesda, MD.
Porichis et al. (2014) "High-throughput detection of miRNAs and gene-specific mRNA at the single-cell level by flow cytometry", Nature Communications, pp. 1-24 5, 5641, Springer, Berlin, Germany.
PCT/US2019/025835, International Search Report dated Jul. 1, 2019, 1-2.
PCT/US20/55800 International Search Report, completed Jan. 3, 2021, published Apr. 22, 2021.
Li et al., (2023) "Multimodal Charting of Molecular and Functional Cell States via in Situ Electro-sequencing", Cell, 186(9):2002-2017.
Ren et al., (2023) "Spatiotemporally resolved Transcriptomics Reveals the Subcellular RNA Kinetic Landscape", Nature Methods, 20:695-705.
Shah et al., (2016) "Single-molecule RNA detection at depth by hybridization chain reaction and tissue hydrogel embedding and clearing." Development, 143:2862-2867.
Shi et al., (2023) "Spatial atlas of the mouse central nervous system at molecular resolution", Nature, 622:552-561.
Soderberg et al.,(2006) "Direct observation of individual endogenous protein complexes in situ by proximity ligation", Nat. Methods, pp. 995-1000, vol. 3, No. 12, Nature, London, United Kingdom.
Sui et al., (2024) "Scalable Spatial Single-cell Transcriptomics and Translatomics in 3d Thick Tissue Blocks", Biorxiv: the Preprint Server for Biology, pp. 1-37.
Sylwestrak et al., (2016) "Multiplexed intact-tissue transcriptional analysis at cellular resolution.", Cell 164:792-804.
Sylwestrak et al., (2022) "Cell-type-specific population dynamics of diverse reward computations", Cell, 185, 3568-3587.
Wang et al., (2018) "Three-dimensional intact-tissue sequencing of single cell transcriptional states.", Science, 361 (6400):1-22.
Wolf-Yadlin et al. (2006) "Effects of HER2 overexpression on cell signaling networks governing proliferation and migration", Mol Syst Biol, vol. 2, Issue 1, Nature, London, United Kingdom.
Weibrecht et al. (2013) "In situ detection of individual mRNA molecules and protein complexes or post-translational modifications using padlock probes combined with the in situ proximity ligation assay.", Nature Protocols, vol. 8, No. 2, pp. 355-372.
Wu et al., (2023) "Development of Multiomics in situ Pairwise Sequencing (MiP-Seq) for Single-cell Resolution Multidimensional Spatial Omics", bioRxiv, pp. 1-66.
Wang et al., (2024) "Spatial multi-omics at subcellular resolution via high-throughput in situ pairwise sequencing", Nature Biomedical Engineering, 8, pp. 872-889.
Zeng et al., (2023) "Integrative in situ mapping of single-cell transcriptional states and tissue histopathology in an Alzheimer's disease model", Nature Neuroscience, 26(3):430-446.
Zeng et al., (2023) "Spatially resolved single-cell translatomics at molecular resolution", Science, pp. 1-23.
Zhong et al., (2001) "Visualization of ollgonucleotide probes and point mutations in interphase nuclei and DNA fibers using rolling circle DNA amplification.", Proc Natl Acad Sci USA, 98(7):3940-3945.

(56) References Cited

OTHER PUBLICATIONS

Zhang et al., (2018) "Detection of nucleic acids with a novel stem-loop primer rolling circle amplification technique.", Biotechniques, 64(2):69-80.
Zhang et al., (2013) "A Study of HdEGF1, an EGF-related Gene in the Lower Digestive Tract from Small Abalone Haliotis diversicolor", Journal of Xiamen University, 52(4):1-9.
U.S. Appl. No. 18/682,160, filed Feb. 8, 2024, Xiao Wang.
U.S. Appl. No. 19/236,720, filed Jun. 12, 2025, Fu; Ye.
BR112023024320-3 Office Action with Search Report dated Apr. 10, 2026.
Wang, Xiao et al. Supplemental Information: Three-dimensional intact-tissue sequencing of single-cell transcriptional states. Science 361(6400): eaat5691, 1-39 (2018).
Bandura et al., Mass cytometry: technique for real time single cell multitarget immunoassay based on inductively coupled plasma time-of-flight mass spectrometry. Analytical Chemistry 81: 6813-6822 (2009).
Oligonucleotide Definition. Merriam-Webster, [retrieved on 2017-08-23]. Available at URL: https://www.merriam-webster.com/dictionary/oligonucleotide p. 1.
Allen Mouse Brain Atlas, Data Portal 2004; [retrieved on 2025-10-03], Available at URL:https://mouse.brain-map.org/ pp. 1-2.
Alpert, N.M et al. The principal axes transformation -- a method for image registration. Journal of nuclear medicine : official publication, Society of Nuclear Medicine 31(10):1717- 1722 (1990).
Avey, Denis et al. Single-cell RNA-seq uncovers a robust transcriptional response to morphine by glia. Cell reports 24(13):3619-3629, e1-e4 (2018).
Bevis, Brooke J. and Benjamin S Glick. Rapidly maturing variants of the Discosoma red fluorescent protein (DsRed) 20(1):83-87 (2002).
Borden, Elizabeth S et al. Neoantigen fitness model predicts lower immune recognition of cutaneous squamous cell carcinomas than actinic keratoses. Frontiers in Immunology 10:2799, 1-11 (2019).
Braasch, Dwaine A, and David R. Corey. Novel antisense and peptide nucleic acid strategies for controlling gene expression. Biochemistry 41(14):4503-4510 (2002).
Buchwalow, Igor, and W.Bocker. Immunohistochemistry: Basics and Methods. Springer- Verlag Berlin Heidelberg 4(13):109-127 (2010).
Chan, Ken Y., et al. Engineered AAVs for efficient noninvasive gene delivery to the central and peripheral nervous systems. Nature neuroscience 20.8: 1172-1179. (2017).
Chen, Renchao et al. Decoding molecular and cellular heterogeneity of mouse nucleus accumbens. Nature neuroscience 24(12): 1757-1771 (2021).
Cheng, Yubao, et al. Sequencing-free whole-genome spatial transciptomics at single-molecule resolution. Cell 188(24):6953-6970 (2025).
El-Nachef, Danny et al. High-resolution 3D fluorescent imaging of intact tissues. International journal of cardiology and cardiovascular diseases 1(1):1-14 (2021).
Englisch, Uwe, and Dieter H. Gauss. Chemically Modified Oligonucleotides as Probes and Inhibitors. Angewandte Chemie International 30(6):613-629 (1991).
Fang, Rongxin et al. Three-dimensional single-cell transcriptome imaging of thick tissues. Elife 12:RP90029, 1-18 (2024).
Ferkowicz, Michael J et al. Large-scale, three-dimensional tissue cytometry of the human kidney: a complete and accessible pipeline. Laboratory investigation 101(5):661-676 (2021).
Fujimoto, Kenzo et al. Site-specific cytosine to uracil transition by using reversible DNA photo-crosslinking. ChemBioChem 11(12):1661-1664 (2010).
Fujita, Hideki et al. Langerhans cells from human cutaneous squamous cell carcinoma induce strong type 1 immunity. Journal of investigative dermatology 132(6):1645-1655 (2012).
Gandin, Valentina et al. Deep-tissue spatial omics: imaging whole-embryo transcriptomics and subcellular structures at high spatial resolution. bioRxiv :2024-05 (2024).
Guenthner, Casey J et al. Permanent genetic access to transiently active neurons via TRAP: targeted recombination in active populations. Neuron 78(5): 773-784 (2013).
Hein, Christopher D et al. Click Chemistry, a Powerful Tool for Pharmaceutical Sciences. Pharmaceutical Research 25(10):2216-2230 (2008).
Hong, In Seok, and Marc M. Greenberg. DNA interstrand cross-link formation initiated by reaction between singlet oxygen and a modified nucleotide. Journal of the American Chemical Society 127(30):10510-10511 (2005).
Huh, Kang Moo, and You Han Bae. Synthesis and characterization of poly (ethylene glycol)/poly (L-lactic acid) alternating multiblock copolymers. Polymer 40(22):6147-6155 (1999).
Jerby-Arnon et al.: A Cancer Cell Program Promotes T Cell Exclusion and Resistance to Checkpoint Blockade. Cell 175: 984-997.e24 ((2018).
Ji, Andrew L et al. Multimodal Analysis of Composition and Spatial Architecture in Human Squamous Cell Carcinoma. Cell 182(6):1661-1662 (2020).
Jones, Keith et al. Glowing jellyfish, luminescence and a molecule called coelenterazine. Trends in Biotechnology 17(12):477-481 (1999).
Joost, Simon et al. The molecular anatomy of mouse skin during hair growth and rest. Cell stem cell 26(3):441-457 (2020).
Klechevsky, Eynav et al. Functional specializations of human epidermal Langerhans cells and CD14+ dermal dendritic cells. Immunity 29(3):497-510 (2008).
Klein, Stefan et al. elastix: a toolbox for intensity-based medical image registration. IEEE transactions on medical imaging 29(1):196-205 (2010). Published Online Nov. 17, 2009.
Korsunsky, Ilya et al. Fast, sensitive and accurate integration of single-cell data with Harmony. Nature Methods 16(12): 1289-1296 (2019).
Koshkin, Alexei A et al. LNA (Locked Nucleic Acids): Synthesis of the Adenine, Cytosine, Guanine, 5-methylcytosine, Thymine and Uecognition. Tetrahedron 54(14):3607-3630 (1998).
Kroschwitz, I. Jacqueline. Polynuclieotids. The Concise Encyclopedia Of Polymer Science And Engineering. A Wiley-Interscience Publication John Wiley & Sons (pp. 858-859) (1990).
Lee, Wonjae et al. Hydrophobic nanoparticles improve permeability of cell-encapsulating poly (ethylene glycol) hydrogels while maintaining patternability. Proceedings of the National Academy of Sciences 107(48):20709-20714 (2010).
Li, Weizhe et al. High-dimensional cell-level analysis of tissues with Ce3D multiplex vol. imaging. Nature Protocols 14(6):1708-1733 (2019).
Lowe, Rohan et al. Transcriptomics technologies. PLOS computational biology 13(5):e1005457, 1-23 (2017).
Lubeck, Eric, and Long Cai. Single-cell systems biology by super-resolution imaging and combinatorial labeling. Nature methods 9(7):743-748 (2012).
Lubeck, Eric et al. Single-cell in situ RNA profiling by sequential hybridization. Nature methods 11(4):360-361 (2014).
Maintz, J.B. Antoine, and Max A. Viergever. A survey of medical Image Registration. Medical Image Analysis 2(1):1-36 (1998).
Martin, Pierre. Ein neuer Zugang zu 2'-O-Alkylribonucleosiden and Eigenschaften deren Oligonucleotide. Helv. Chim. Acta 78(2):486-504 (1995).
Matz, Mikhail V et al. Fluorescent proteins from nonbioluminescent Anthozoa species. Nature biotechnology 17(10):969-973 (1999).
Morisaki, Tatsuya et al. Real-time quantification of single RNA translation dynamics in living cells. Science 352(6292):1425-1429 (2016). With Supplemental Materials.
Mount, Natalie M et al. Cell-based therapy technology classifications and translational challenges. Philosophical Transactions of the Royal Society B: Biological Sciences 370(1680):20150017, 1-16 (2015).
Nagai, Takeharu et al. A variant of yellow fluorescent protein with fast and efficient maturation for cell-biological applications. Nature biotechnology 20(1):87-90 (2002).
Nejad, Maryam Imani et al. Interstrand DNA cross-links derived from reaction of a 2- aminopurine residue with an abasic site. ACS chemical biology 14(7):1481-1489 (2019).

(56) References Cited

OTHER PUBLICATIONS

Nguyen, Annalee W. and Patrick S Daugherty. Evolutionary optimization of fluorescent proteins for intracellular FRET. Nature biotechnology 23(3):355-360 (2005).
Norris, Sam et al. Whole Tissue Imaging of Cellular Boundaries at Sub-Micron Resolutions for Automatic Cell Segmentation: Applications in Epithelial Bending of Ectodermal Appendages. bioRxiv : 1-18 (2024).
Oligonucleotide. Wikipedia, [retrieved on 2019-02-17]. Available at URL: https://en.wikipedia.org/wiki/Oligonucleotide pp. 1-3.
Ornatsky, Olga et al. Highly multiparametric analysis by mass cytometry. Journal of immunological methods 361(1-2):1-20 (2010).
PCT/US2017/019443 International Preliminary Report on Patentability dated Sep. 7, 2018.
PCT/US2017/019443 International Search Report and Written Opinion dated May 19, 2017.
PCT/US2019/025835 International Preliminary Report on Patentability dated Oct. 22, 2020.
PCT/US2020/055800 International Preliminary Report on Patentability dated Apr. 28, 2022.
PCT/US2022/030232 International Preliminary Report on Patentability dated Nov. 30, 2023.
PCT/US2022/030321 International Preliminary Report on Patentability dated Nov. 30, 2023.
PCT/US2022/030363 International Preliminary Report on Patentability dated Nov. 30, 2023.
PCT/US2022/030370 International Preliminary Report on Patentability dated Nov. 30, 2023.
PCT/US2022/030374 International Preliminary Report on Patentability dated Nov. 30, 2023.
PCT/US2024/036943 International Search Report and Written Opinion dated Oct. 18, 2024.
PCT/US2025/018783 International Search Report and Written Opinion dated Jun. 27, 2025.
PCT/US2025/030656 International Search Report and Written Opinion dated Aug. 7, 2025.
Pelizzari, Charles A et al. Accurate three-dimensional registration of Ct, Pet, and/or MR images of the brain. Journal of computer assisted tomography 13(1):20-26 (1989).
Ren, Jingyi et al. Spatiotemporally resolved transcriptomics reveals the subcellular RNA kinetic landscape. Nature Methods 20(5):695-705 (2023).
Rizzo, Megan A et al. An improved cyan fluorescent protein variant useful for FRET. Nature biotechnology 22(4):445-449 (2004).
Robles-Remacho, Agustin et al. Spatial Transcriptomics: Emerging Technologies in Tissue Gene Expression Profiling. Analytical chemistry 95(42): 15450-15460 (2023).
Sakaguchi, Richi et al. Bright multicolor labeling of neuronal circuits with fluorescent proteins and chemical tags. Elife 7:e40350,1-28 (2018).
Samusik, Nikolay et al. Automated mapping of phenotype space with single-cell data. Nature methods 13(6):493-496 (2016).
Sanz, Elisenda et al. Cell-type-specific isolation of ribosome-associated mRNA from complex tissues. Proceedings of the National Academy of Sciences of the United States of America 106(33):13939-13944 (2009).
Savell, Katherine E et al. A dopamine-induced gene expression signature regulates neuronal function and cocaine response. Science advances 6(26):eaba4221, 1-15 (2020).
Scheffer, Louis K et al. A connectome and analysis of the adult Drosophila central brain. elife 9:e57443, 1-83 (2020).
Shaner, Nathan C et al. A guide to choosing flourescent proteins. Nature Methods 2(12):905-909 (2005).
Shkrob, Maria A et al. Far-red fluorescent proteins evolved from a blue chromoprotein from Actinia equina. The Biochemical journal 392(Pt 3):649-654 (2005).
Singh, Sanjay K et al. LNA (locked nucleic acids): Synthesis and High-affinity Nucleic Acid Recognition. Chemical Communications 4:455-456 (1998).
Stevens, Kristof, and Annemieke Madder. Furan-modified oligonucleotides for fast, high- yielding and site-selective DNA inter-strand cross-linking with non-modified complements. Nucleic Acids Research 37(5): 1555-1565 (2009).
Sui, Xin, et al. Scalable spatial single-cell transcriptomics and translatomics in 3D thick tissue blocks. Nature Methods: 1-11. (2025).
Tainaka, Kazuki et al. Whole-body imaging with single-cell resolution by tissue decolorization. Cell 159(4):911-924 (2014).
Takko, Heli et al. ShapeMetrics: A userfriendly pipeline for 3D cell segmentation and spatial tissue analysis. Developmental biology 462(1):7-19 (2020).
Taranda, Julian et al. Combined whole-organ imaging at single-cell resolution and immunohistochemical analysis of prostate cancer and its liver and brain metastases. Cell reports 37(7):110027, 1-14 (2021).
Tasic, Bosiljka et al. Shared and distinct transcriptomic cell types across neocortical areas. Nature 563(7729): 72-78 (2018).
Tepper, James M et al. Heterogeneity and diversity of striatal GABAergic interneurons: update 2018. Frontiers in neuroanatomy 12:91, 1-14 (2018).
Tomer, Raju et al. Advanced CLARITY for rapid and high-resolution imaging of intact tissues. Nature protocols 9(7):1682-1697 (2014).
U.S. Appl. No. 17/768,996 Non-Final Office Action dated Aug. 22, 2025.
U.S. Appl. No. 18/277,950 Office Action dated Oct. 1, 2025.
U.S. Appl. No. 18/561,643 Office Action dated Dec. 4, 2025.
U.S. Appl. No. 19/230,050 Office Action dated Sep. 4, 2025.
U.S. Appl. No. 19/236,720 Office Action dated Aug. 7, 2025.
U.S. Appl. No. 19/236,732 Office Action dated Aug. 8, 2025.
U.S. Appl. No. 19/270,264 Notice of Allowance dated Sep. 8, 2025.
Vickovic, Sanja et al. High-definition spatial transcriptomics for in situ tissue profiling. Nature methods 16(10):987-990 (2019).
Wahlestedt, Claes et al. Potent and Nontoxic Antisense Oligonucleotides Containing Locked Nucleic Acids. Pnas USA 97(10):5633-5638 (2000).
Wang, Jing et al. Cyclohexene nucleic acids (CeNA): serum stable oligonucleotides that activate RNase H and increase duplex stability with complementary RNA. Journal of the American Chemical Society 122(36):8595-8602 (2000).
Wang, Lei et al. Evolution of new nonantibody proteins via iterative somatic hypermutation. Proceedings of the National Academy of Sciences 101(48): 16745-16749 (2004).
Wang, Lili et al. Human CD4+ lymphocytes for antigen quantification: characterization using conventional flow cytometry and mass cytometry. Cytometry Part A 81(7):567-575 (2012).
Wang, Xiao et al. Supplementary Material: Three-dimensional Intact-tissue Sequencing of Single-cell Transcriptional States. Science 361(6400): eaat5691, 1-39 (2018).
Wang, Yuhan et al. EASI-FISH for thick tissue defines lateral hypothalamus spatio-molecular organization. Cell 184(26):6361-6377, e1-e24 (2021).
West, Jennifer L. and Jeffrey A. Hubbell. Polymeric Biomaterials with Degradation Sites for Proteases Involved in Cell Migration. Macromolecules 32(1): 241-244 (1999).
Wiedenmann, et al. A far-red fluorescent protein with fast maturation and reduced oligomerization tendency from Entacmaea quadricolor (Anthozoa, Actinaria). Proc Natl Acad Sci U S A 99(18):11646-11651 (2002).
Woods, Roger P et al. MRI-PET registration with automated algorithm. Journal of computer assisted tomography 17(4):536-546 (1993).
Xu, C. Shan et al. Enhanced FIB-SEM systems for large-vol. 3D imaging. elife 6:e25916, 1- 36 (2017).
Yang, Bin et al. Single-cell phenotyping within transparent intact tissue through whole-body clearing. Cell 158(4):945-958 (2014).
Yapp, Clarence et al. Highly Multiplexed 3D Profiling of Cell States and Immune Niches in Human Tumours. bioRxiv :1-53 (2023).
Yoshimura, Yoshinaga, and Kenzo Fujimoto. Ultrafast reversible photo-cross-linking reaction: toward in situ DNA manipulation. Organic letters 10(15):3227-3230 (2008).

(56) References Cited

OTHER PUBLICATIONS

Yoshimura, Yoshinaga et al. A New Approach for Reversible RNA Photocrosslinking Reaction: Application to Sequence-Specific RNA Selection. ChemBioChem 10(9):1473-1476 (2009).
Zeng, Hongkui, and Joshua R. Sanes. Neuronal cell-type classification: challenges, opportunities and the path forward. Nature Reviews Neuroscience 18(9):530-546 (2017).
Zeng, Hu et al. Integrative in situ mapping of single-cell transcriptional states and tissue histopathology in a mouse model of Alzheimer's disease. Nature neuroscience 26(3):430- 446 (2023).
Longin A., et al., " Comparison of anti-fading agents used in fluorescence microscopy: image analysis and laser confocal microscopy study", J. Histochem. Cytochem., vol. 41(12), pp. 1833-1840, (1993).
Chung et al., Structural and molecular interrogation of intact biological systems, Nature, 497(7449):332-7, (2013).
Maric et al., Whole-brain tissue mapping toolkit using large-scale highly multiplexed immunofluorescence imaging and deep neural networks, Nature Communication, 12, 1550 (2021).
Kim et al., Bleed-through correction for rendering and correlation analysis in multi-colour localization microscopy, HHS Public Access J Opt. Sep. 2013; 15(9):094011. doi: 10.1088/2040-8978/15/9/094011 (2015).

* cited by examiner

60X COLLAR HAS 1 O-RING, 40X HAS 2 O-RINGS

FEED COLLAR - DISPENSE/EXTRACTS AND CAN REPLENISH WHILE AT WORKING GAP TO COVER GLASS

VOLUMETRIC NEXT-GENERATION IN SITU SEQUENCER

BACKGROUND OF THE INVENTION

Biological samples contain complex and heterogenous genetic information spanning the length scales of individual cells and whole tissues. Spatial patterns of nucleic acids within a cell may reveal properties and abnormalities of cellular function; cumulative distributions of RNA expression may define a cell type or function; and systematic variation in the locations of cell types within a tissue may define tissue function. The combination of anatomical connectivity information encoded in nucleic acids and tissue-wide cell type distributions may span many tissue regions and sections. Techniques for in situ nucleic acid sequencing must therefore be able to bridge resolutions as small as individual molecules and as large as entire brains. Efficiently collecting and recording this information across orders-of-magnitude differences in lengths requires novel inventions to enhance the robustness, rapidity, automated-, and high throughput-nature of in situ sequencing techniques.

SUMMARY OF THE INVENTION

A sequencing device for automated in situ sequencing of volumetric tissue samples is provided. In particular, an automated volumetric in situ sequencing device capable of operating at high resolution on multiple samples in parallel is provided. The sequencing device combines automated immersion with automated in situ sequencing functions. The sequencing device is especially useful for combinatorial sequencing, which benefits from its high resolution capability. Methods of fabrication and use of the sequencer are also provided.

In one aspect, a sequencing device is provided, the device comprising: (a) an illumination and detection module comprising a spinning disk confocal component comprising a plurality of laser lines for illumination with flat illumination correction, wherein the plurality of laser lines are used to illuminate a sample with excitation light at one or more wavelengths, a bandpass emission filter, a long-pass image splitter, a first camera that detects fluorescence emissions in a first wavelength range and a second camera that detects fluorescence emissions in a second wavelength range, wherein the first camera and the second camera can detect emissions simultaneously; (b) a microscope module comprising a motorized stage capable of multi-axis positioning along x, y, and z axes, an objective Z drive, an objective turret wheel comprising multiple objectives, wherein each objective provides a different magnification, wherein one or more objectives are immersion objectives, wherein each immersion objective has an objective immersion collar and optics, wherein the optics route light from the objectives to the illumination and detection module; (c) an automated immersion media module comprising i) a container comprising immersion media, ii) fluidic lines coupled to the container and to the objective immersion collars of the objectives of the microscope module, wherein the fluidic lines carry immersion media to and from the objective immersion collars, wherein the immersion collars capture excess immersion media, and iii) a series of pumps connected to the fluidic lines and to a microcontroller, wherein the microcontroller controls the pumps addition and removal of the immersion media through the fluidic lines, wherein the automated immersion media module provides controlled volumes of the immersion media to the objective immersion collars at the tops of the objectives during imaging; (d a multi-well plate, wherein the motorized stage can be moved to position a well of the multi-well plate under the objective used for imaging; (e) a fluidic coupling tower, wherein the fluidic coupling tower is on top of the motorized stage and positions the fluidic lines in wells of the multi-well plate; (f) a fluidic management module comprising a symmetrical rotary valve comprising a rotary valve mechanism, a pump, wherein the pump is connected to the fluidic lines, and bubble detectors, wherein the bubble detectors are positioned on either side of the fluidic lines leading to the pump, wherein the fluidic management module allows unidirectional or bidirectional movement of reagents, buffers, and waste through the fluidic lines; (g) a reagent, buffer, and waste module comprising a i) sliding tray, wherein reagent cartridges and buffer cartridges can be positioned in the sliding tray and coupled to the fluidic management module, ii) a waste module comprising a waste container, wherein the waste container is coupled to a fluidic line from the fluid management pump, and iii) a capping mechanism, wherein the capping mechanism closes the waste container when the waste container is removed from the system for waste disposal and opens the waste container when the waste container is placed back into the system; (h) an electrical module comprising: i) a first firmware board controlling media dispensing from the automated immersion media module and ii) a second firmware board controlling the fluid management module and the reagent, buffer, and waste module, wherein the electrical module regulates power to the other modules of the system; and (i) a processor programmed to provide a user interface and operate the modules of the sequencing device.

In certain embodiments, the plurality of laser lines comprises at least 4 laser lines. In certain embodiments, the plurality of laser lines comprises at least 5 laser lines. In some embodiments, the bandpass emission filter is a penta-bandpass emission filter.

In certain embodiments, the motorized stage has a piezo z-axis.

In certain embodiments, the immersion media is water.

In certain embodiments, the immersion media is filtered and bubble-free.

In certain embodiments, the sequencing device further comprises an O-ring and a shrink-wrapped coating over each objective.

In certain embodiments, the sequencing device further comprises a pressure monitor to monitor pressure in the fluidic lines, wherein increases in pressure in a fluidic line can be used to detect a potential blockage of the fluidic line.

In certain embodiments, the sequencing device further comprises a plurality of light-emitting diodes (LEDs), wherein each LED can emit light to provide a status indication for the system.

In certain embodiments, the sequencing device further comprises a display component for displaying information and providing a user interface.

In certain embodiments, the processor is further programmed to perform steps comprising: (a) locating a selected sample in the multi-well plate; (b) detecting a signal in the XY plane from the selected sample at low magnification using widefield imaging mode acquisition with camera binning; (c) using the signal to segment an XY bounding box around the sample; (d) imaging the sample within the XY bounding box to produce an image, wherein imaging is performed in confocal imaging mode in Z at higher magnification than used in step (b) with camera binning in order to determine the approximate Z extent of the sample, wherein a single Z plane is collected through the midpoint of the Z extent previously determined and across the XY extent; (e) displaying the image produced in step (d); (f) providing an interface for a user to refine a desired XY region of interest in the sample to be further imaged during sequencing of the selected sample; (g) imaging the sample in the selected XY region of interest across the previously sampled Z extents; (h) calculating a volume of the region of interest in the sample and displaying the calculated sample volume of the region of interest to the user; (i) segmenting the image of the sample in the region of interest along the Z extents; (j) providing an interface to the user for the user to adjust the Z extents of the sample volume before beginning sequencing, wherein the imaging extents derived from the region of interest defined by the user are automatically converted into appropriate montaged fields of view for a given imaging objective and to adjust microscope stage positions, objective Z positioning, and piezo bounds for imaging of the region of interest along XYZ axes during sequencing; and (k) reiterating steps (a)-(j) to define regions of interest for each sample in the multi-well plate that the user intends to sequence.

In certain embodiments, the processor is further programmed to perform steps comprising: providing an interface to the user for the user to select one or more samples for sequencing and a sequencing protocol, wherein the user is limited in how many samples can be selected depending on amounts of buffer and reagents that are available and the selected sequencing protocol; providing constraints on total sequencing time, total data acquired, rate of acquisition, and maximum total volume of regions of interest across all samples that are to be sequenced and imaged, and suggesting protocols that maximize sequencing of desired regions of interest in samples within the constraints.

In certain embodiments, the processor is further programmed to optimize sample sequencing parallelization depending on number of samples to be sequenced and imaging types to be used in sequencing.

In certain embodiments, the processor is further programmed to perform steps comprising: performing a rapid confocal sweep in Z at a starting XY position of a given sample montage to determine a Z profile of the sample at the starting XY position; determining the sample top and bottom interface using a segmentation method; and setting the objective Z position at a fixed distance from the interface at the beginning of the sample montage, wherein drift in Z of the sample relative to the stage and the objective across rounds is reduced to below a selected tolerance to facilitate downstream subpixel registration across rounds during post-acquisition processing.

In certain embodiments, the sequencing is in situ sequencing of a target nucleic acid in a tissue sample. In some embodiments, the tissue sample is a thick tissue slice having a thickness of 50-200 μm. In other embodiments, the tissue sample is a thin tissue slice having a thickness of 5-20 μm. In some embodiments, the in situ sequencing is sequential or combinatorial in situ sequencing.

In another aspect, a method of using the sequencing device, described herein, is provided, the method comprising: loading samples into the multi-well plate; selecting which samples in the multi-well plate are sequenced; selecting a sequencing protocol; and sequencing nucleic acids in the selected samples using the sequencing device described herein. In certain embodiments, the sequencing is in situ sequencing of a target nucleic acid in a tissue sample. In some embodiments, the tissue sample is a thick tissue slice having a thickness of 50-200 μm. In other embodiments, the tissue sample is a thin tissue slice having a thickness of 5-20 μm. In some embodiments, the in situ sequencing is sequential or combinatorial in situ sequencing.

In another aspect, a computer implemented method is provided, the computer performing steps comprising: (a) locating a selected sample in the multi-well plate; (b) detecting a signal in the XY plane from the selected sample at low magnification using widefield imaging mode acquisition with camera binning; (c) using the signal to segment an XY bounding box around the sample; (d) imaging the sample within the XY bounding box to produce an image, wherein imaging is performed in confocal imaging mode in Z at higher magnification than used in step (b) with camera binning in order to determine the approximate Z extent of the sample, wherein a single Z plane is collected through the midpoint of the Z extent previously determined and across the XY extent; (e) displaying the image produced in step (d); (f) providing an interface for a user to select a desired XY region of interest in the sample to be further imaged during sequencing of the selected sample; (g) imaging the sample in the selected XY region of interest across the previously sampled Z extents; (h) calculating a sample volume of the region of interest and displaying the calculated sample volume of the region of interest to the user; (i) segmenting the image of the sample in the region of interest along Z extents; (j) providing an interface to the user for the user to adjust the Z extents of the sample volume before beginning sequencing, wherein the imaging extents derived from the region of interest defined by the user are automatically converted into appropriate montaged fields of view for a given imaging objective and to adjust microscope stage positions, objective Z positioning, and piezo bounds for imaging of the region of interest along XYZ axes during sequencing; and (k) reiterating steps (a)-(j) to define regions of interest for each sample in the multi-well plate that the user intends to sequence.

In another aspect, a computer implemented method is provided, the computer performing steps comprising: providing an interface to the user for the user to select one or more samples for sequencing and a sequencing protocol, wherein the user is limited in how many samples can be selected depending on amounts of buffer and reagents available and the selected sequencing protocol; providing constraints on total sequencing time, total data acquired, rate of acquisition, and maximum total volume of regions of interest across all samples that are to be sequenced and imaged, and suggesting protocols that maximize sequencing of desired regions of interest in samples within the constraints. In some embodiments, the computer is further programmed to optimize sample sequencing parallelization depending on number of samples to be sequenced and imaging types to be used in sequencing.

In another aspect, a computer implemented method is provided, the computer performing steps comprising: performing a rapid confocal sweep in Z at a starting XY position of a given sample montage to determine a Z profile of the sample at the starting XY position; determining the sample top and bottom interface using a segmentation method; and setting the objective Z position at a fixed distance from the interface at the beginning of the sample montage, wherein drift in Z of the sample relative to the stage and the objective across rounds is reduced to below a selected tolerance to facilitate downstream subpixel registration across rounds during post-acquisition processing.

In another aspect, a non-transitory computer-readable medium comprising program instructions that, when executed by a processor in a computer, causes the processor to perform any of the computer implemented methods, described herein, is provided.

In another aspect, an automated immersion media module comprising: (a) a container comprising immersion media; (b) fluidic lines coupled to the container and to the objective immersion collars of the objectives of the microscope module, wherein the fluidic lines carry immersion media to and from an objective immersion collar on an immersion objective, wherein the immersion collar captures excess immersion media; and (c) a series of pumps connected to the fluidic lines and to a microcontroller, wherein the microcontroller controls the pumps addition and removal of the immersion media through the fluidic lines, wherein the automated immersion media module provides controlled volumes of the immersion media to the objective immersion collars at the tops of the objectives during imaging.

In another aspect, a method of using the automated immersion media module is provided, the method comprising using the automated immersion media module to deliver immersion media to an objective immersion collar attached to an immersion objective of a microscope.

In another aspect, a fluidic management module is provided, the module comprising a symmetrical rotary valve comprising a rotary valve mechanism, a pump, wherein the pump is connected to the fluidic lines, and bubble detectors, wherein the bubble detectors are positioned on either side of the fluidic lines leading to the pump, wherein the fluidic management module allows bidirectional or unidirectional movement of reagents, buffers, and waste through the fluidic lines.

In another aspect, a reagent, buffer, and waste module is provided, the module comprising: (a) a sliding tray, wherein reagent cartridges and buffer cartridges can be positioned in the sliding tray and coupled to the fluidic management module; (b) a waste module comprising a waste container, wherein the waste container is coupled to a fluidic line from the fluid management pump; and (c) a capping mechanism, wherein the capping mechanism closes the waste container when the waste container is removed from the system for waste disposal and opens the waste container when the waste container is placed back into the system.

DETAILED DESCRIPTION OF THE INVENTION

Figure 1:
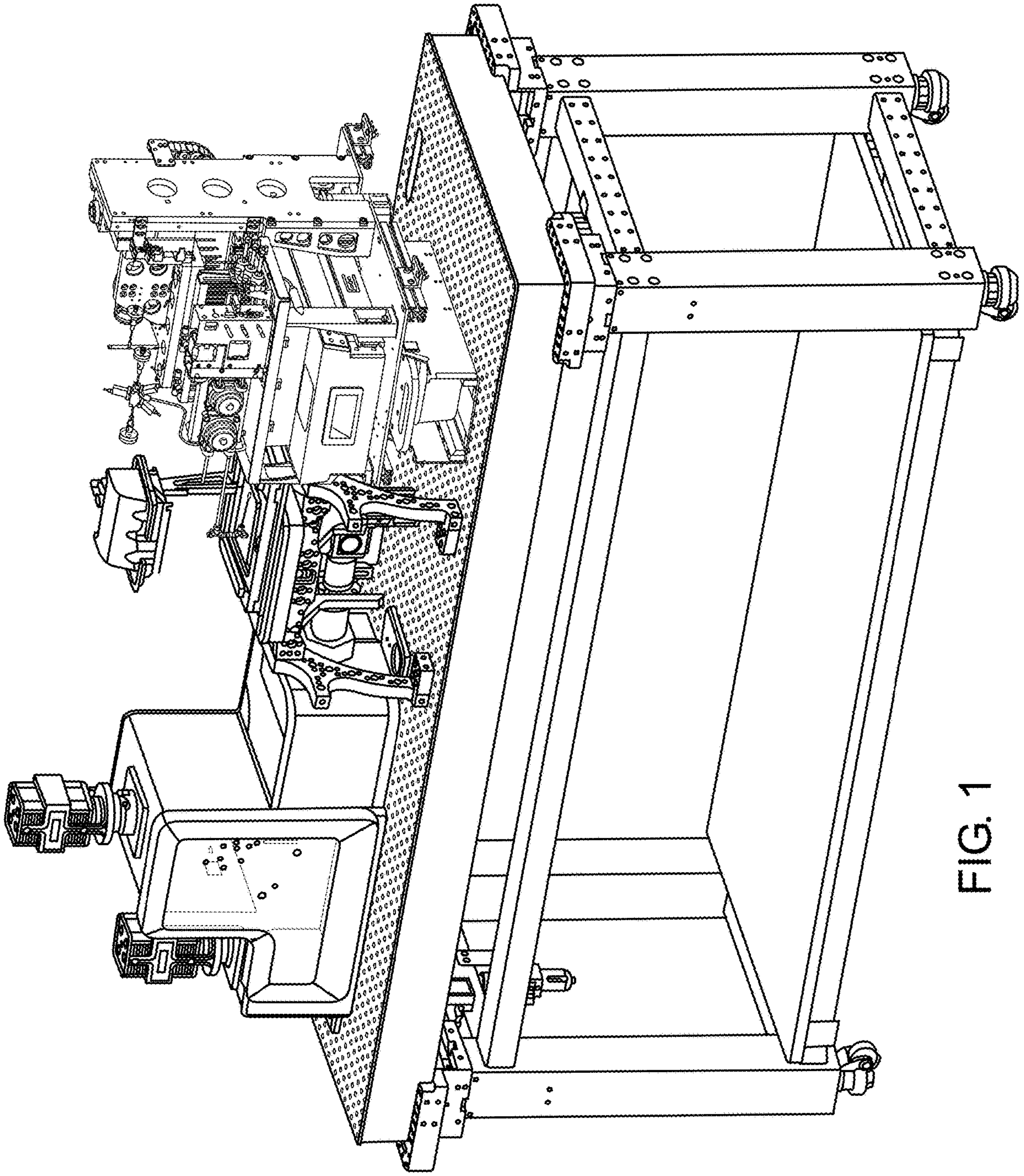
FIG. 1 shows the sequencing device including its various modules.
Figure 2:
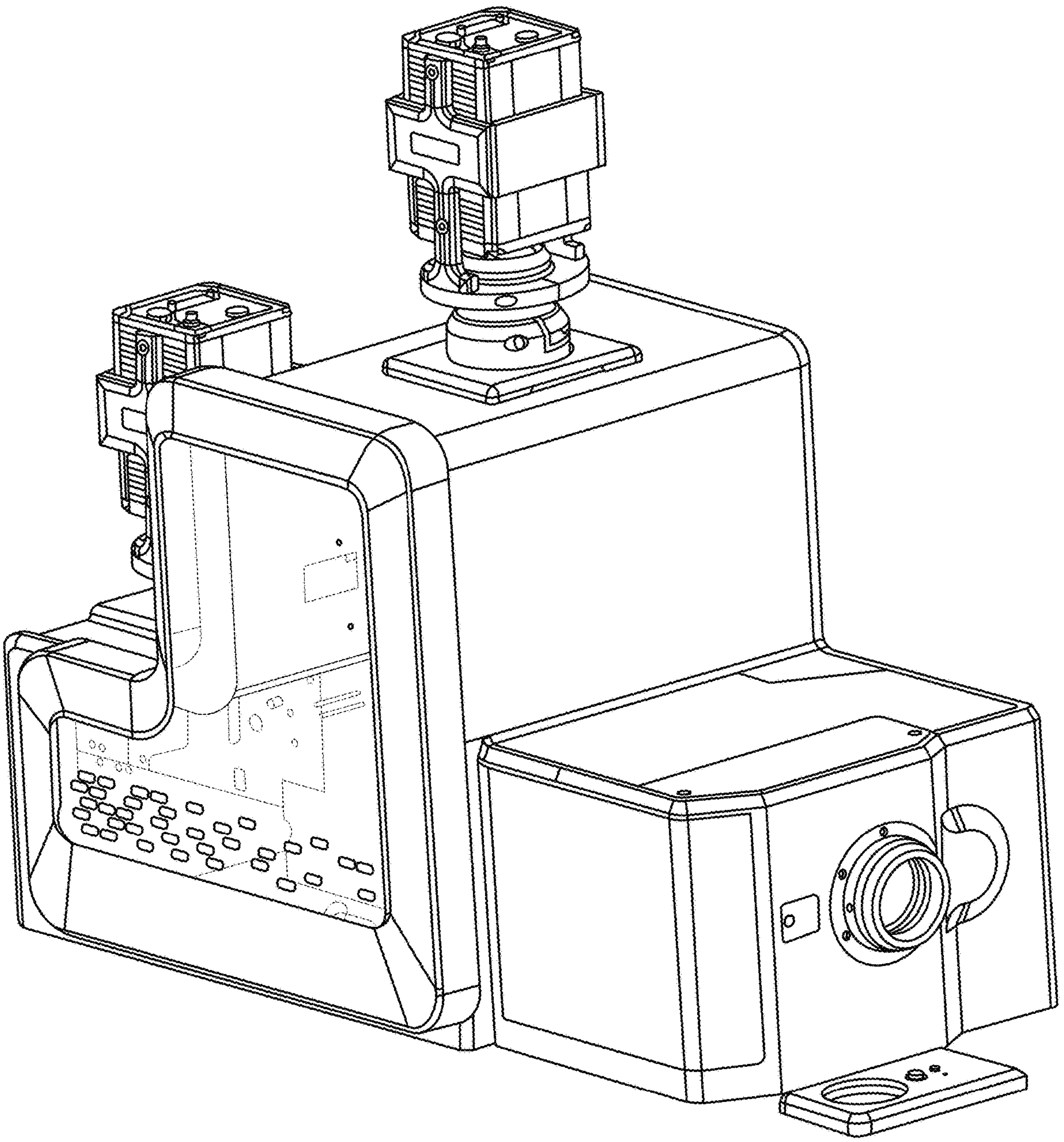
FIG. 2 shows a dual camera capable of dual imaging in widefield and confocal modes.
Figure 3:
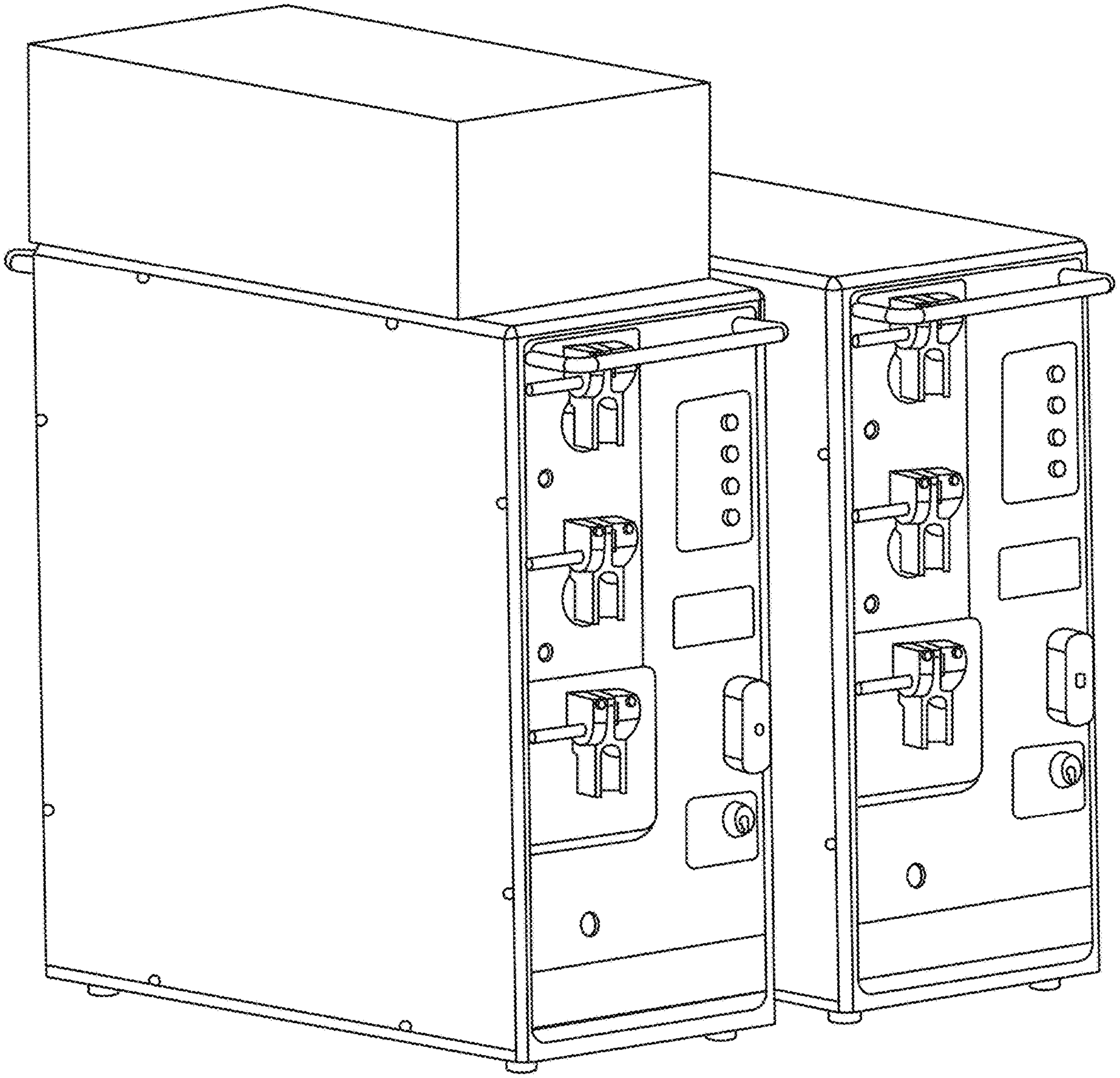
FIG. 3 shows 5 laser lines covering 405 nm, 488 nm, 561 nm, 637 nm, and 730 nm and a beam conditioning unit.
Figure 4:
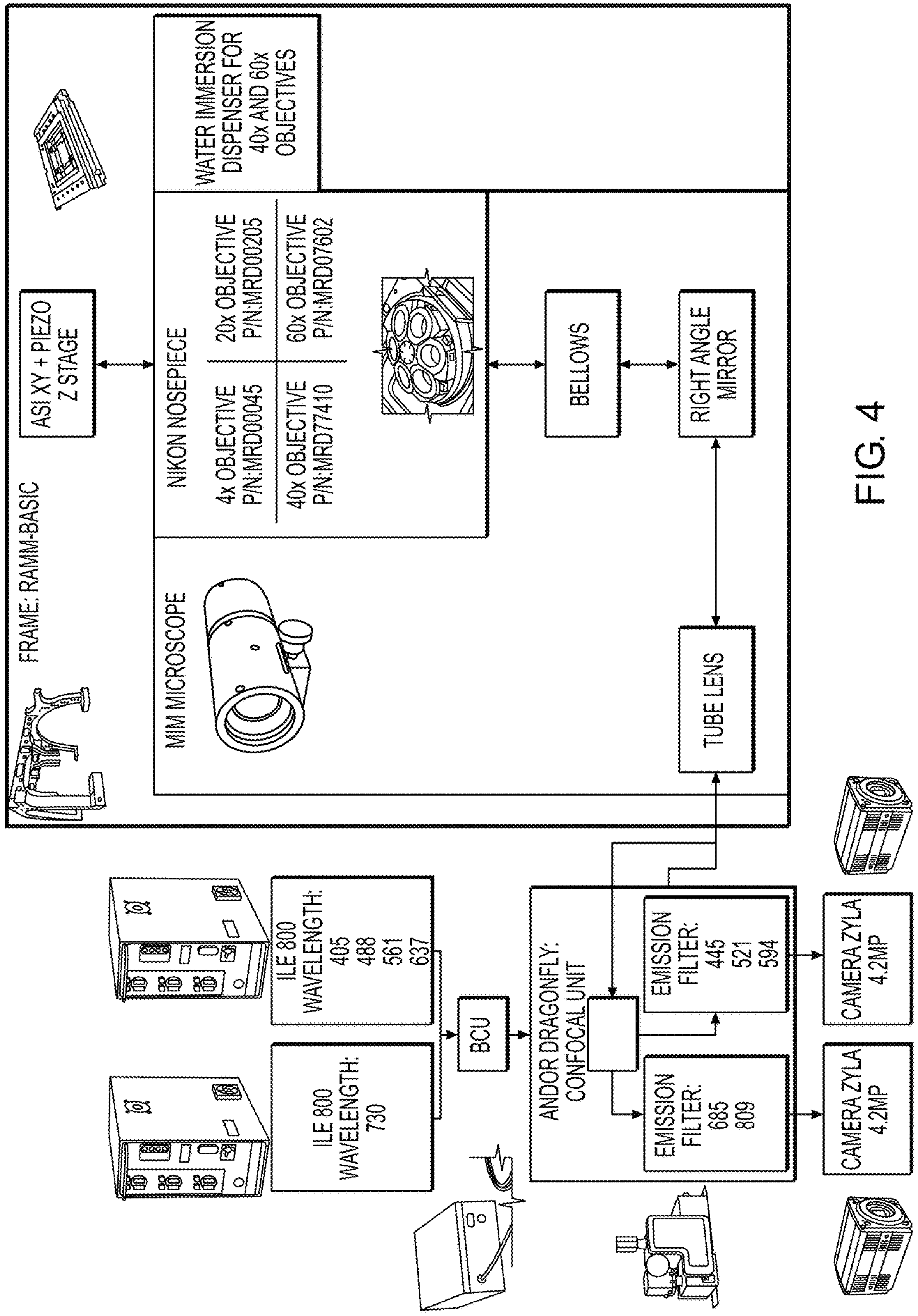
FIG. 4 shows a diagram of the microscope components.
Figure 5:
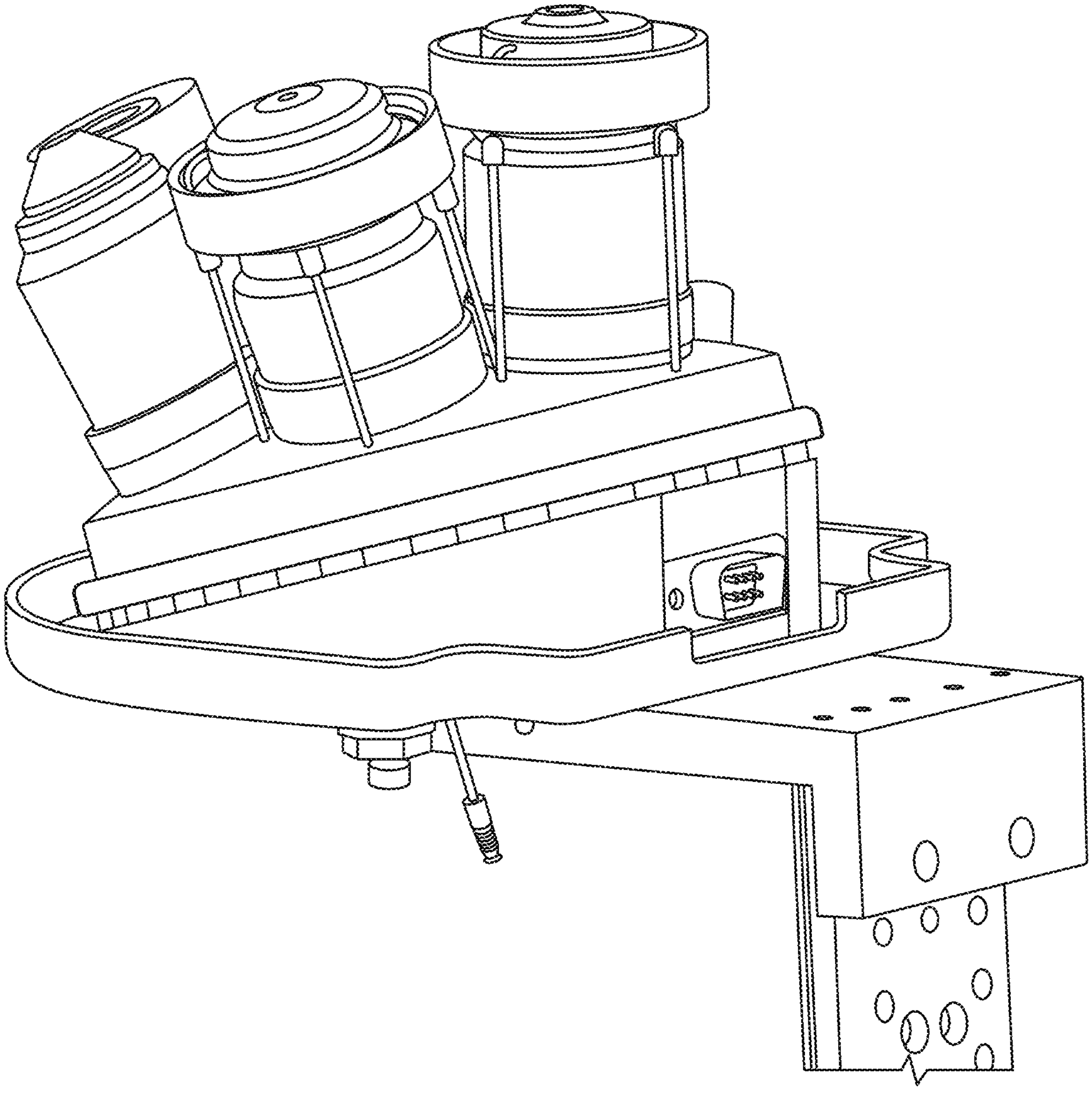
FIG. 5 shows a six-position nosepiece with objectives having 4×, 20×, 40×, and 60× magnification. Water collars are shown on the 40× and 60× objectives.
Figure 6:
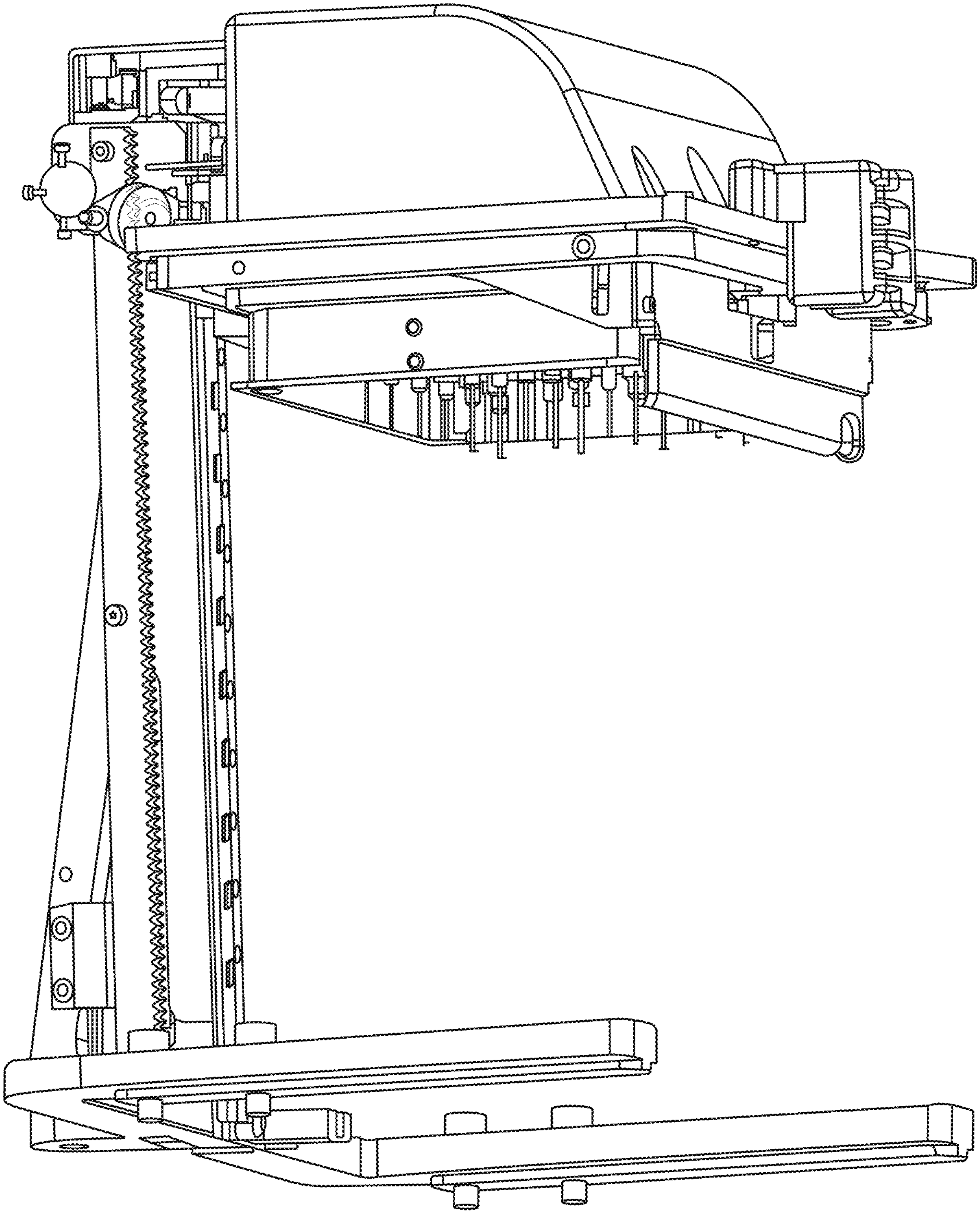
FIG. 6 shows a hand actuated fluidic coupling system for a multi-well plate with 24 wells.
Figure 7:
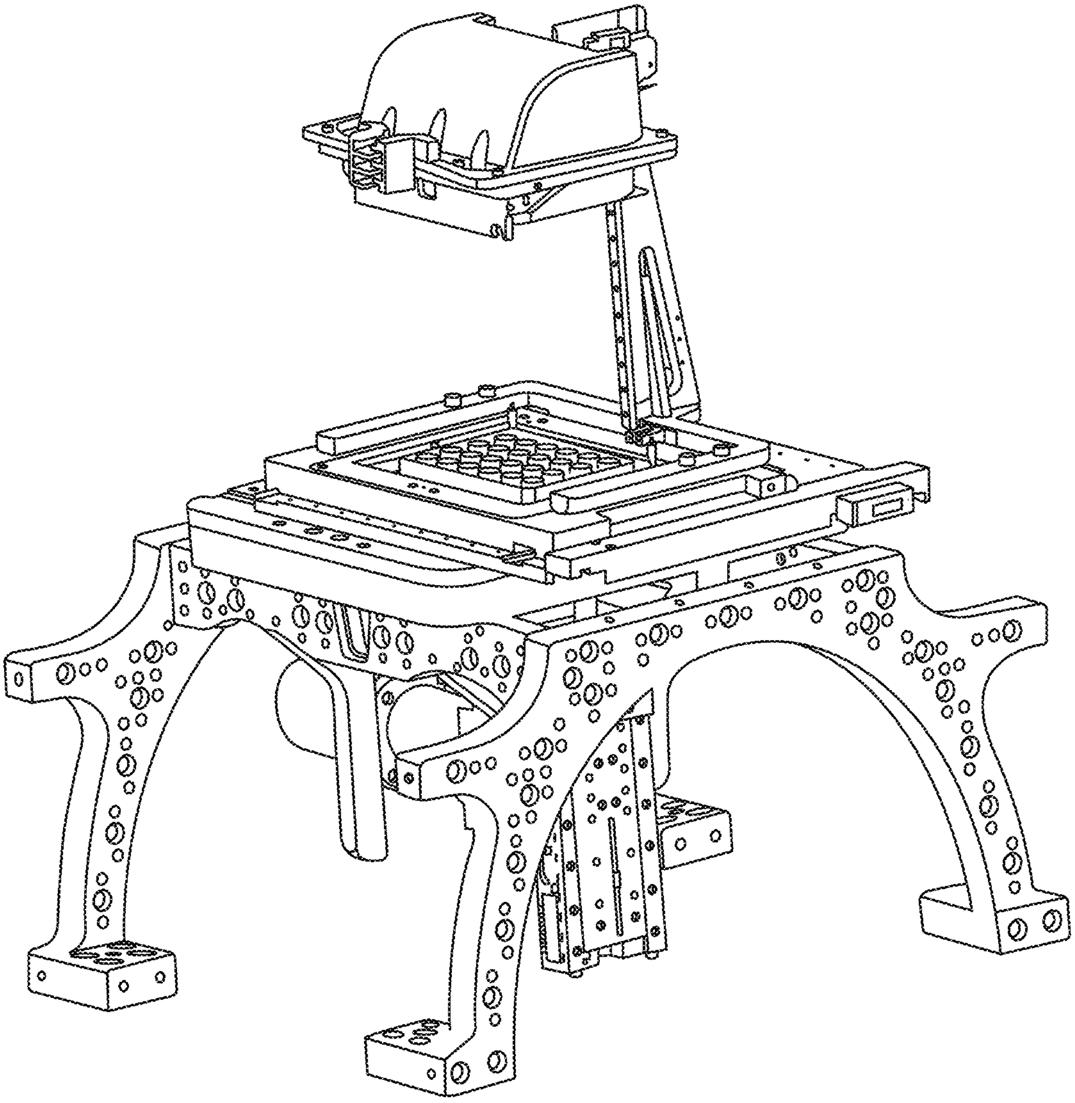
FIG. 7 shows the fluidic coupling system with a multi-well plate on top of an XY motorized stage having a nosepiece and piezo Z.
Figure 8:
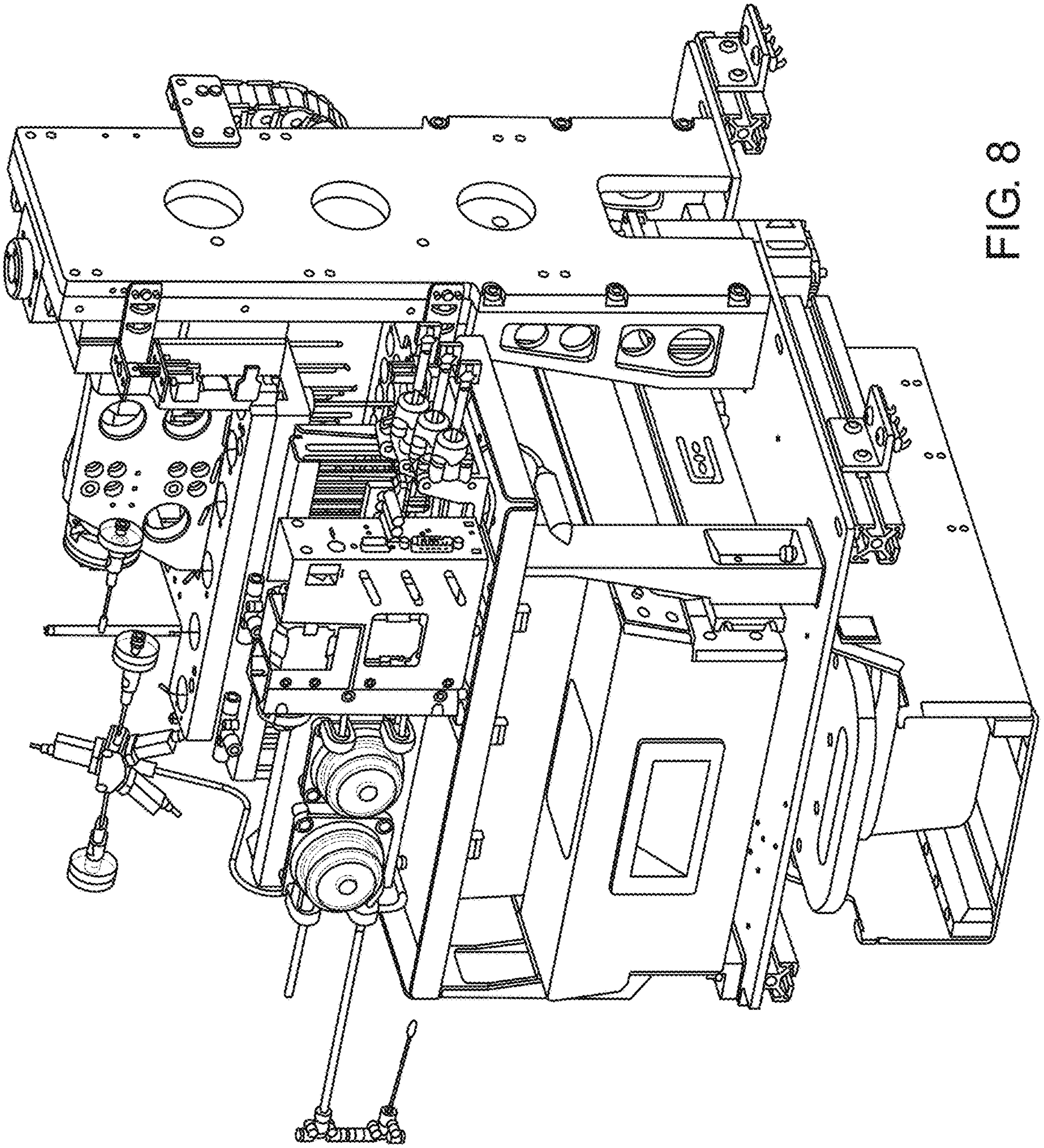
FIG. 8 shows the automated fluid delivery system.
Figure 9:
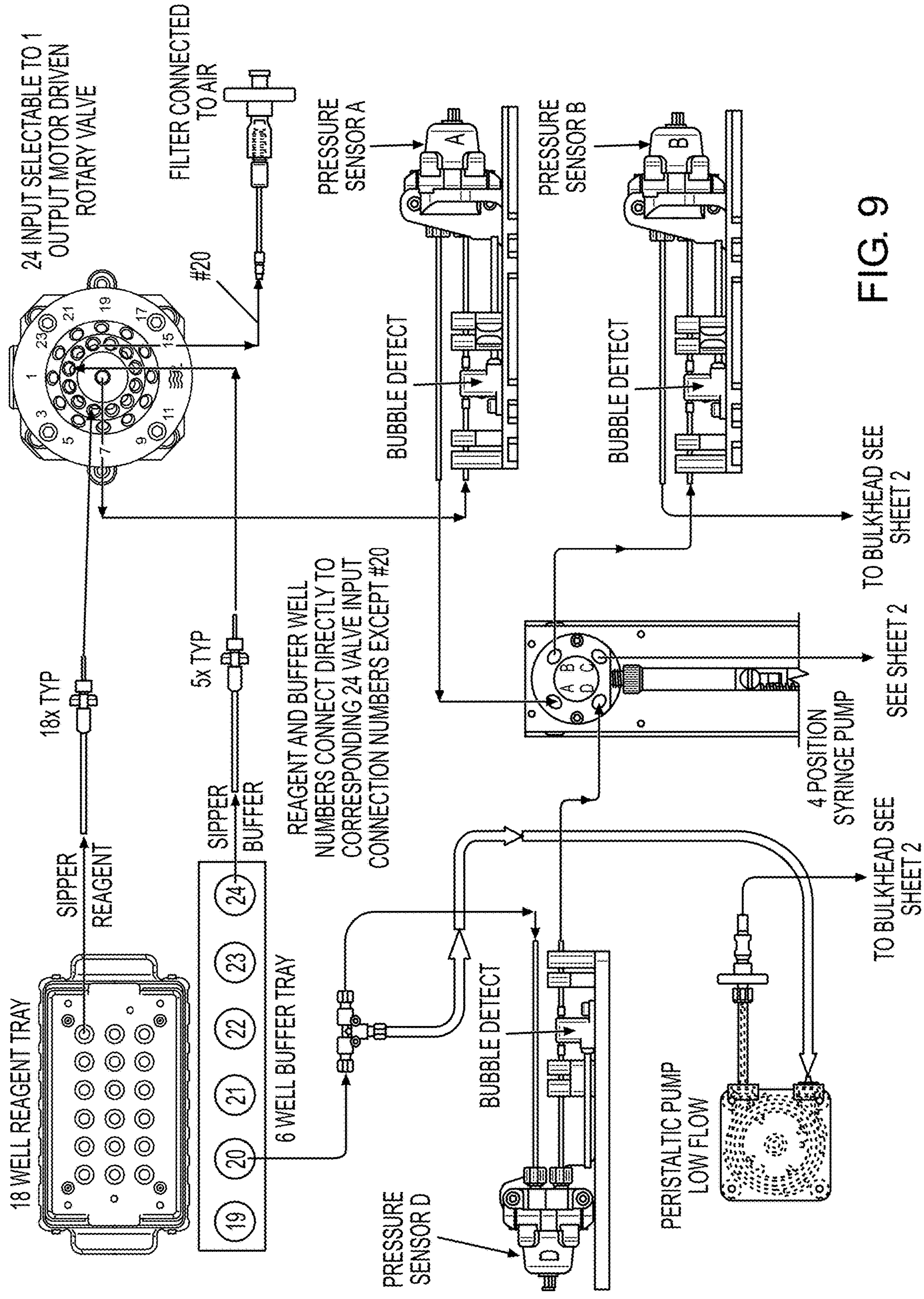
FIG. 9 shows a diagram of the components of the automated fluid delivery system.
Figure 10:
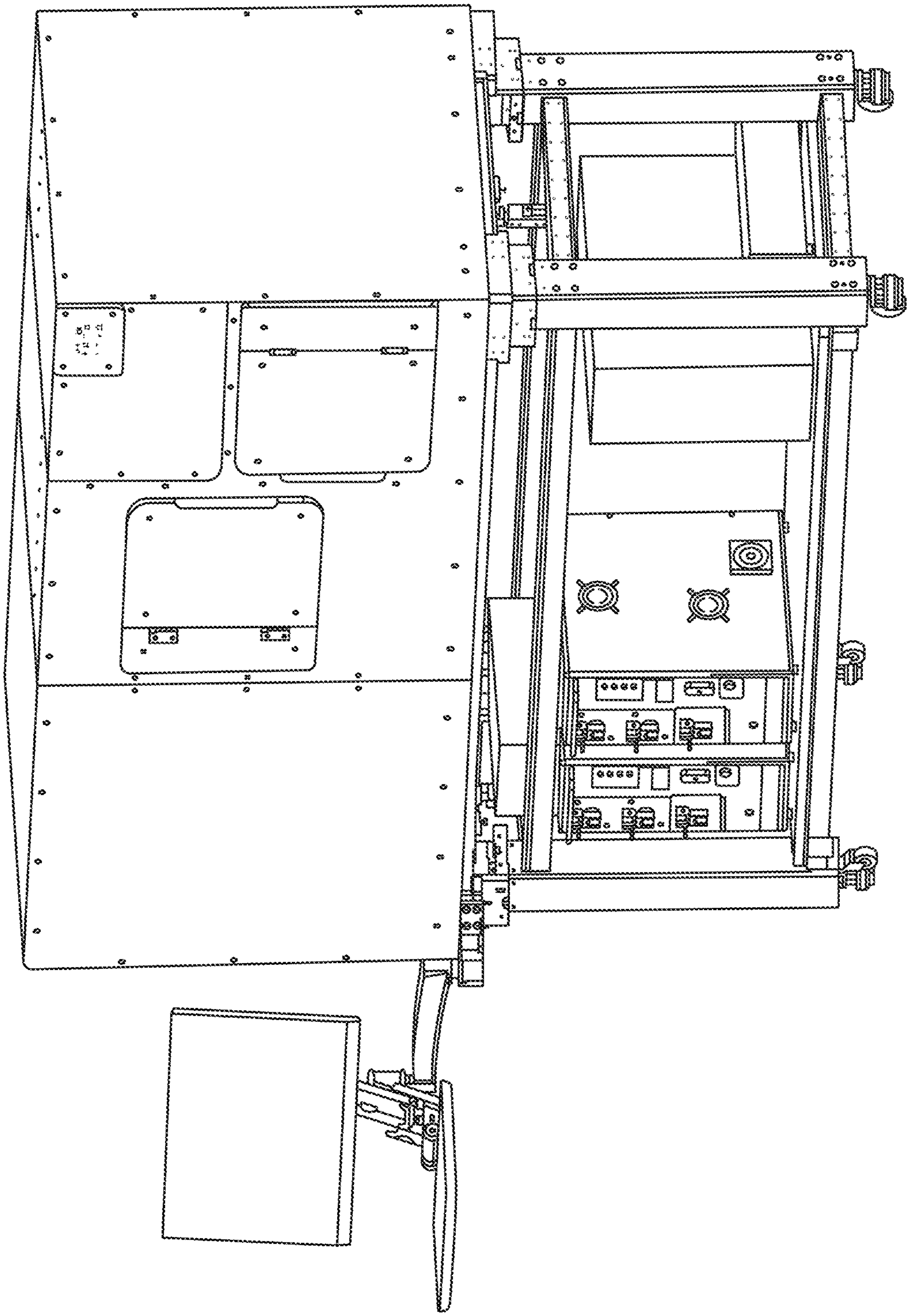
FIG. 10 shows an enclosure for light sensitive samples on top of a custom table that provides vibration isolation. The 5 laser lines with a cover and beam conditioning unit and a workstation with a processor for high data throughput imaging are shown on a shelf beneath the top of the table. A 4K display component connected to the table is also shown.
Figure 11:
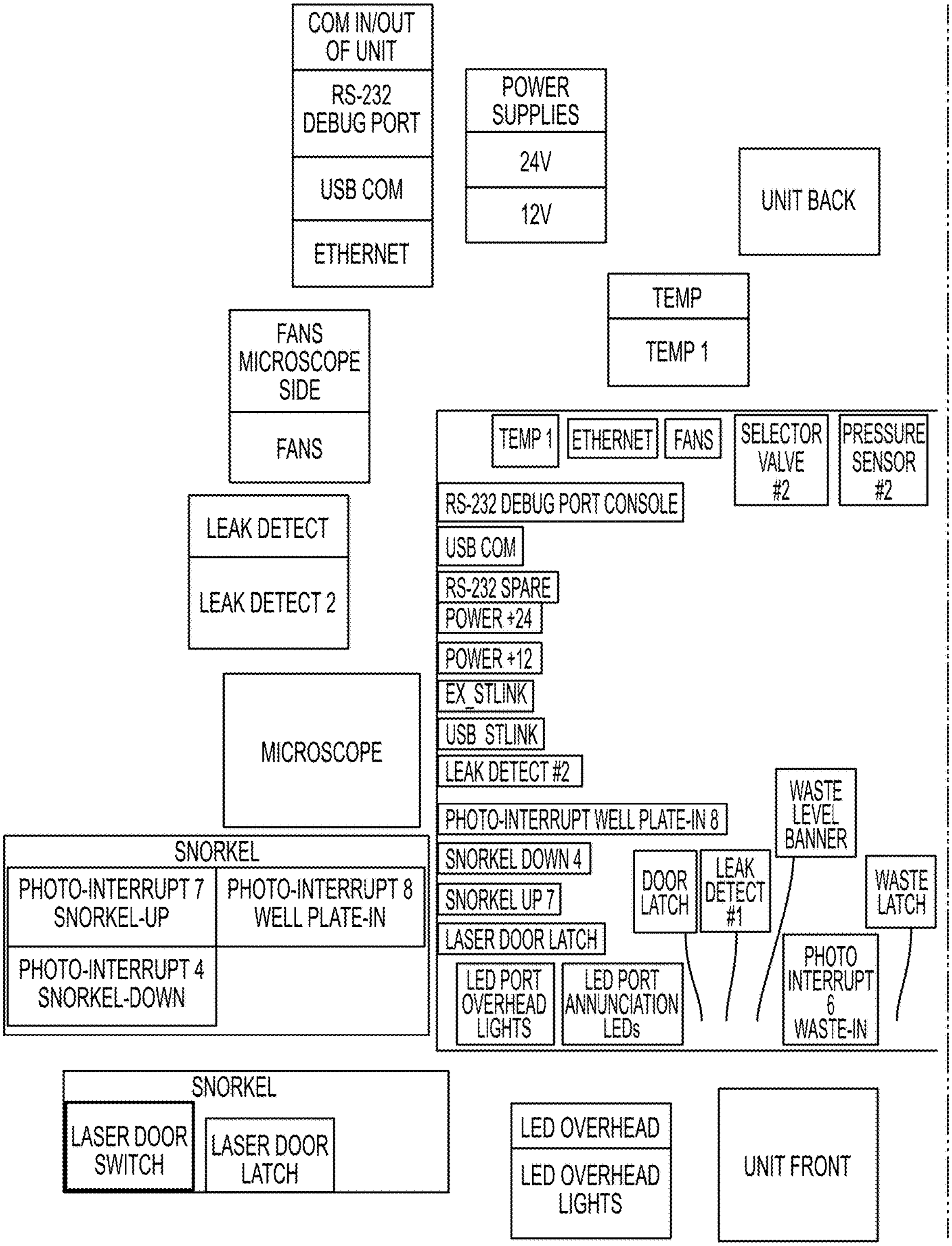
FIG. 11 shows the board ports for the automated fluid delivery system.
Figure 11:
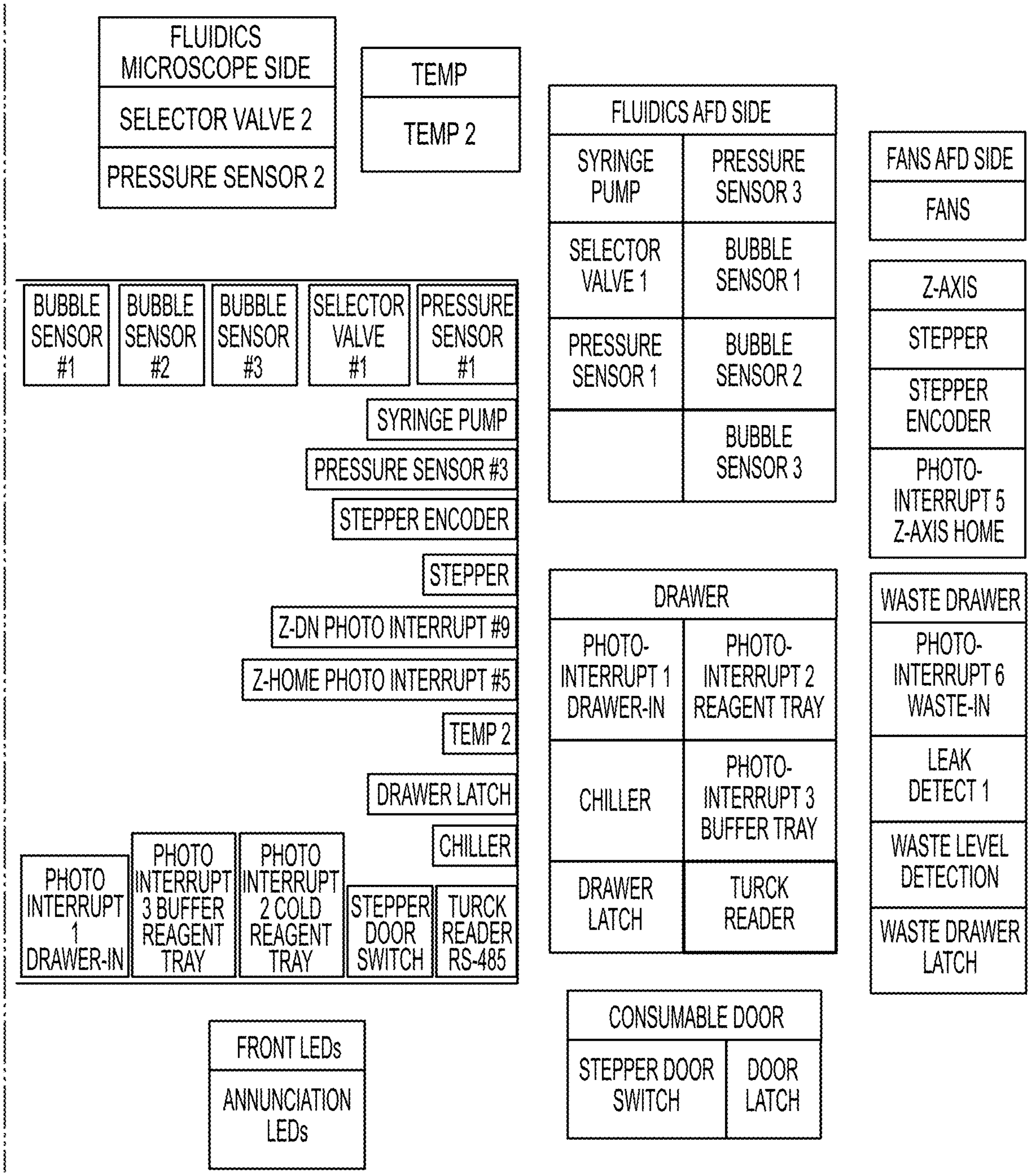
Figure 12:
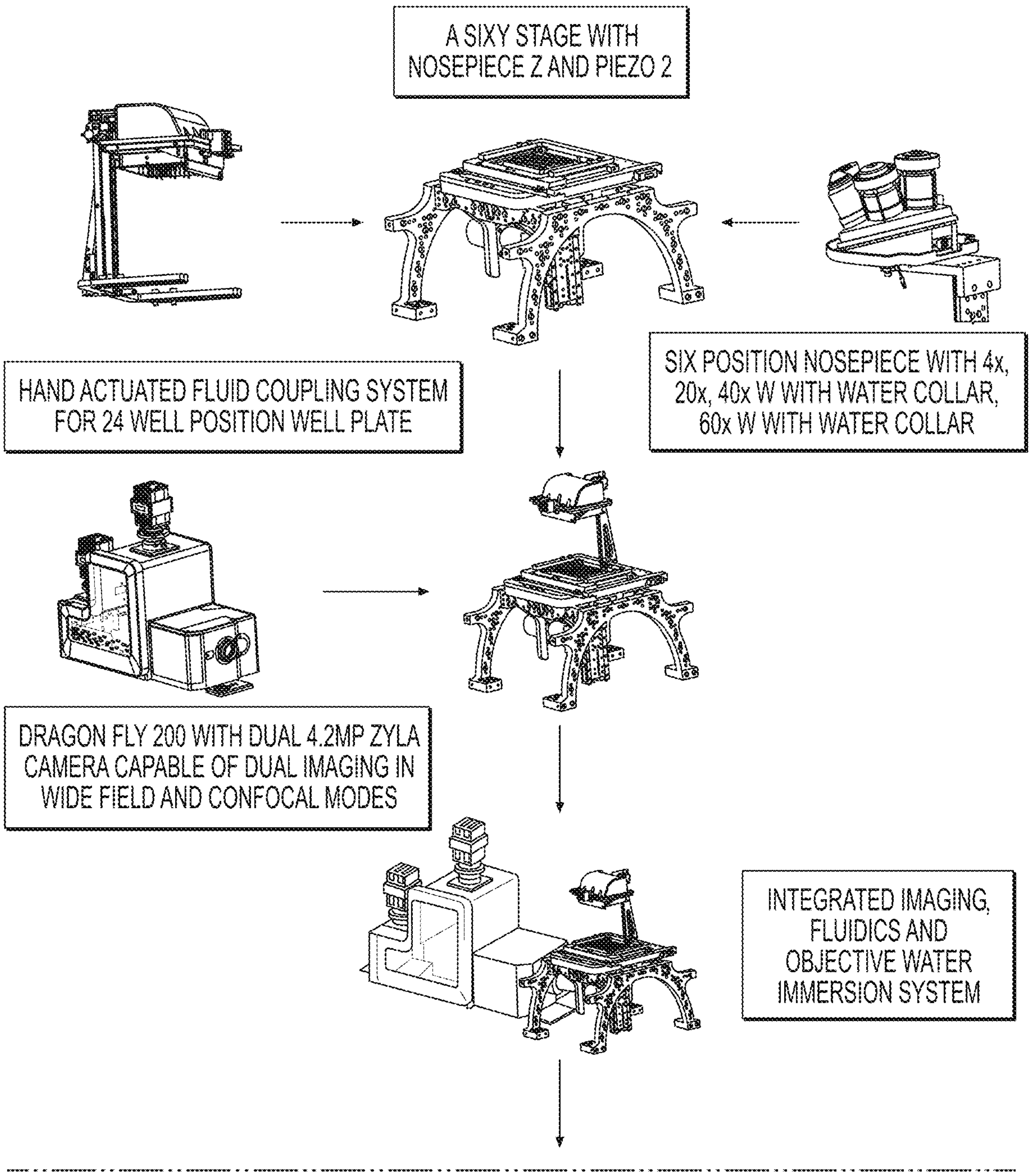
FIG. 12 shows assembly of the modular parts of the sequencing device.
Figure 12:
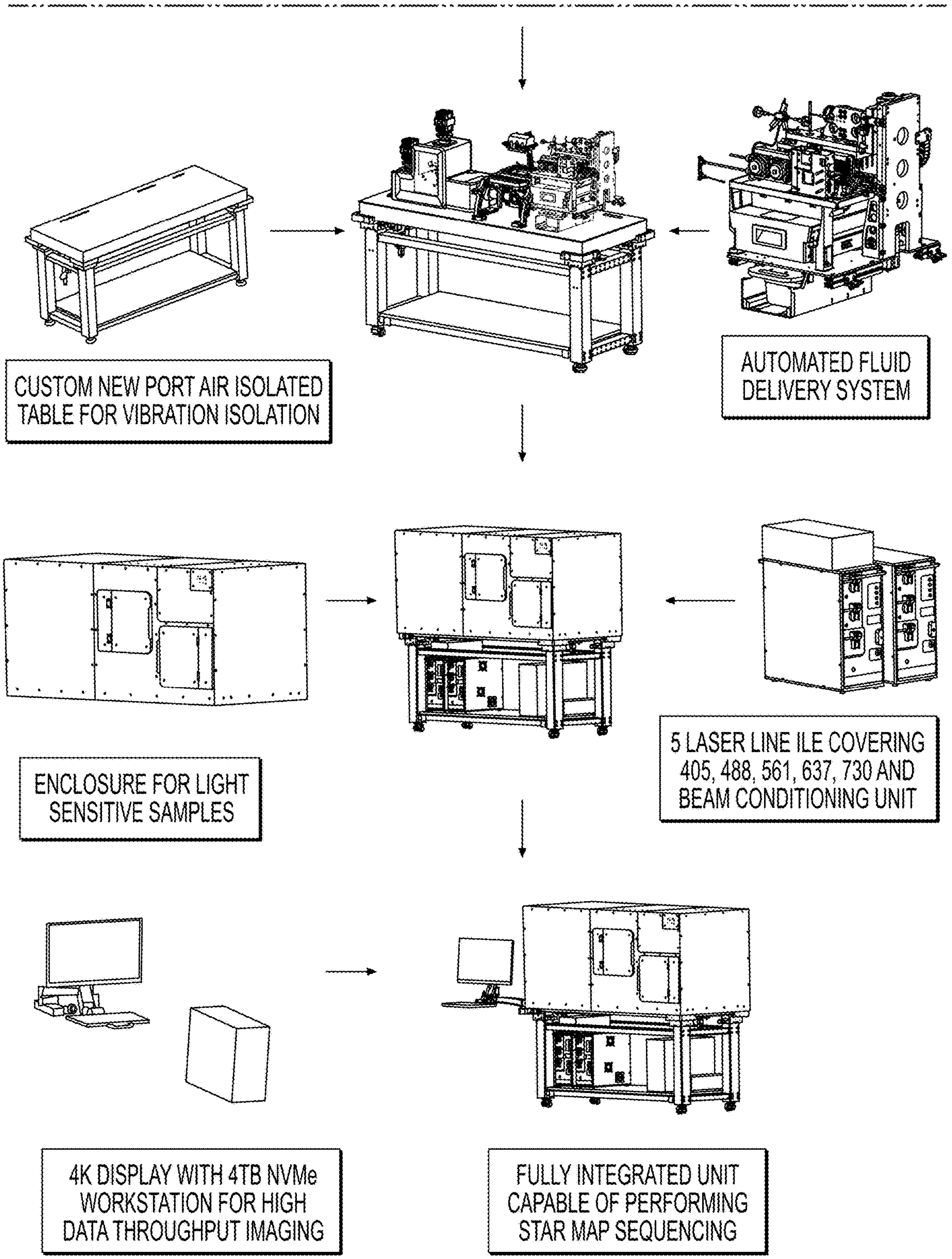
Figure 13:
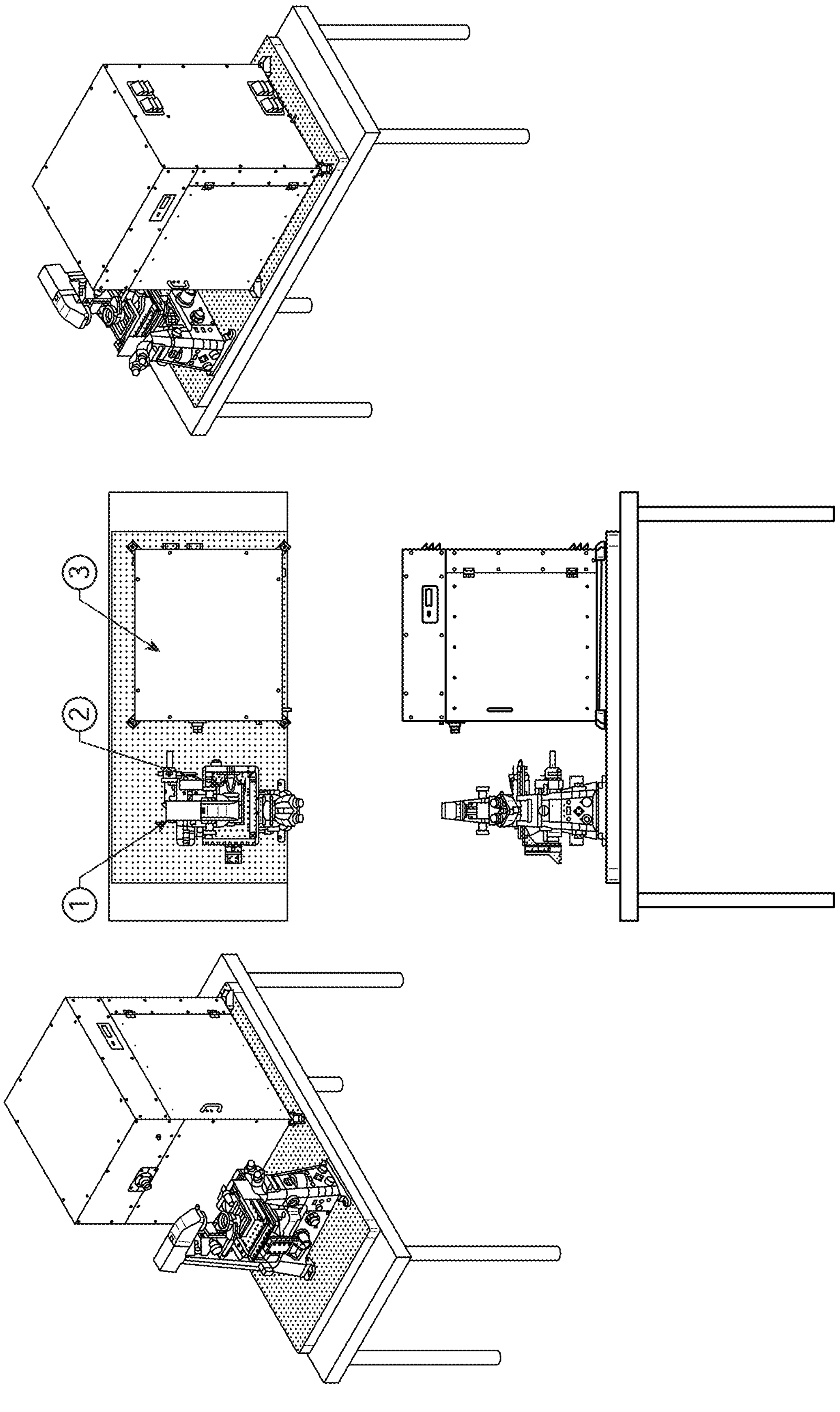
FIG. 13 shows schematics of a stand-alone fluidic module that couples to an existing imaging set up including 1) a microscope and table, 2) a multi-well plate, and 3) a sequencer, shown from various angles.
Figure 14:
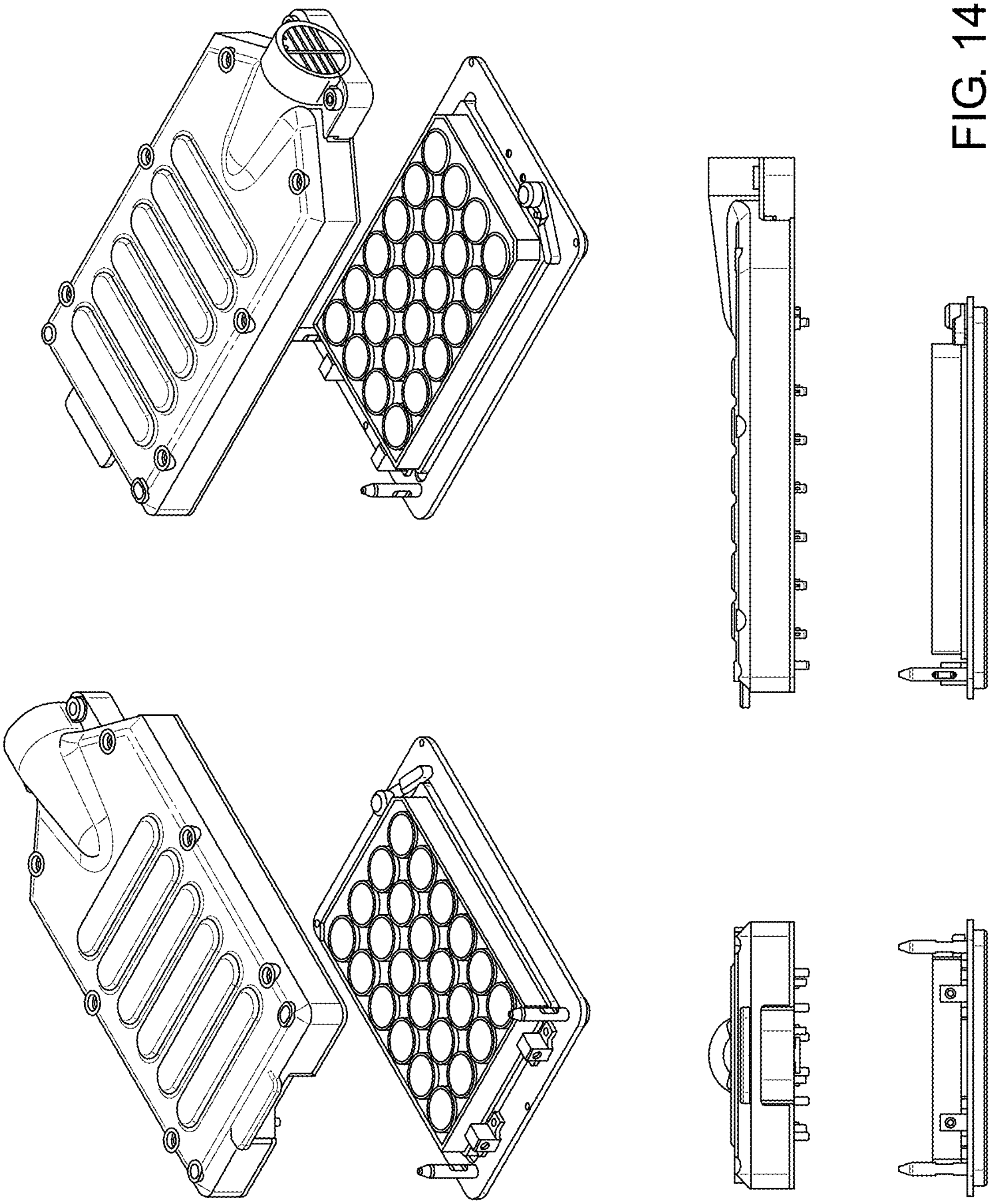
FIG. 14 shows a schematic of a multi-well plate and cover.
Figure 15:
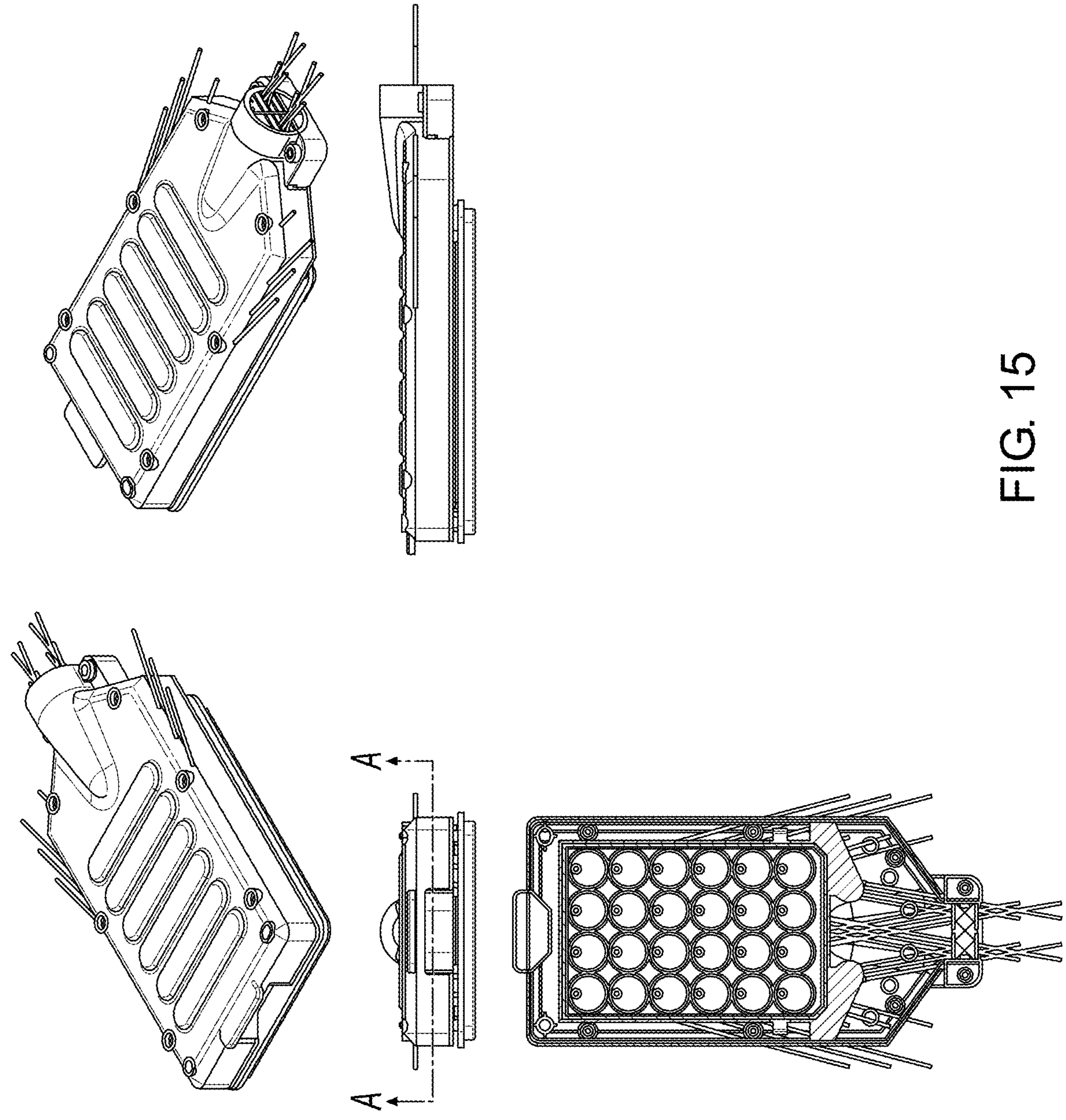
FIG. 15 shows a schematic of a multi-well plate with multiple fluidic lines connected to the multi-well plate and inserted into some selected wells of the multi-well plate.
Figure 16:
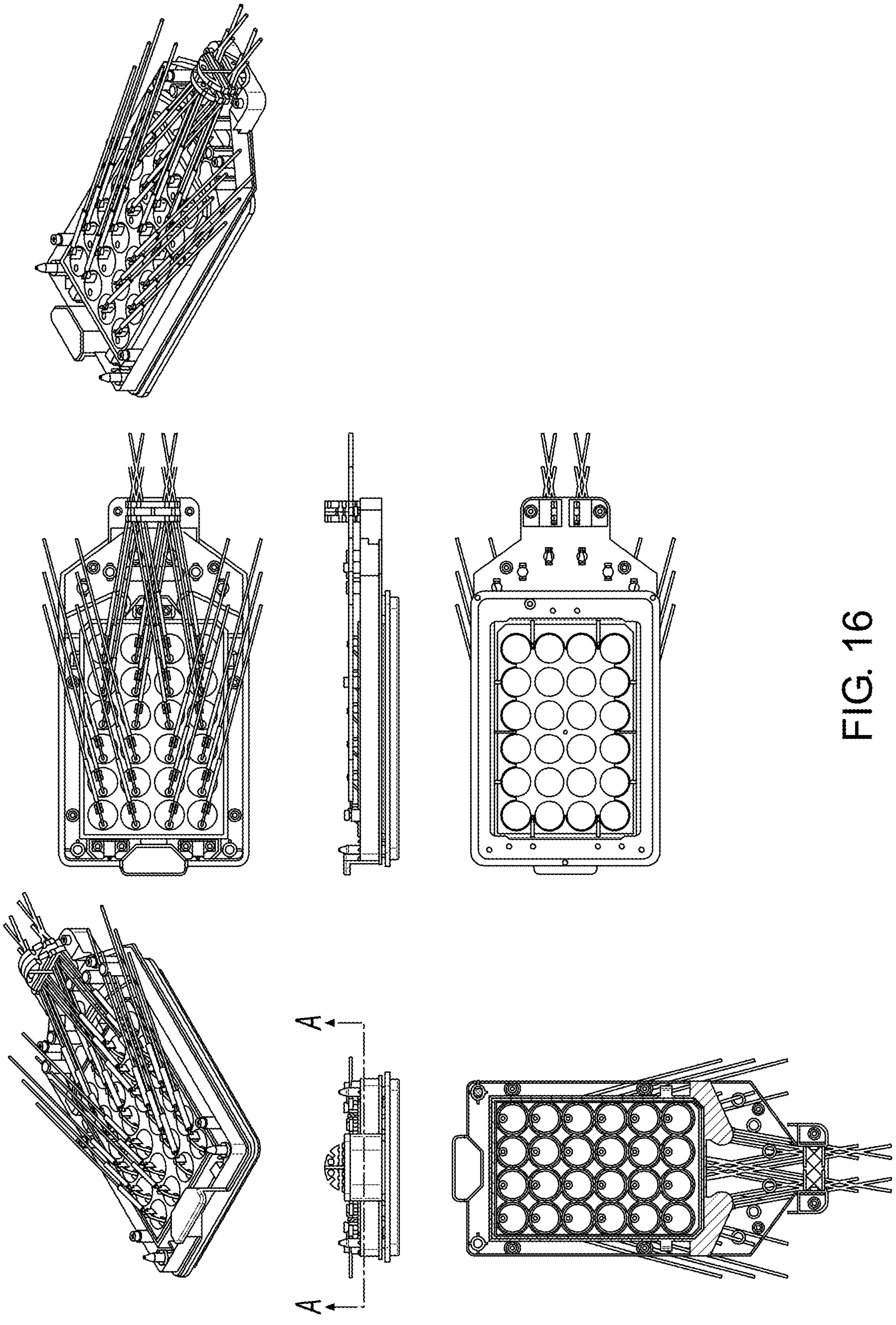
FIG. 16 shows a schematic of a multi-well plate with multiple fluidic lines connected to the multi-well plate and inserted into all the wells of the multi-well plate.
Figure 17:
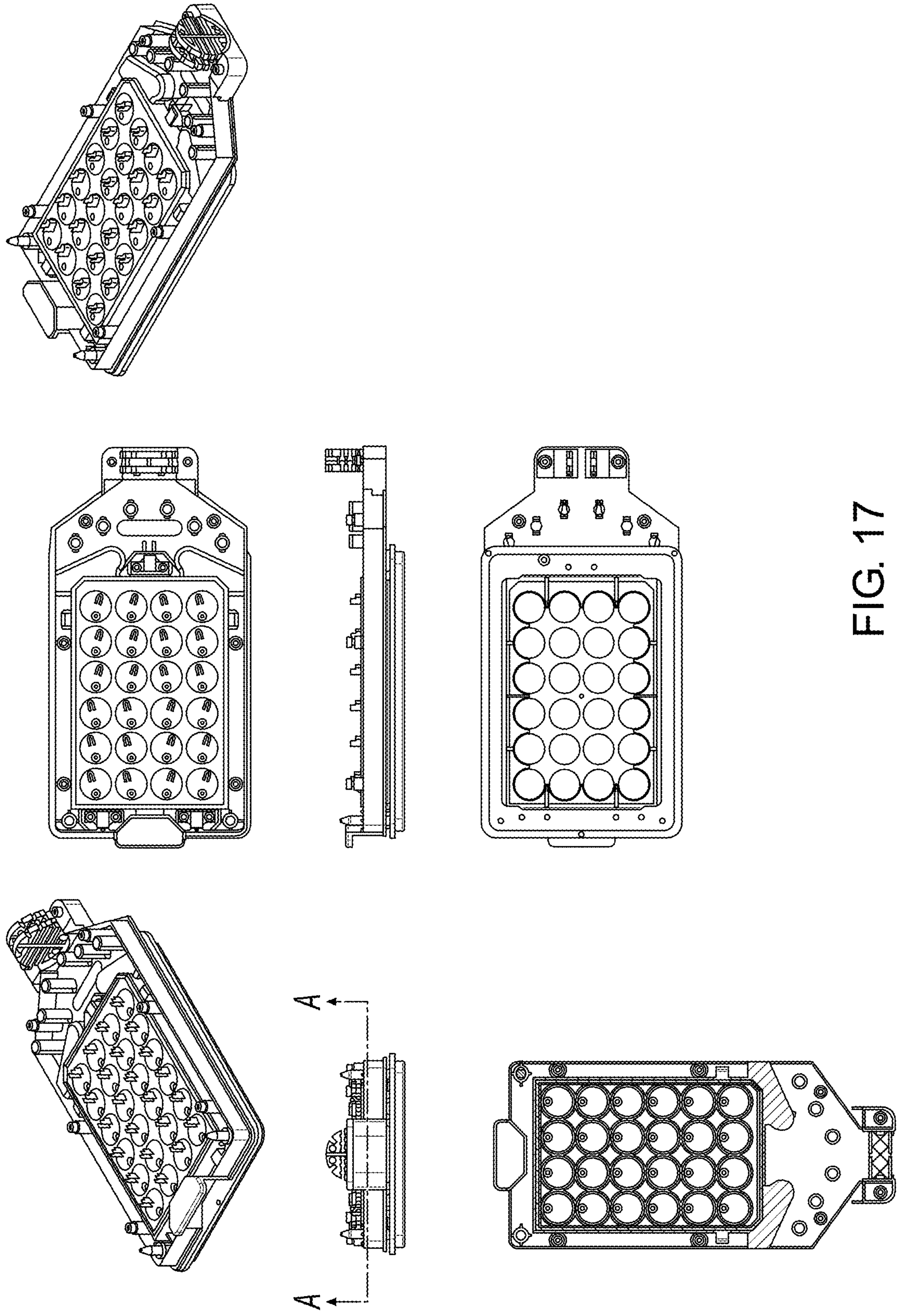
FIG. 17 shows a multi-well plate with a cover over the wells. For each well of the multi-well plate, the cover comprises a holder for a fluidic line that guides the insertion of the fluidic line into a hole in the cover over the well.
Figure 18:
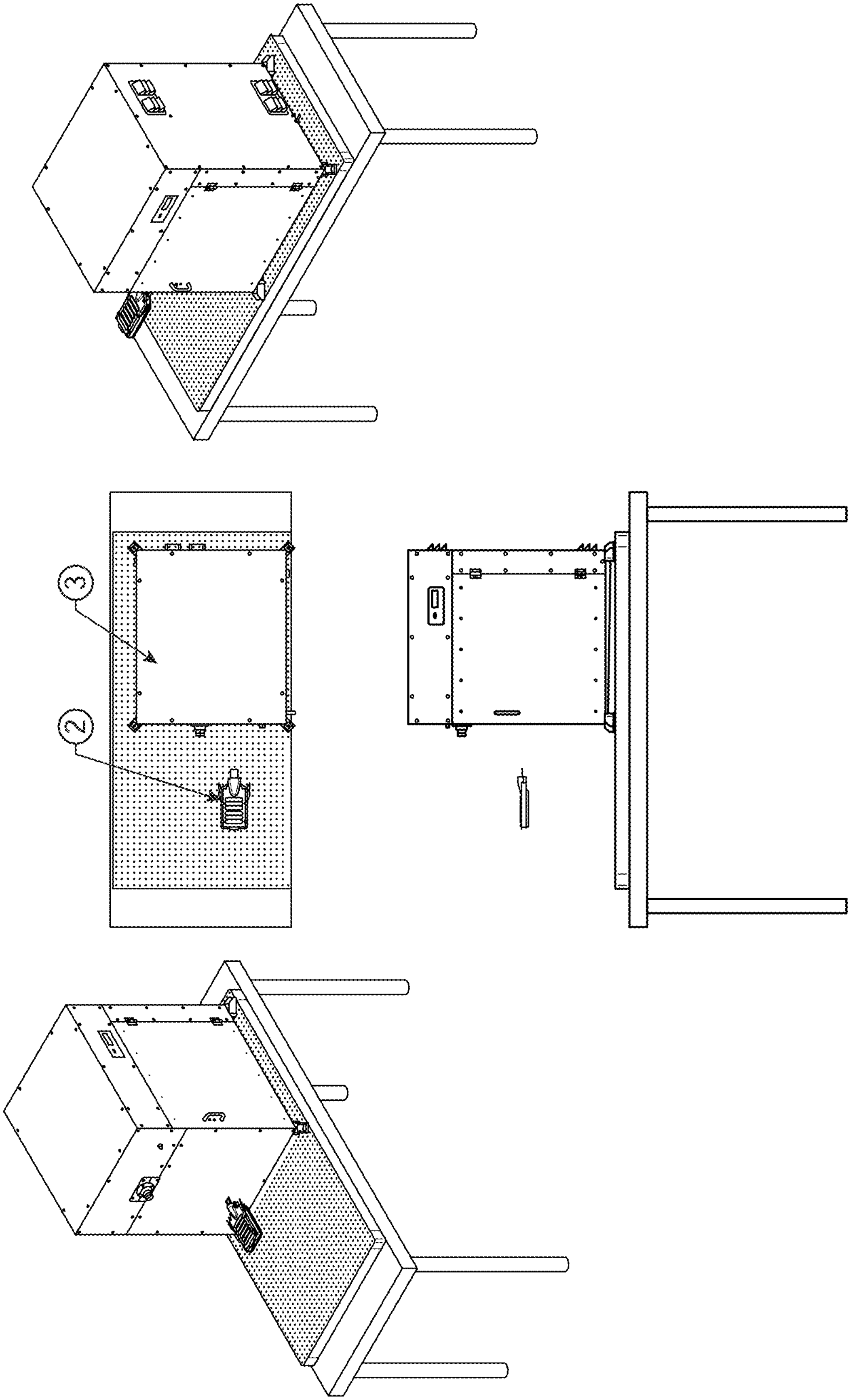
FIG. 18 shows a schematic of the 1) microscope and table, 2) covered multi-well plate, and 3) sequencer from various angles with the multi-well plate connected to the sequencer or removed from the sequencer.
Figure 19:
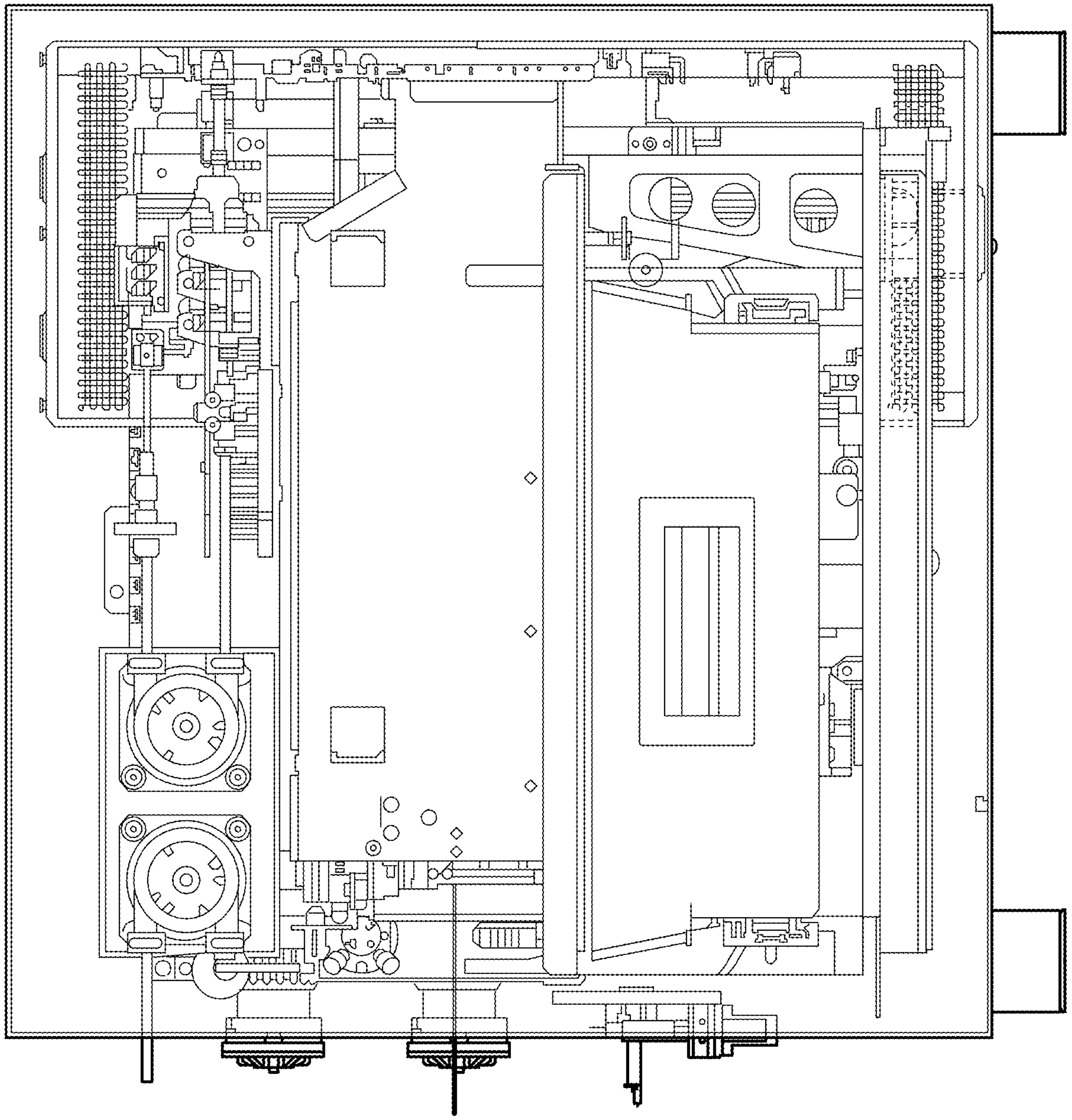
FIG. 19 shows a design of a compact automated fluid delivery system.
Figure 20:
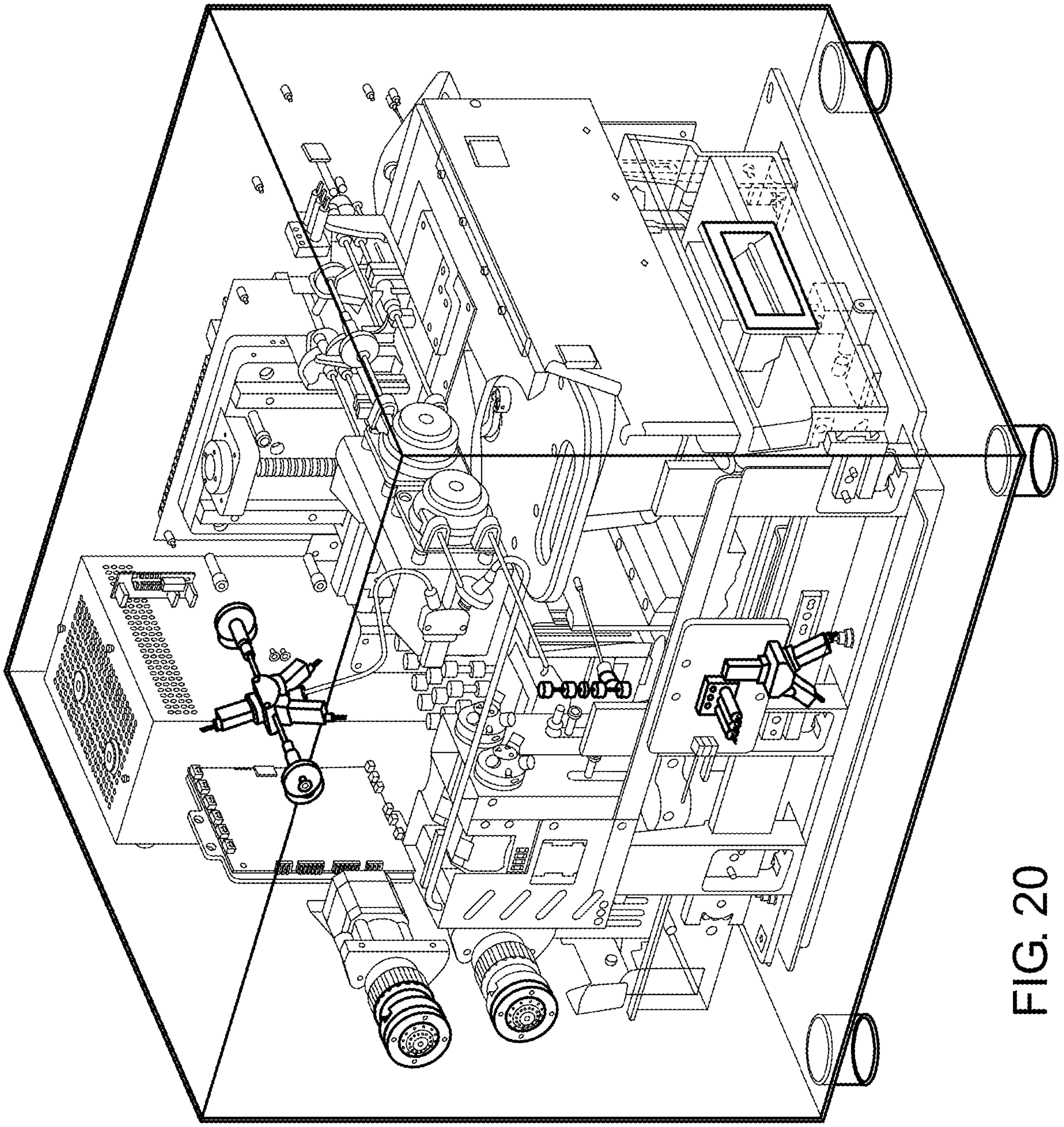
FIG. 20 shows a design of a compact automated fluid delivery system.
Figure 21:
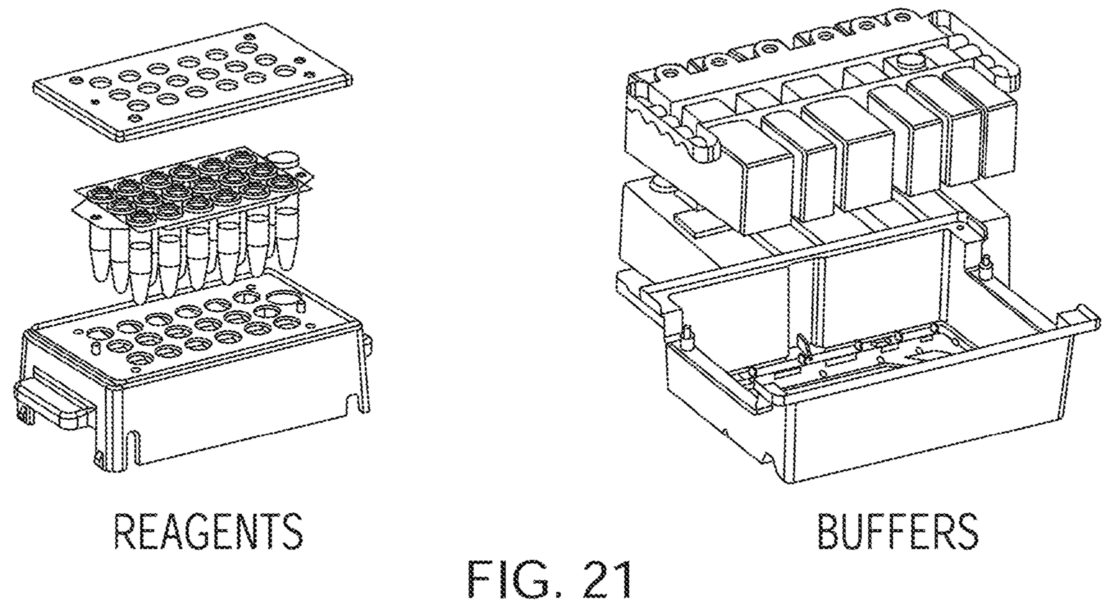
FIG. 21 shows designs for buffer and reagent trays.
Figure 22:
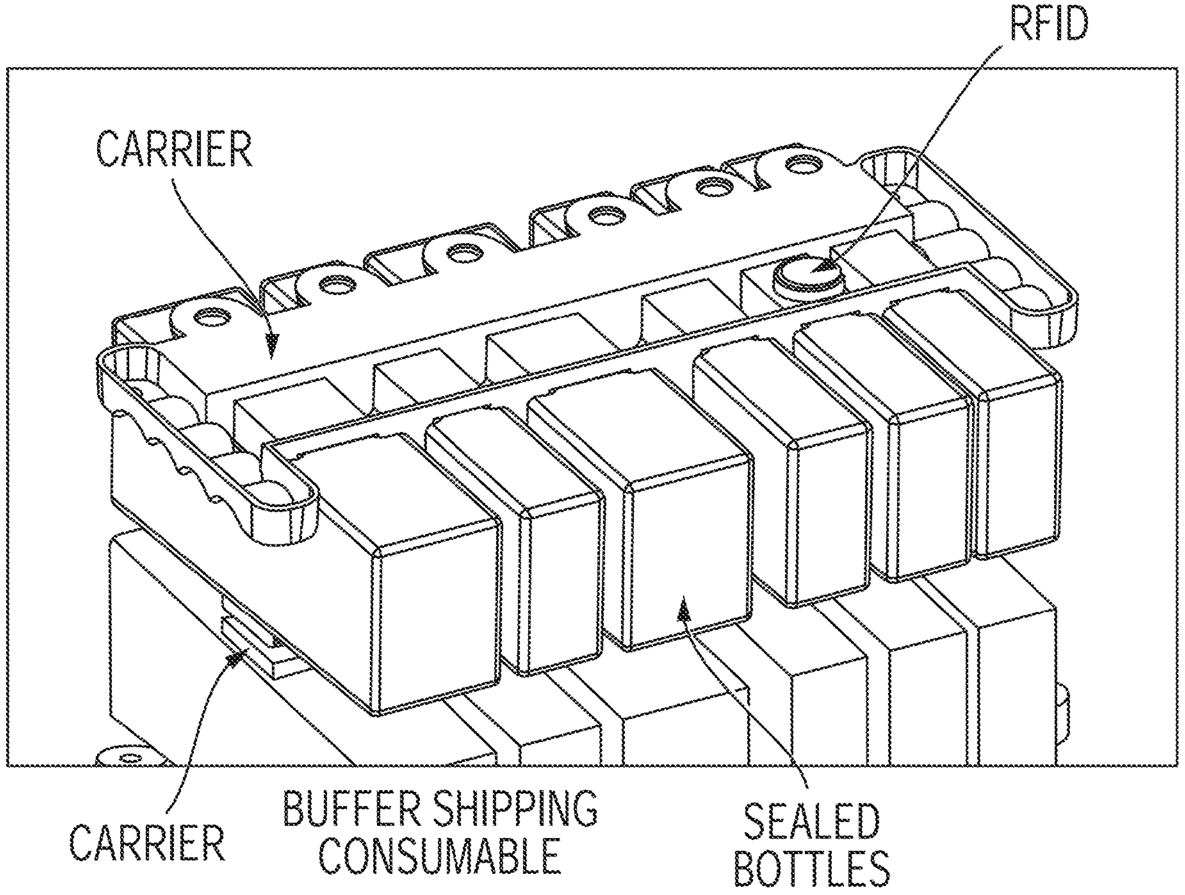
FIG. 22 shows a design of a buffer tray containing a carrier for sealed bottles of buffers and an RFID tag for tracking.
Figure 23:
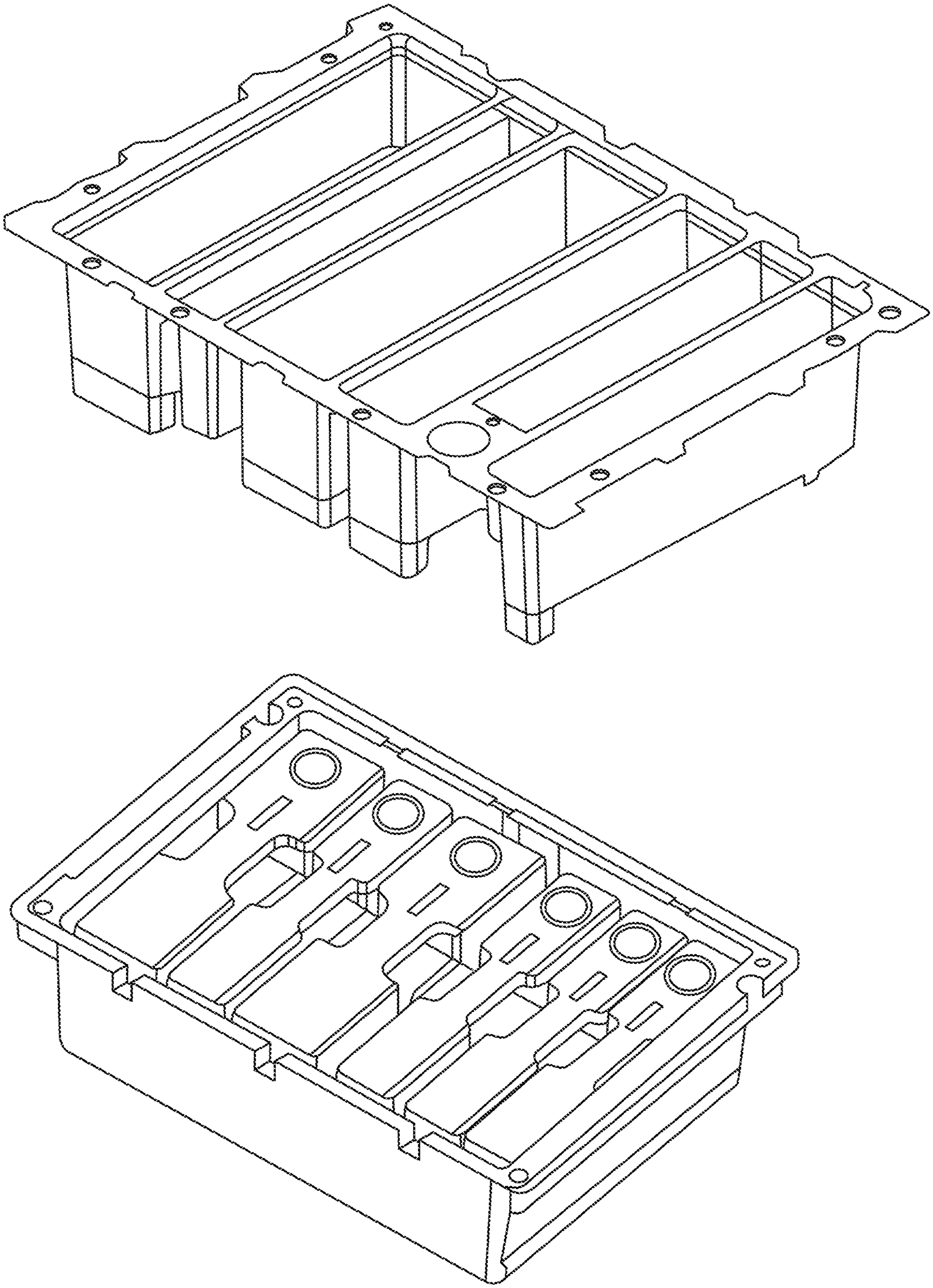
FIG. 23 show alternate designs for a buffer tray. At top, is shown a buffer tray with caps for individual buffers. At bottom, is shown a buffer tray designed to hold sealed bottles of buffers.
Figure 24:
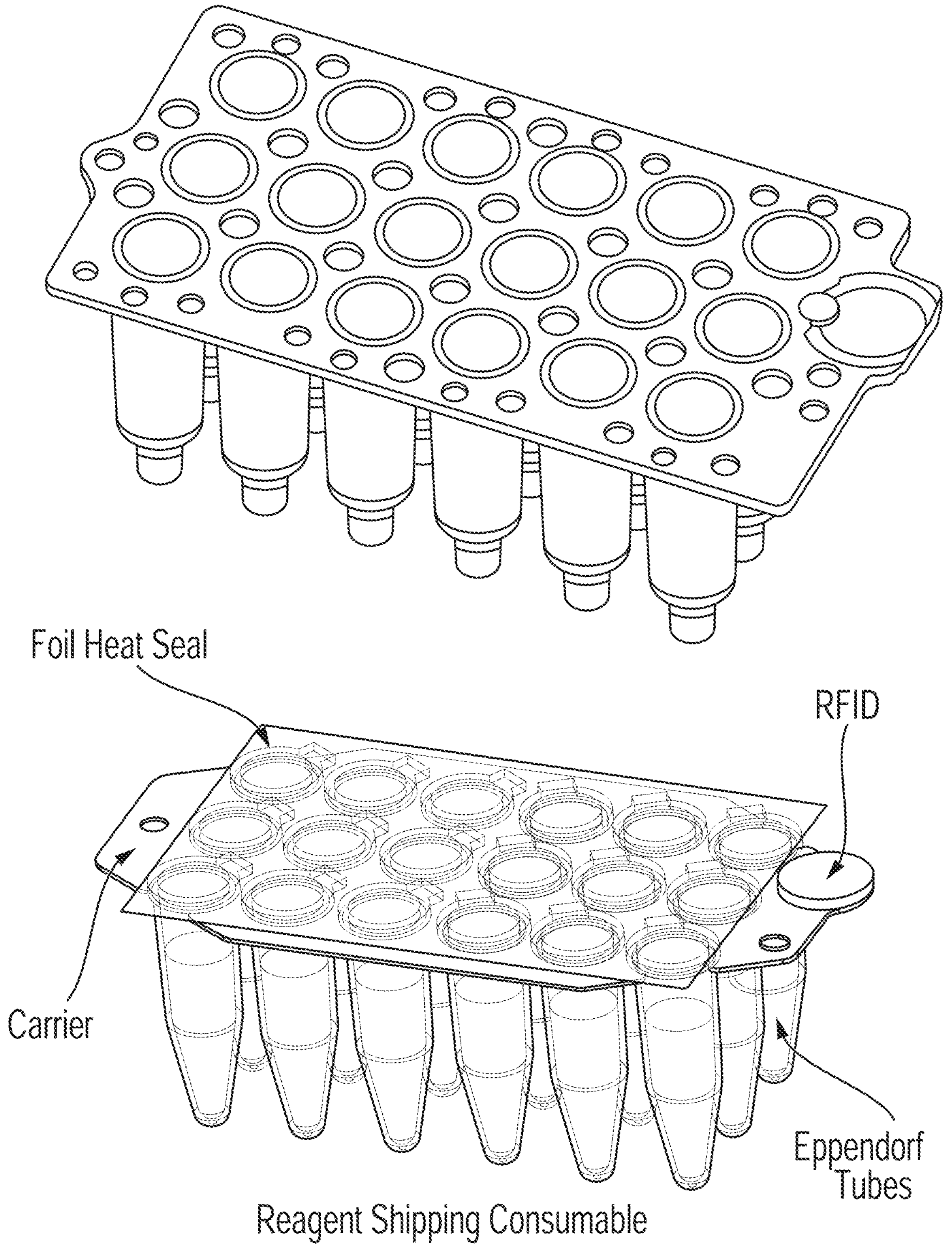
FIG. 24 shows a design of a reagent tray containing a carrier for Eppendorf tubes, a seal, and an RFID tag for tracking.
Figure 25:
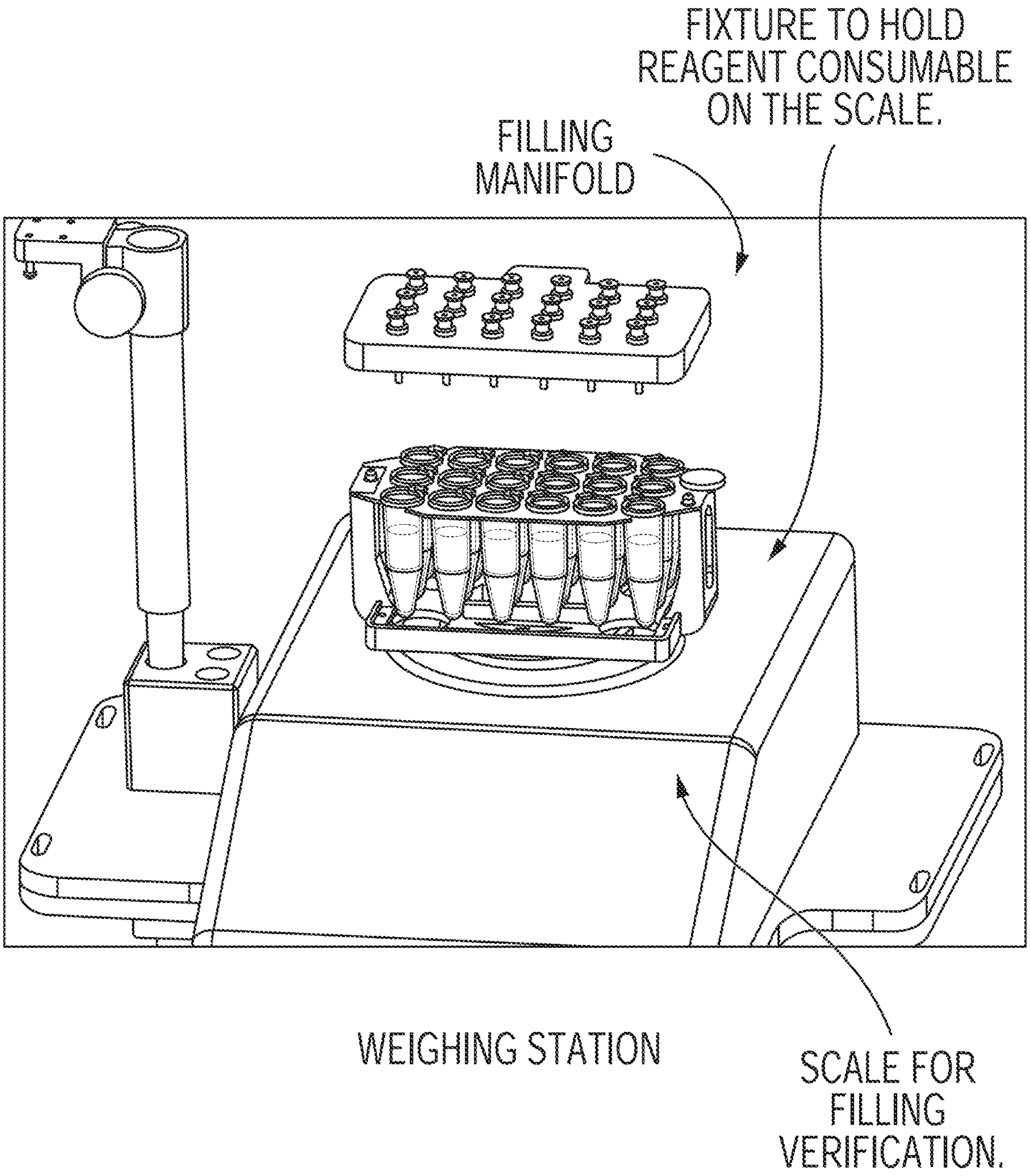
FIG. 25 shows a weighing station for reagent filling verification, a fixture to hold reagent consumables on the scale, and a filling manifold.
Figure 26:
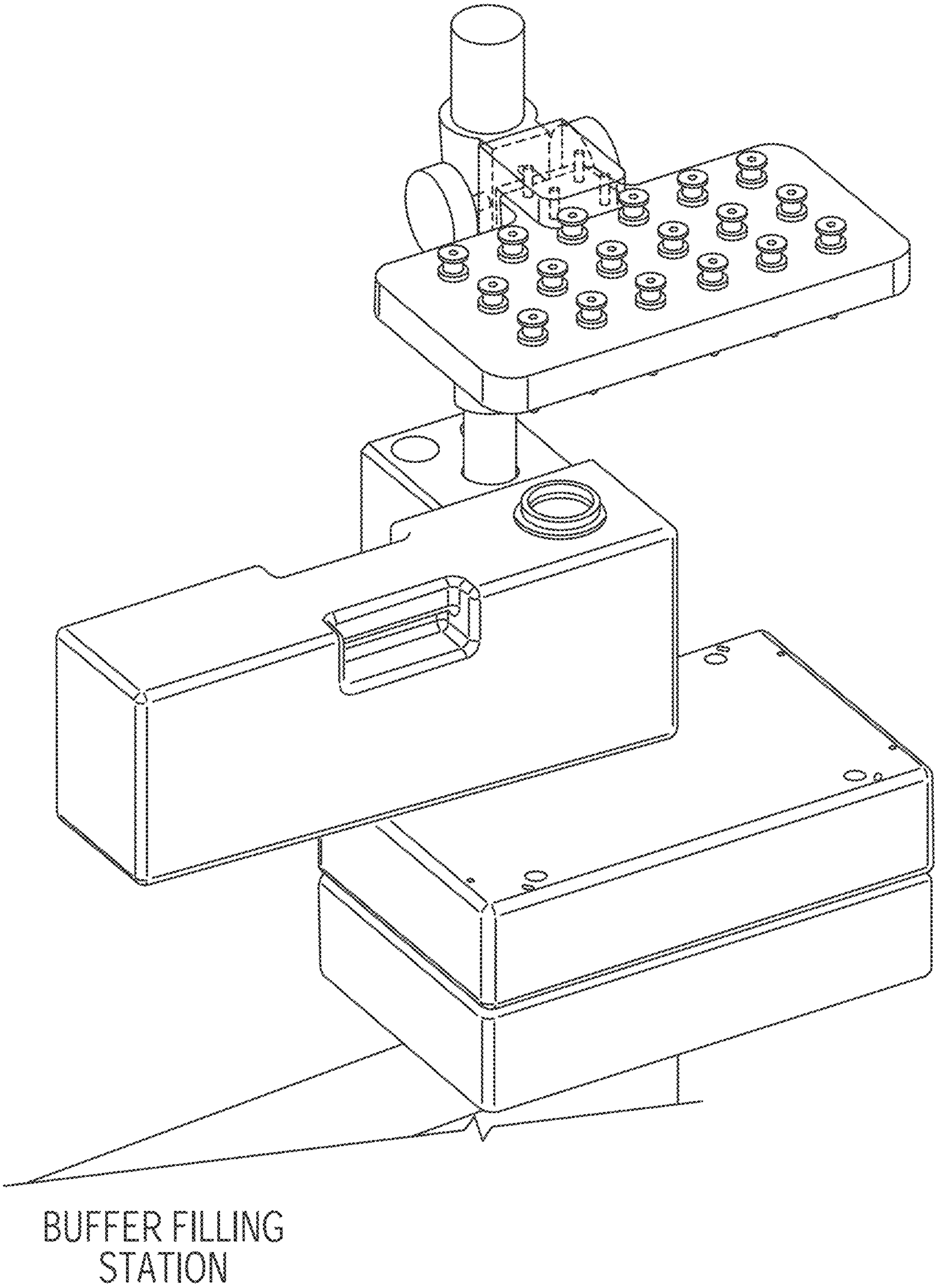
FIG. 26 shows a buffer filling station.
Figure 27:
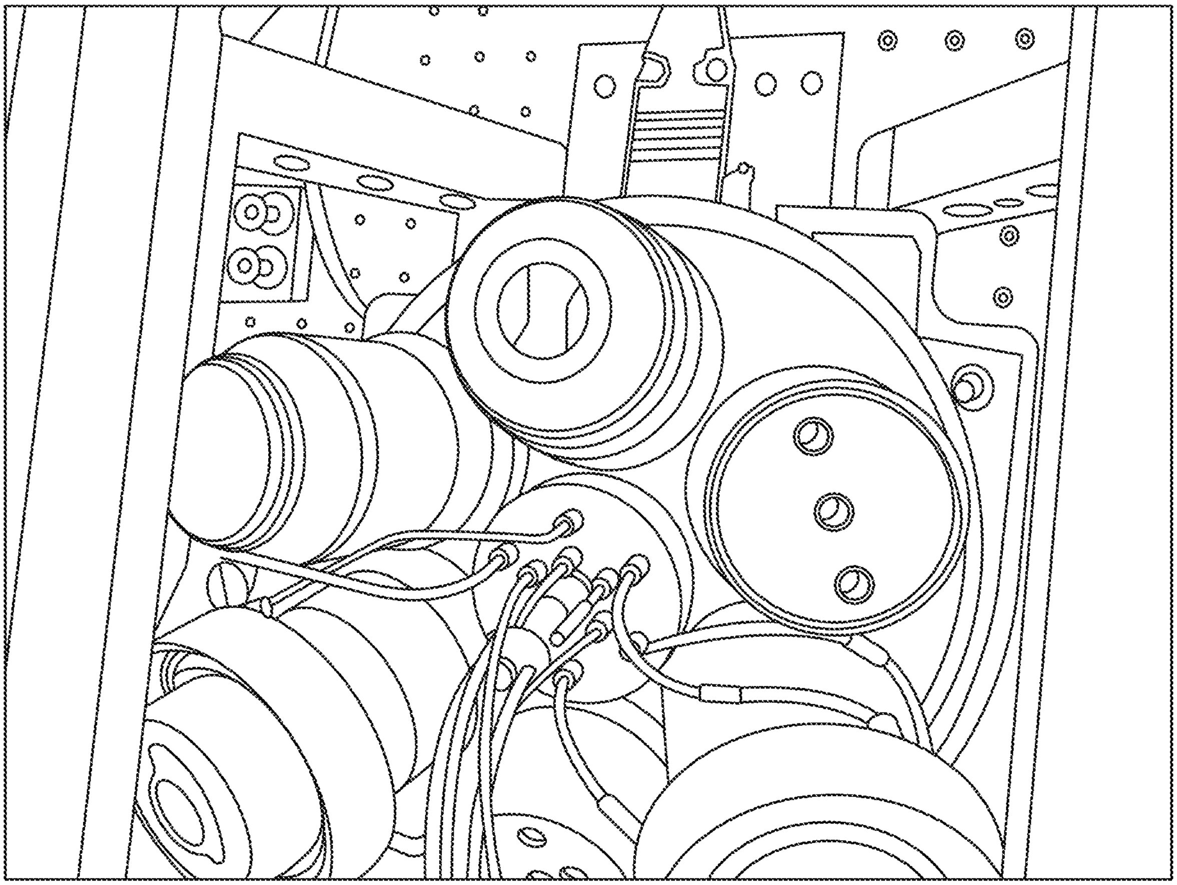
FIG. 27 shows objectives with collars on the 40× and 60× objectives.
Figure 28:
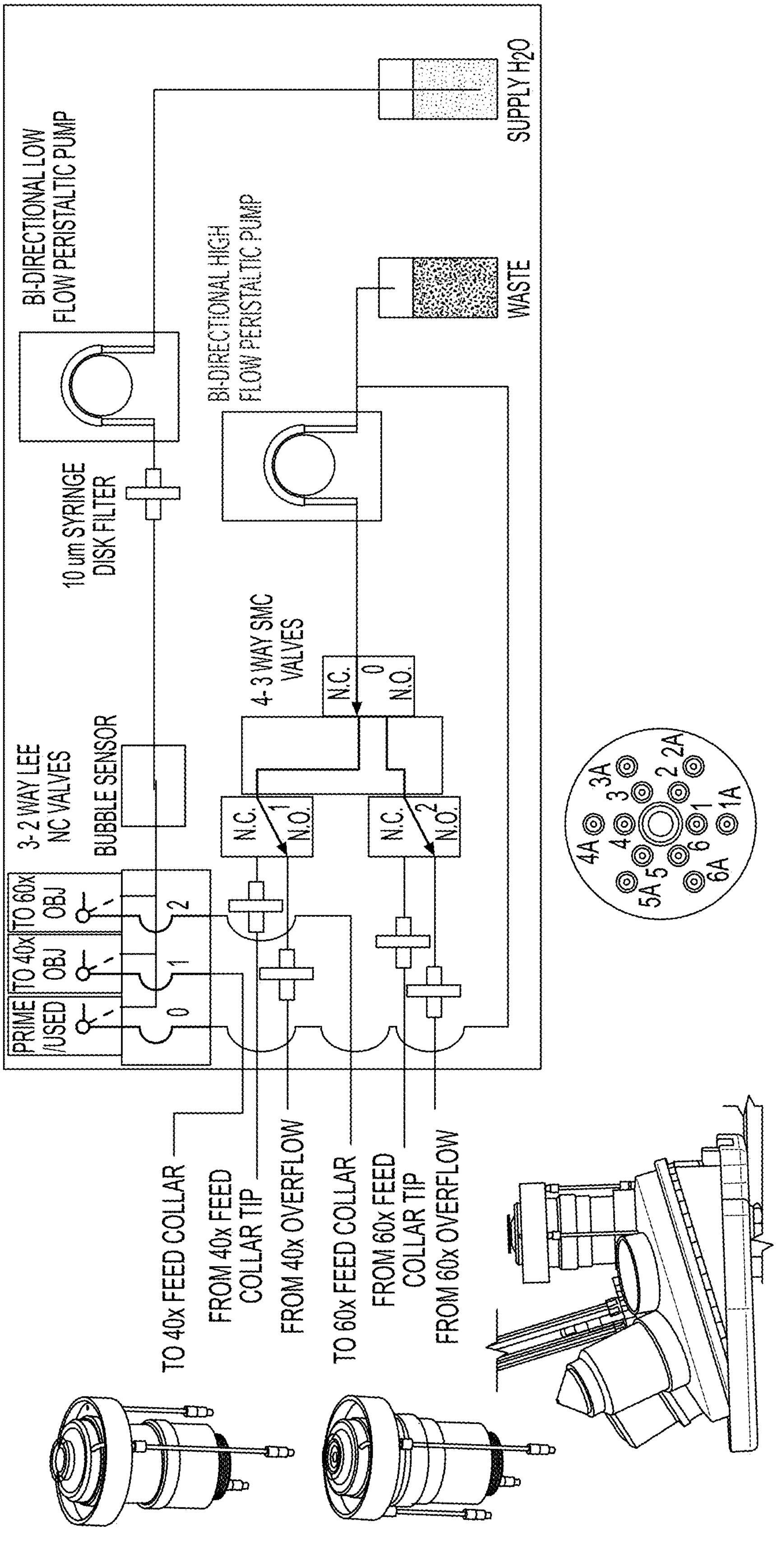
FIG. 28 shows a fluid diagram for providing fluid to the collars on the 40× and 60× objectives.
Figure 29:
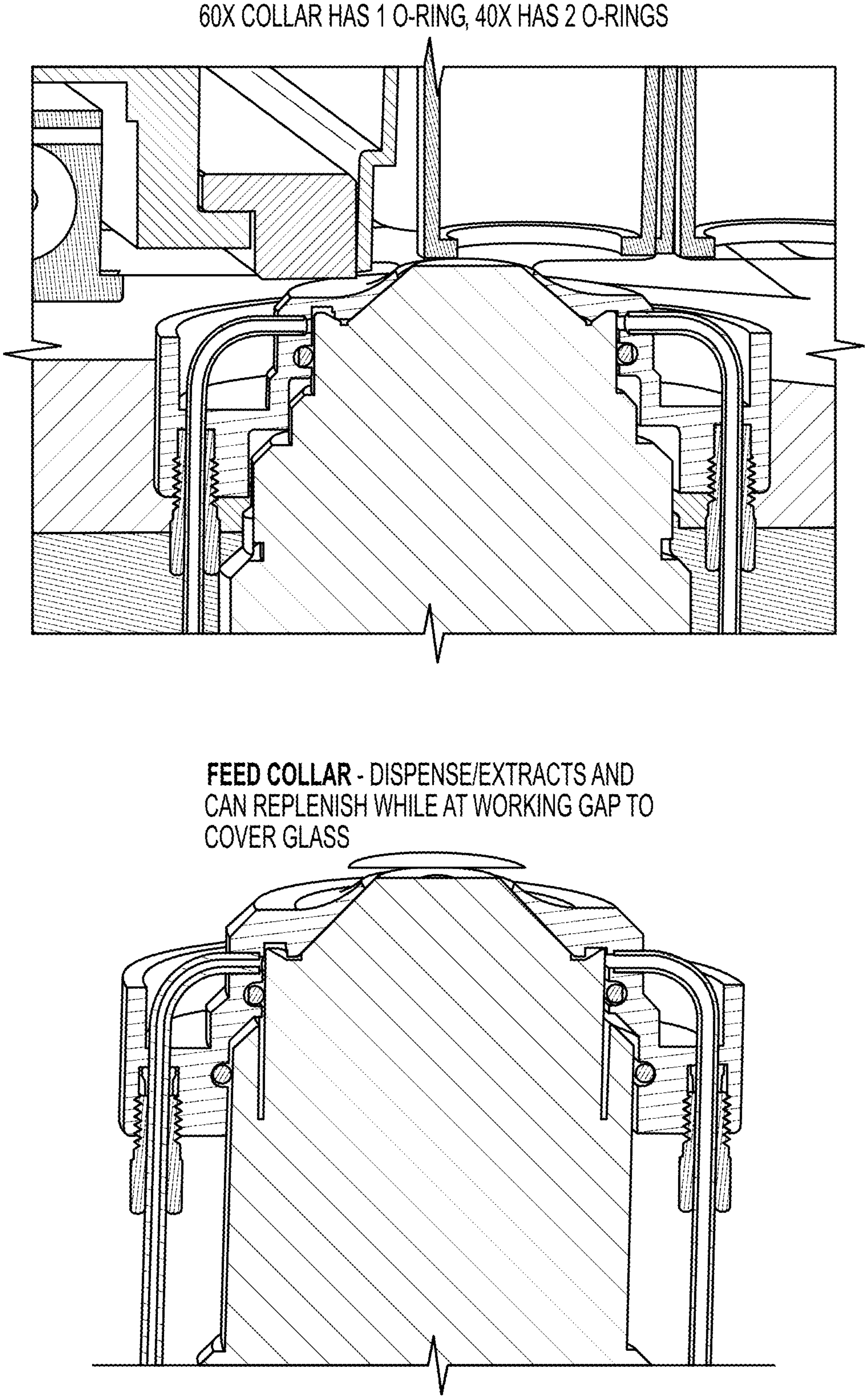
FIG. 29 shows a feed collar. The 60× objective has 1 O-ring and the 40× objective has 2 O-rings.
Figure 30:
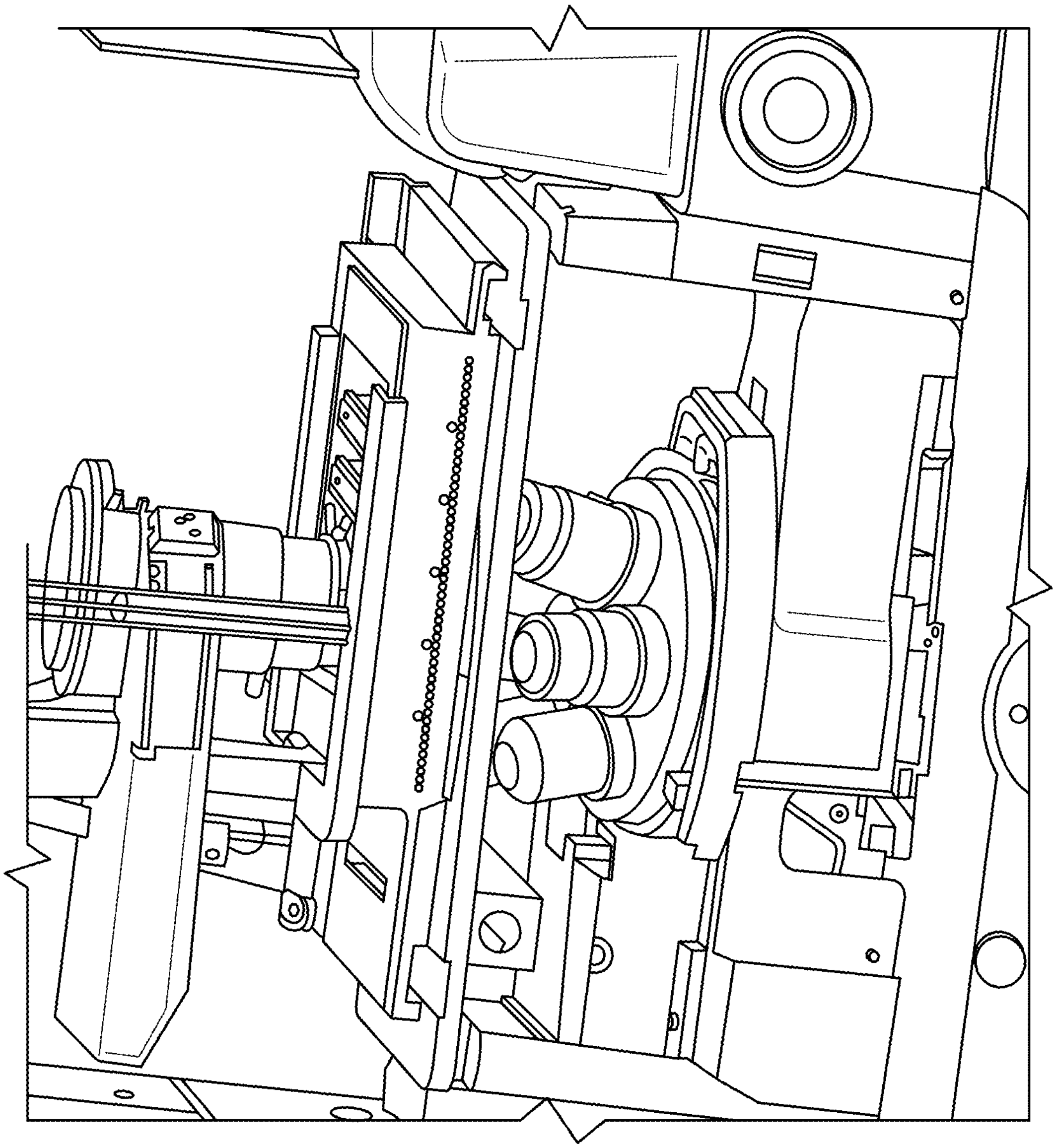
FIG. 30 shows a microscope with connections for an immersion water dispenser.
Figure 31:
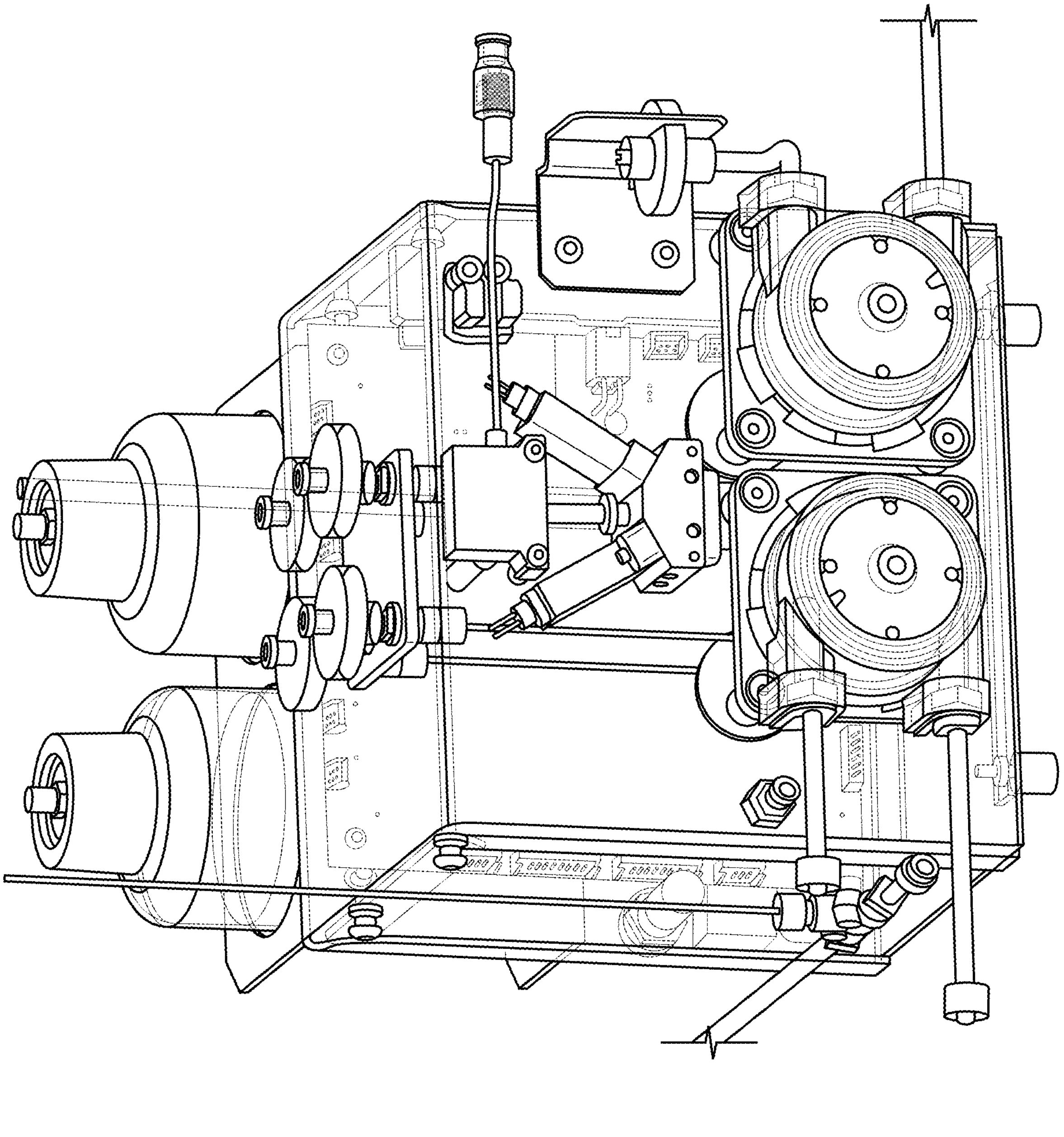
FIG. 31 shows an immersion water dispenser for use with a Nikon Ti2e microscope with connections for the 40× and 60× objectives.
Figure 32:
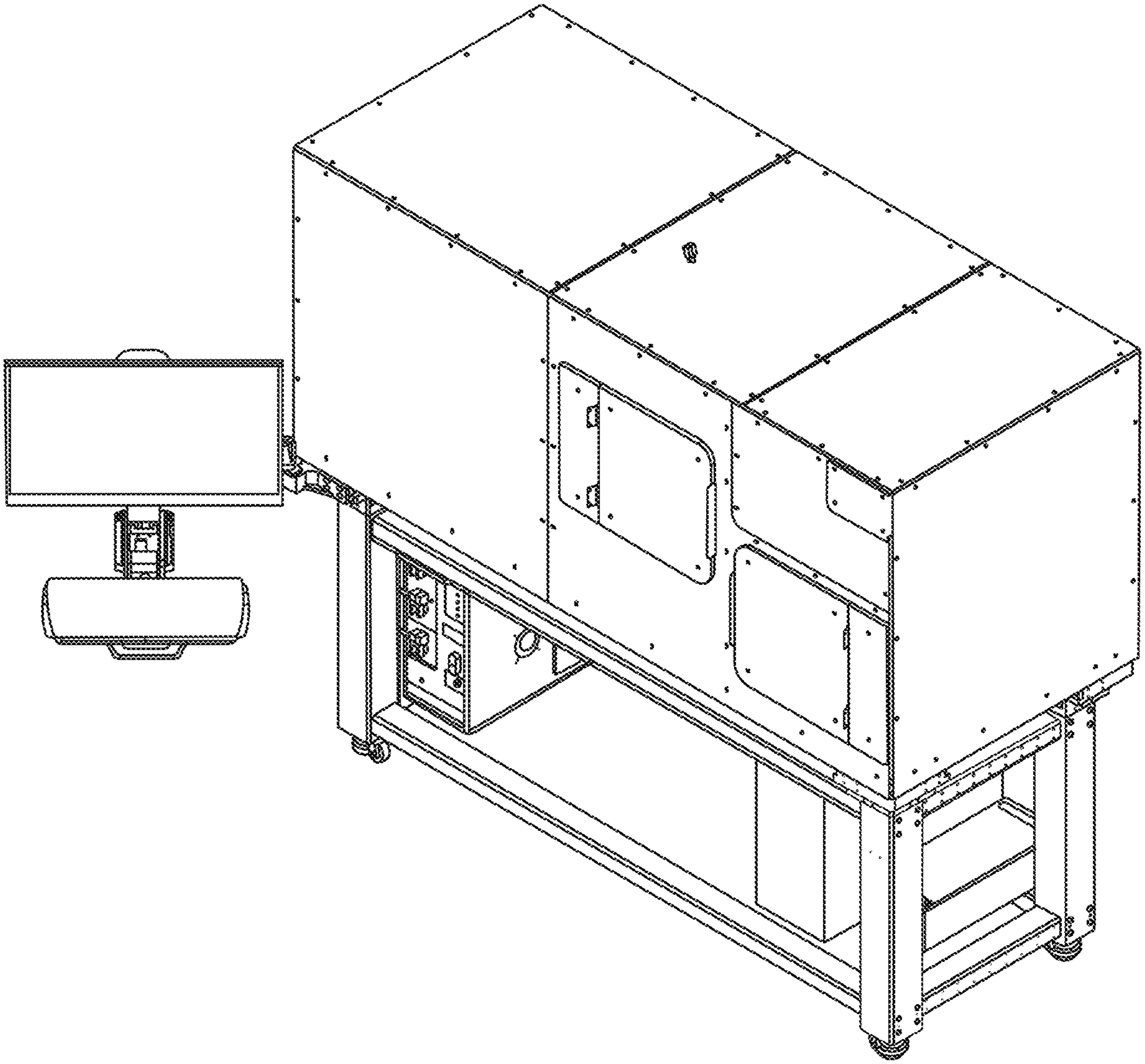
FIG. 32 shows a schematic of an enclosure for light sensitive samples on top of a table with a shelf underneath for a workstation and a display component attached to the table.
Figure 33:
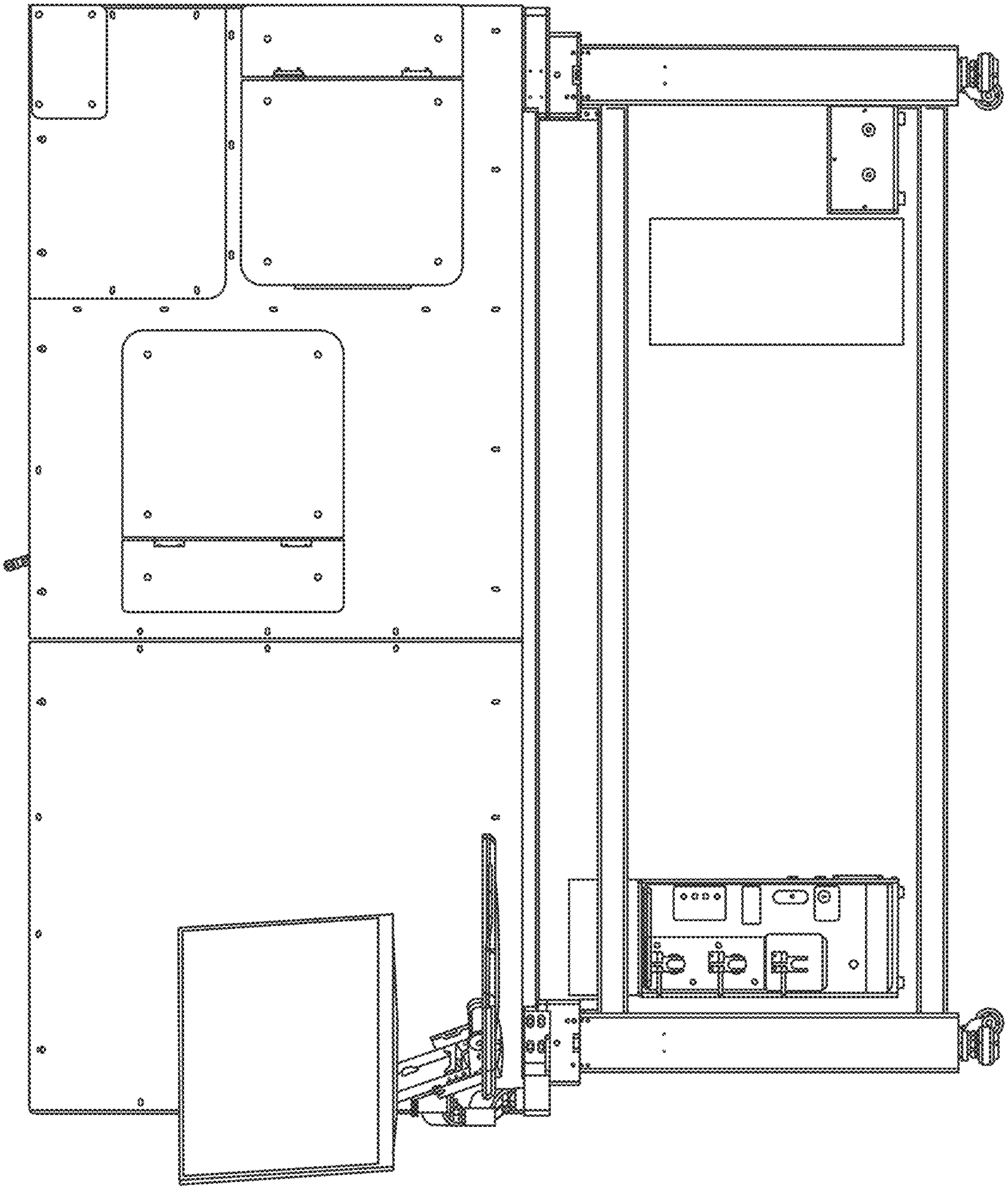
FIG. 33 shows a schematic of an enclosure for light sensitive samples on top of a table with a shelf underneath for a workstation and a display component on the table.
Figure 34:
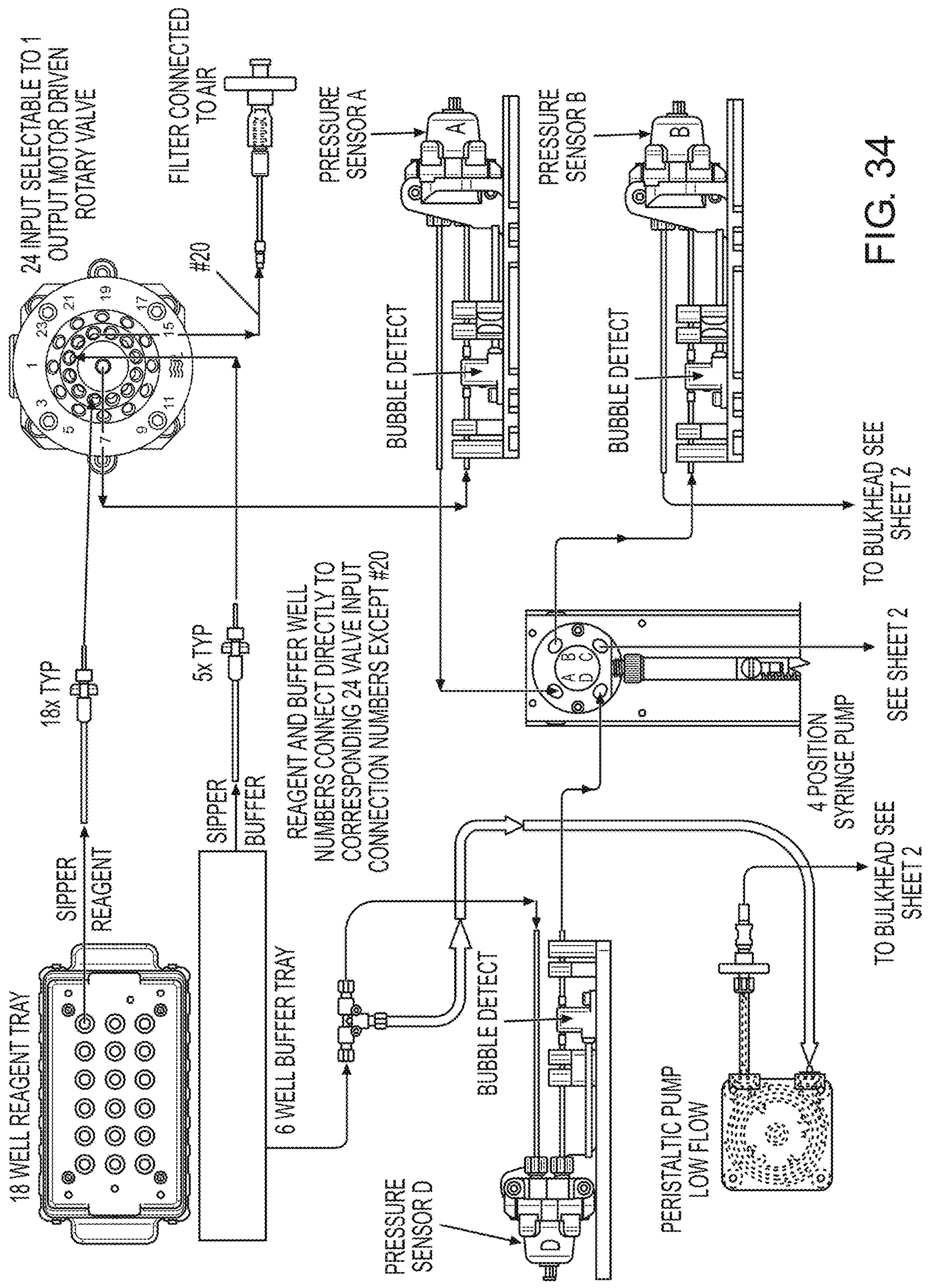
FIG. 34 shows a fluidics diagram for the automated fluid delivery system showing fluid lines connections to the reagent tray, buffer tray, peristaltic pump, motor driven rotary valve, pressure sensors, and bubble detectors.
Figure 35:
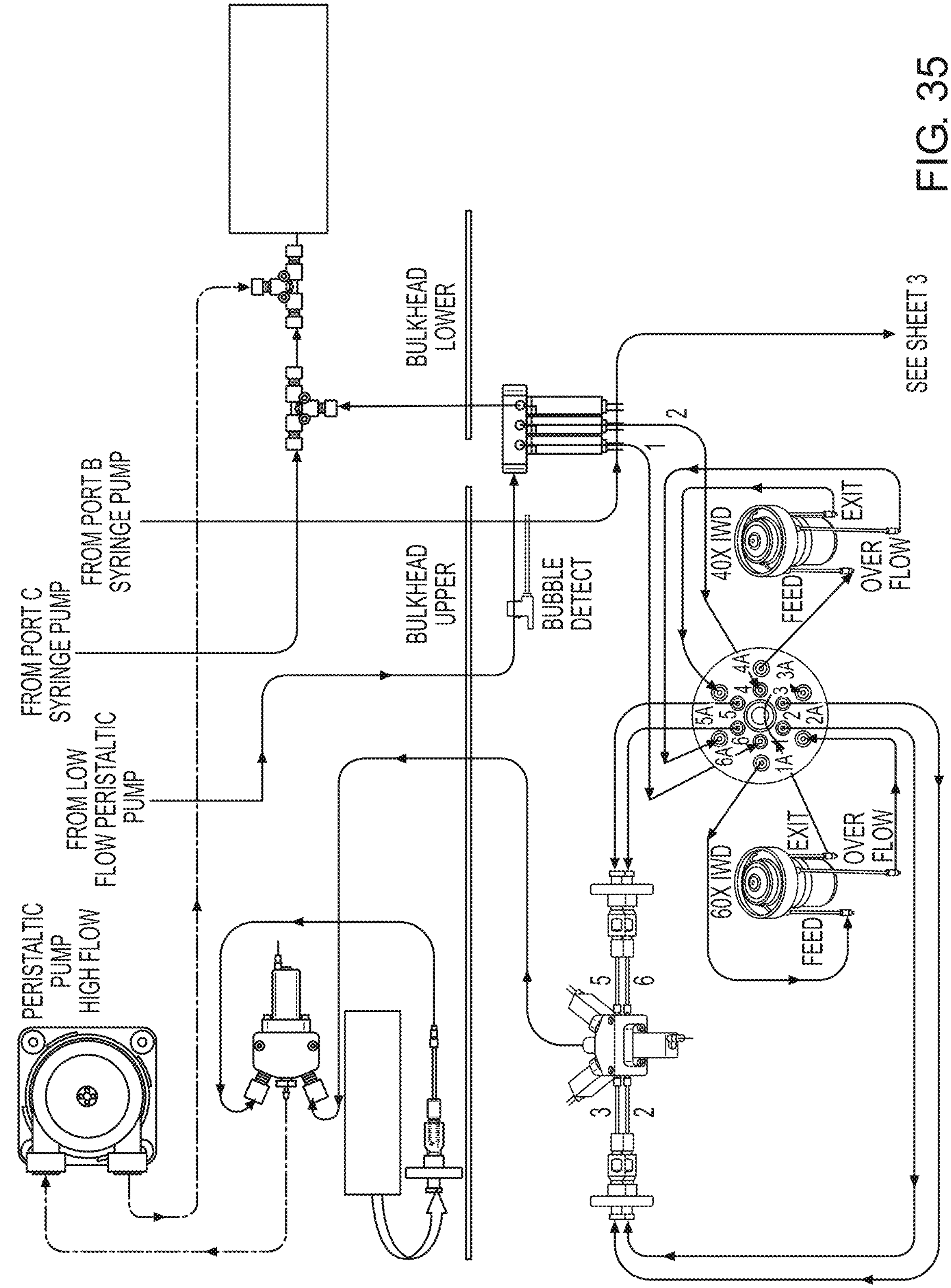
FIG. 35 shows a fluidics diagram with a series of pumps connected to the fluid lines with connections to the immersion media module and the 40× and 60× microscope objectives.
Figure 36:
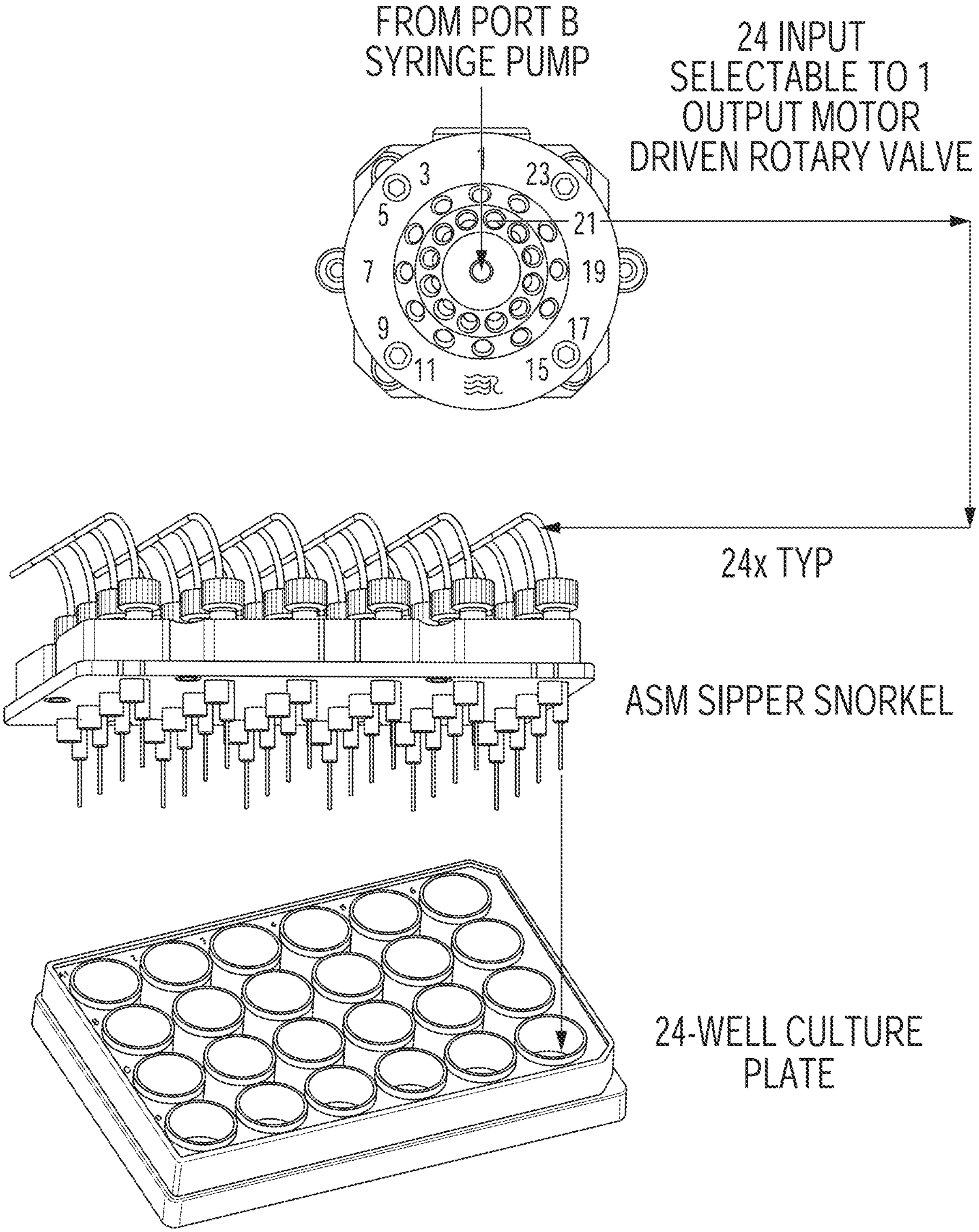
FIG. 36 shows a fluidics diagram with connections to a syringe pump, motor driven rotary valve, and multi-well plate.
Figure 37:
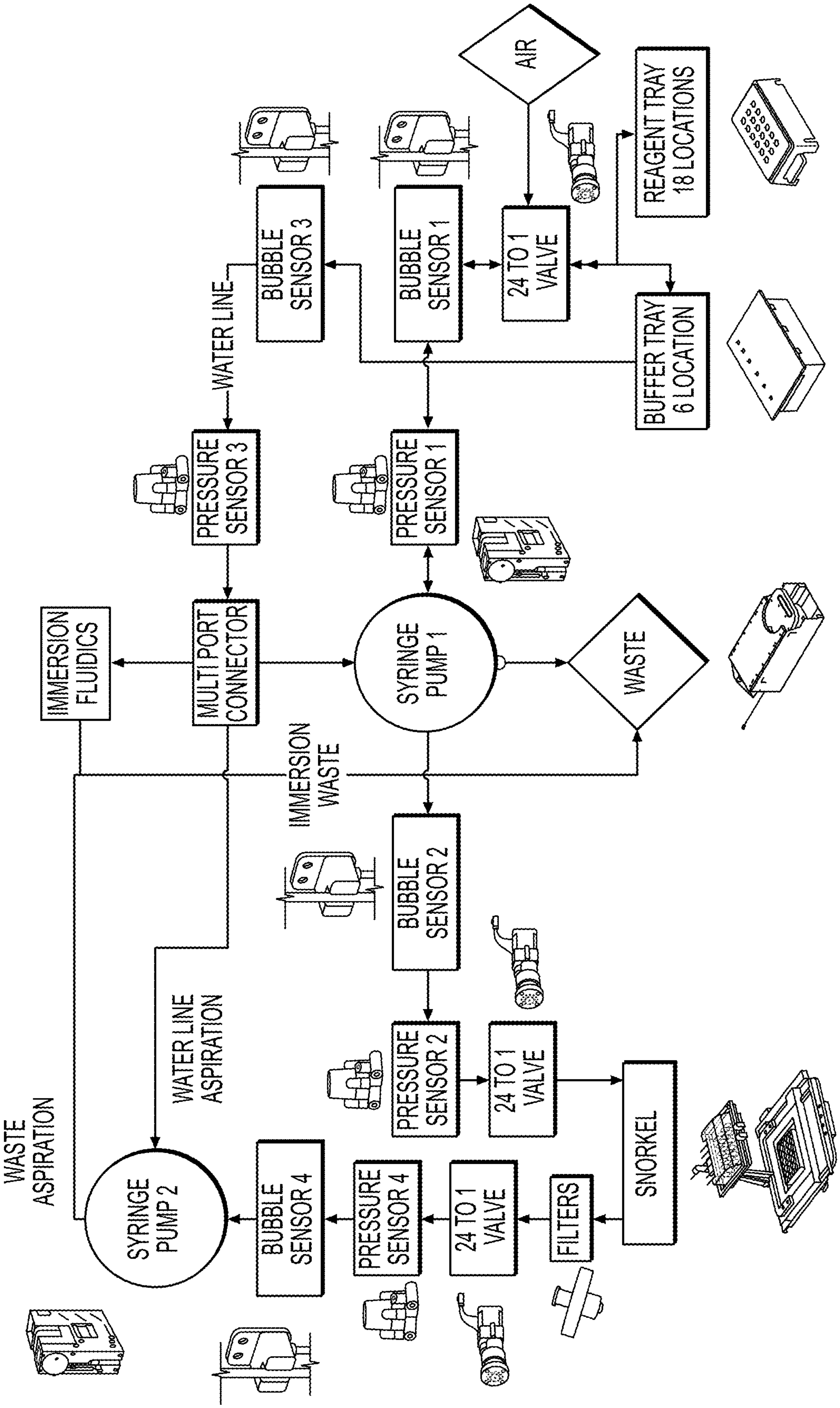
FIG. 37 shows an aspiration dual valve schematic.

A sequencer for automated in situ sequencing of volumetric tissue samples is provided. In particular, an automated volumetric in situ sequencing device capable of operating on multiple samples in parallel is provided. Methods of fabrication and use of the sequencer are also provided.

Before the sequencer for automated in situ sequencing of volumetric tissue samples and methods of fabrication and use of such a sequencer are described, it is to be understood that this invention is not limited to particular devices, methods, or compositions described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms “a”, “an”, and “the” include plural referents unless the context clearly dictates otherwise. Thus, for example, reference to “a cell” includes a plurality of such cells and reference to “the peptide” includes reference to one or more peptides and equivalents thereof, e.g. oligopeptides or polypeptides known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

The term “about”, particularly in reference to a given quantity, is meant to encompass deviations of plus or minus five percent.

The terms “peptide”, “oligopeptide”, “polypeptide”, and “protein” are used interchangeably herein to refer to a polymer of amino acid residues. The terms also apply to amino acid polymers in which one or more amino acid residue is an artificial chemical mimetic of a corresponding naturally occurring amino acid, as well as to naturally occurring amino acid polymers and non-naturally occurring amino acid polymers. Both full-length proteins and fragments thereof are encompassed by the definition. The terms also include post-expression modifications of the polypeptide, for example, phosphorylation, glycosylation, acetylation, hydroxylation, oxidation, and the like as well as chemically or biochemically modified or derivatized amino acids and polypeptides having modified peptide backbones. The terms also include fusion proteins, including, but not limited to, fusion proteins with a heterologous amino acid sequence, fusions with heterologous and homologous leader sequences, with or without N-terminal methionine residues; immunologically tagged proteins; and the like. The terms include polypeptides including one or more of a fatty acid moiety, a lipid moiety, a sugar moiety, and a carbohydrate moiety.

As used herein, the term “target nucleic acid” is any polynucleotide nucleic acid molecule (e.g., DNA molecule; RNA molecule, modified nucleic acid, etc.) present in a single cell. In some embodiments, the target nucleic acid is a coding RNA (e.g., mRNA). In some embodiments, the target nucleic acid is a non-coding RNA (e.g., tRNA, rRNA, microRNA (miRNA), mature miRNA, immature miRNA; etc.). In some embodiments, the target nucleic acid is a splice variant of an RNA molecule (e.g., mRNA, pre-mRNA, etc.) in the context of a cell. A suitable target nucleic acid can therefore be an unspliced RNA (e.g., pre-mRNA, mRNA), a partially spliced RNA, or a fully spliced RNA, etc. Target nucleic acids of interest may be variably expressed, i.e. have a differing abundance, within a cell population, wherein the methods of the invention allow profiling and comparison of the expression levels of nucleic acids, including without limitation RNA transcripts, in individual cells. A target nucleic acid can also be a DNA molecule, e.g. a denatured genomic, viral, plasmid, etc. For example, the methods can be used to detect copy number variants, e.g. in a cancer cell population in which a target nucleic acid is present at different abundance in the genome of cells in the population; a virus-infected cells to determine the virus load and kinetics, and the like.

The terms "oligonucleotide," "polynucleotide," and "nucleic acid molecule", used interchangeably herein, refer to polymeric forms of nucleotides of any length, either ribonucleotides or deoxyribonucleotides. Thus, this term includes, but is not limited to, single-, double-, or multi-stranded DNA or RNA, genomic DNA, cDNA, DNA-RNA hybrids, or a polymer including purine and pyrimidine bases or other natural, chemically or biochemically modified, non-natural, or derivatized nucleotide bases. The backbone of the polynucleotide can include sugars and phosphate groups (as may typically be found in RNA or DNA), or modified or substituted sugar or phosphate groups. Alternatively, the backbone of the polynucleotide can include a polymer of synthetic subunits such as phosphoramidites, and/or phosphorothioates, and thus can be an oligodeoxynucleoside phosphoramidate or a mixed phosphoramidate-phosphodiester oligomer. Peyrottes et al. (1996) Nucl. Acids Res. 24:1841-1848; Chaturvedi et al. (1996) Nucl. Acids Res. 24:2318-2323. The polynucleotide may include one or more L-nucleosides. A polynucleotide may include modified nucleotides, such as methylated nucleotides and nucleotide analogs, uracyl, other sugars, and linking groups such as fluororibose and thioate, and nucleotide branches. The sequence of nucleotides may be interrupted by non-nucleotide components. A polynucleotide may be modified to include N3'-P5' (NP) phosphoramidate, morpholino phosphorociamidate (MF), locked nucleic acid (LNA), 2'-O-methoxyethyl (MOE), or 2'-fluoro, arabino-nucleic acid (FANA), which can enhance the resistance of the polynucleotide to nuclease degradation (see, e.g., Faria et al. (2001) Nature Biotechnol. 19:40-44; Toulme (2001) Nature Biotechnol. 19:17-18). A polynucleotide may be further modified after polymerization, such as by conjugation with a labeling component. Other types of modifications included in this definition are caps, substitution of one or more of the naturally occurring nucleotides with an analog, and introduction of means for attaching the polynucleotide to proteins, metal ions, labeling components, other polynucleotides, or a solid support. Immunomodulatory nucleic acid molecules can be provided in various formulations, e.g., in association with liposomes, microencapsulated, etc., as described in more detail herein. A polynucleotide used in amplification is generally single-stranded for maximum efficiency in amplification, but may alternatively be double-stranded. If double-stranded, the polynucleotide can first be treated to separate its strands before being used to prepare extension products. This denaturation step is typically affected by heat, but may alternatively be carried out using alkali, followed by neutralization.

By "isolated" is meant, when referring to a protein, polypeptide, or peptide, that the indicated molecule is separate and discrete from the whole organism with which the molecule is found in nature or is present in the substantial absence of other biological macro molecules of the same type. The term "isolated" with respect to a polynucleotide is a nucleic acid molecule devoid, in whole or part, of sequences normally associated with it in nature; or a sequence, as it exists in nature, but having heterologous sequences in association therewith; or a molecule disassociated from the chromosome.

The terms "individual", "subject", "host", and "patient", are used interchangeably herein and refer to invertebrates and vertebrates including, but not limited to, arthropods (e.g., insects, crustaceans, arachnids), cephalopods (e.g., octopuses, squids), amphibians (e.g., frogs, salamanders, caecilians), fish, reptiles (e.g., turtles, crocodilians, snakes, amphisbaenians, lizards, tuatara), mammals, including human and non-human mammals such as non-human primates, including chimpanzees and other apes and monkey species; laboratory animals such as mice, rats, rabbits, hamsters, guinea pigs, and chinchillas; domestic animals such as dogs and cats; farm animals such as sheep, goats, pigs, horses and cows; and birds such as domestic, wild and game birds, including chickens, turkeys and other gallinaceous birds, ducks, and geese. In some cases, the methods of the invention find use in experimental animals, in veterinary application, and in the development of animal models for disease, including, but not limited to, rodents including mice, rats, and hamsters; primates, and transgenic animals.

The term "user" as used herein refers to a person that interacts with a device and/or system disclosed herein for performing one or more steps of the presently disclosed methods. The user may be a subject using the sequencing device described herein.

Sequencing Device

A sequencer for automated in situ sequencing of volumetric tissue samples is provided. In particular, an automated volumetric in situ sequencing device capable of operating on multiple samples in parallel is provided. In some embodiments, the sequencing device comprises an illumination and detection module, a microscope module, an automated immersion media module, a multi-well plate, a fluidic coupling tower or stand-alone fluidic module, a fluidic management module, a reagent, buffer, and waste module, an electrical module, and a processor.

In some embodiments, the illumination and detection module comprises a spinning disk confocal component comprising a plurality of laser lines for illumination with flat illumination correction, wherein the plurality of laser lines are used to illuminate a sample with excitation light at one or more wavelengths, a bandpass emission filter, a long-pass image splitter, a first camera that detects fluorescence emissions in a first wavelength range and a second camera that detects fluorescence emissions in a second wavelength range, wherein the first camera and the second camera can detect emissions simultaneously. In certain embodiments, the plurality of laser lines comprises at least 4 laser lines. In some embodiments, the plurality of laser lines comprises 5 laser lines used with a penta-bandpass emission filter. In certain embodiments, the motorized stage has a piezo z-axis. In other embodiments, the objective z axis drive is used and the motorized stage z is kept constant.

The microscope module comprises a motorized stage capable of multi-axis positioning along x, y, and z axes, an objective Z drive, an objective turret wheel comprising multiple objectives, wherein each objective provides a different magnification, and optics, wherein the optics route light from the objectives to the illumination and detection module. The objectives may include immersion objectives wherein each immersion objective has an objective immersion collar. In certain embodiments, an immersion objective further comprises an O-ring and a shrink-wrapped coating a multi-well plate, wherein the motorized stage, e.g., to prevent spills that can damage the optics or mechanical parts of the microscope. The objectives may also include dry objectives that have no immersion collar. In some embodiments, the microscope module comprises a confocal microscope. In some embodiments, the microscope module comprises an epifluorescent microscope.

The automated immersion media module comprises i) a container comprising immersion media, ii) fluidic lines coupled to the container and to the objective immersion collars of the objectives of the microscope module, wherein the fluidic lines carry immersion media to and from the objective immersion collars, wherein the immersion collars capture excess immersion media, and iii) a series of pumps connected to the fluidic lines and to a microcontroller, wherein the microcontroller controls the pumps addition and removal of the immersion media through the fluidic lines, wherein the automated immersion media module provides controlled volumes of the immersion media to the objective immersion collars at the tops of the objectives during imaging. In certain embodiments, the immersion media is water. In certain embodiments, the immersion media is filtered and bubble-free.

The motorized stage can be moved to position a well of the multi-well plate under the objective used for imaging. In some embodiments, a fluidic coupling tower is on top of the motorized stage and positions the fluidic lines in wells of the multi-well plate to allow addition or removal of the sample from the wells using the fluidic line. In some embodiments, the fluidic coupling interface is not attached to the motorized stage. Instead, a stand-alone fluidic coupling interface module is used, which is placed manually by a user over the sample plate and affixed to the stage, wherein the fluidic coupling interface couples the fluidic lines to the samples for the duration of sequencing.

The fluidic management module comprises a symmetrical rotary valve comprising a rotary valve mechanism, a pump, wherein the pump is connected to the fluidic lines, and bubble detectors, wherein the bubble detectors are positioned on either side of the fluidic lines leading to the pump, wherein the fluidic management module allows unidirectional or bidirectional movement of reagents, buffers, and waste through the fluidic lines. A series of bubble detectors may be used to ensure that the immersion fluid line is free of bubbles. In addition, bubbles may be avoided by adding a volume of fluid, removing excess fluid, then adding more fluid, and moving the stage to the well edge and back to the sample center to remove any additional bubbles that may form during immersion fluid addition.

The reagent, buffer, and waste module comprises a i) sliding tray, wherein reagent cartridges and buffer cartridges can be positioned in the sliding tray and coupled to the fluidic management module, ii) a waste module, wherein the waste module comprises a waste container coupled to a fluidic line from the fluid management pump, and iii) a capping mechanism, wherein the capping mechanism closes the waste container when the waste container is removed from the system for waste disposal and opens the waste container when the waste container is placed back into the system.

The electrical module comprises: i) a first firmware board controlling media dispensing from the automated immersion media module and ii) a second firmware board controlling the fluid management module and the reagent, buffer, and waste module, wherein the electrical module regulates power to the other modules of the system.

In certain embodiments, the sequencing device further comprises a pressure monitor to monitor pressure in the fluidic lines, wherein increases in pressure in a fluidic line can be used to detect a potential blockage of the fluidic line.

In certain embodiments, the sequencing device further comprises a plurality of light-emitting diodes (LEDs), wherein each LED can emit light to provide a status indication for the system.

In certain embodiments, the sequencing device comprises a processor programmed to provide a user interface and operate the modules of the sequencing device. In some embodiments, the sequencing device further comprises a display component for displaying information and providing a user interface.

In certain embodiments, the processor is further programmed to perform steps comprising: (a) locating a selected sample in the multi-well plate; (b) detecting a signal in the XY plane from the selected sample at low magnification using widefield imaging mode acquisition with camera binning; (c) using the signal to segment an XY bounding box around the sample; (d) imaging the sample within the XY bounding box to produce an image, wherein imaging is performed in confocal imaging mode in Z at higher magnification than used in step (b) with camera binning in order to determine the approximate Z extent of the sample, wherein a single Z plane is collected through the midpoint of the Z extent previously determined and across the XY extent; (e) displaying the image produced in step (d); (f) providing an interface for a user to refine a desired XY region of interest in the sample to be further imaged during sequencing of the selected sample; (g) imaging the sample in the selected XY region of interest across the previously sampled Z extents; (h) calculating a volume of the region of interest in the sample and displaying the calculated sample volume of the region of interest to the user; (i) segmenting the image of the sample in the region of interest along the Z extents; (j) providing an interface to the user for the user to adjust the Z extents of the sample volume before beginning sequencing, wherein the imaging extents derived from the region of interest defined by the user are automatically converted into appropriate montaged fields of view for a given imaging objective and to adjust microscope stage positions, objective Z positioning, and piezo bounds for imaging of the region of interest along XYZ axes during sequencing; and (k) reiterating steps (a)-(j) to define regions of interest for each sample in the multi-well plate that the user intends to sequence.

In certain embodiments, the processor is further programmed to perform steps comprising: providing an interface to the user for the user to select one or more samples for sequencing and a sequencing protocol, wherein the user is limited in how many samples can be selected depending on amounts of buffer and reagents that are available and the selected sequencing protocol; providing constraints on total sequencing time, total data acquired, rate of acquisition, and maximum total volume of regions of interest across all samples that are to be sequenced and imaged, and suggesting protocols that maximize sequencing of desired regions of interest in samples within the constraints. In certain embodiments, the processor is further programmed to optimize sample sequencing parallelization depending on number of samples to be sequenced and imaging types to be used in sequencing.

In certain embodiments, the processor is further programmed to perform steps comprising: performing a rapid confocal or epifluorescent sweep in Z at a starting XY position of a given sample montage to determine a Z profile of the sample at the starting XY position; determining the sample top and bottom interface using a segmentation method; and setting the objective Z position at a fixed distance from the interface at the beginning of the sample montage, wherein drift in Z of the sample relative to the stage and the objective across rounds is reduced to below a selected tolerance to facilitate downstream subpixel registration across rounds during post-acquisition processing.

In certain embodiments, the sequencing is in situ sequencing of a target nucleic acid in a tissue sample. In some embodiments, the tissue sample is a thick tissue slice having a thickness of 50-200 μm. In other embodiments, the tissue sample is a thin tissue slice having a thickness of 5-20 μm. In some embodiments, the in situ sequencing is sequential or combinatorial in situ sequencing.

Modular Uses of Sequencer Components

In some embodiments, the fluidics components may act as a standalone sequencing module for use with any compatible imaging system. The fluid lines to the sample may be coupled to a sample plate and microscope stage magnetically and/or mechanically, such that the coupling is easily attachable to and detachable from an engaged position, and such that the fluidic components are coupled to sample wells. In one instance of this coupling, fluid lines addressed to each sample well are bundled together and routed to each sample well via a detachable plate lid (see schematic), which couples via a mechanical guide and magnetic fixture to a microscope stage. In another embodiment of the coupling, a modular coupling tower is provided to be affixed to the microscope stage. When used as a standalone sequencing module, the fluidic components facilitate the use of reagent and buffer kits and the automation of fluid exchange from multiple sample wells across multiple cycles of fluid addition and removal. When used as a device for in situ sequencing, the fluidic components may be coupled to an existing microscopy set up that is compatible with the sample format, for example, an inverted microscope. When used with thin section samples (5-20 μm), the microscope may be an epifluorescent microscope with 3, 4, or 5 illumination or detection channels. When used with thin or thick section samples, the microscope may be an epifluorescent microscope, a confocal microscope (spinning disk or point scanning), a structured illumination microscope, or a light sheet or oblique-plane light sheet microscope.

An immersion water dispensing module (IWD) can be used as a submodule of an integrated fluidic system for a sequencer. Alternatively, it can be used as a standalone kit for automated immersion of microscope immersion objectives. In one instance it is used in tandem with the reagent/buffer/consumables fluidic module to enable parallel and automated sequencing of samples on a separate and existing microscope set up. In this instance the immersion fluid reservoir and the immersion fluid waste are external to the fluidic device so that the user may manually fill the immersion fluid reservoir and empty the waste reservoir. The immersion water dispensing module connects to microscope objectives via the immersion collar, which is designed to flow immersion liquid across the imaging glass of the objective such that no bubbles are introduced and the volume of liquid and flow rate are precise and consistent, while providing a tight seal against the objective body such that excess liquid can be removed. The exact dimensions of the immersion collar are adjusted to match specific objective lenses to ensure a proper fit but the function of the other immersion water dispensing module subcomponents are agnostic to the make and manufacture of the imaging system.

The software controlling the sequencer provides an abstraction layer over the control of the illumination, detection, microscope, and stage components and thus may be used modularly with a variety of imaging set ups, provided that an appropriate configuration file or other hardware plugins are provided. Thus, a particular imaging and microscopy set up is not privileged in the operation of the sequencer and the software, objective immersion module, sample, reagent and buffer fluidics, and consumables may be used modularly and reconfigured into one or more combinations of components.

In some embodiments, the reagent and buffer fluid components draw fluids from reusable reservoirs. In another embodiment of the sequencer, the reagent and buffer fluid components draw fluids from consumable reservoirs. In one instance consumable reservoirs are sealed after they are filled, and the seal is punctured by the sipper needles of the reagent/buffer fluidic module. In one instance the seals are supported mechanically in the assembly of the consumable to ensure consistent puncturing of the seal and to avoid excess forces on the sipper needles or forces not aligned to the parallel axes of the sipper needles. Consumable reservoirs are normally replaced at the beginning of each use of the sequencer and their use is tracked programmatically through detection of the identity of the consumable. In one instance the detection of the consumable performed through the use of a RFID integrated into the consumable and an RFID reader in the sequencer fluidic module. In another embodiment the detection of the consumable is performed through the use of a barcode on the consumable and a barcode scanner integrated into the sequencer fluidic module.

In another embodiment, the fluid module draws from buffers and reagents used in in situ sequencing cycles. In one instance of the fluidic module, some or all of the buffers or reagents are chilled by a refrigeration component. In some embodiments of the fluidic module, some or all of the buffers or reagents are temperature sensitive, for example, enzymes such as ligase or molecules such as ATP involved in SCAL, SEDAL, or SEDAL2 sequencing chemistries. In another embodiment, the buffer and reagent fluidic modules draw liquids used in other sequencing or cyclical labeling chemistries, for instance, oligos used to hybridize to sequences in a sample, or fluorescently labeled oligos used to detect hybridization events in a sample. In another embodiment, the buffer and reagent fluidic modules draw liquids used for the labeling of samples with dyes. In another embodiment, the buffer and reagent fluidic modules draw liquids used for CLICK chemistry reactions with the sample. In another embodiment, the buffer and reagent fluidic modules draw liquids to quench fluorescent signal in the sample. In another embodiment, the buffer and reagent fluidic modules draw fluids containing enzymatic components that add or remove signals from a sample.

Computer Implemented Methods

The present disclosure provides systems and computer implemented methods which find use in using the sequencing device described herein. In certain embodiments, the sequencing device comprises a processor programmed to provide a user interface and operate the modules of the sequencing device. In some embodiments, the sequencing device further comprises a display component for displaying information and providing a user interface. The system may also comprise one or more graphic boards for processing and outputting graphical information of a tissue image to the display component.

In some embodiments, a computer implemented method is used to provide an interface between a user and the sequencer firmware and hardware, for example, to perform sequencing run set up, select sequencing run options, and select and define a sample region of interest (ROI). The computer implemented methods may be used to control the different modules of the sequencing device and parallelization of sequencing across samples, and provide logging, error monitoring, data acquisition, management and transfer, and run progress monitoring.

In one embodiment, a computer implemented method is provided, the computer performing steps comprising: (a)

locating a selected sample in the multi-well plate; (b) detecting a signal in the XY plane from the selected sample at low magnification using widefield imaging mode acquisition with camera binning; (c) using the signal to segment an XY bounding box around the sample; (d) imaging the sample within the XY bounding box to produce an image, wherein imaging is performed in confocal imaging mode in Z at higher magnification than used in step (b) with camera binning in order to determine the approximate Z extent of the sample, wherein a single Z plane is collected through the midpoint of the Z extent previously determined and across the XY extent; (e) displaying the image produced in step (d); (f) providing an interface for a user to select a desired XY region of interest in the sample to be further imaged during sequencing of the selected sample; (g) imaging the sample in the selected XY region of interest across the previously sampled Z extents; (h) calculating a sample volume of the region of interest and displaying the calculated sample volume of the region of interest to the user; (i) segmenting the image of the sample in the region of interest along Z extents; (j) providing an interface to the user for the user to adjust the Z extents of the sample volume before beginning sequencing, wherein the imaging extents derived from the region of interest defined by the user are automatically converted into appropriate montaged fields of view for a given imaging objective and to adjust microscope stage positions, objective Z positioning, and piezo bounds for imaging of the region of interest along XYZ axes during sequencing; and (k) reiterating steps (a)-(j) to define regions of interest for each sample in the multi-well plate that the user intends to sequence.

In another embodiment, a computer implemented method is provided, the computer performing steps comprising: providing an interface to the user for the user to select one or more samples for sequencing and a sequencing protocol, wherein the user is limited in how many samples can be selected depending on amounts of buffer and reagents available and the selected sequencing protocol; providing constraints on total sequencing time, total data acquired, rate of acquisition, and maximum total volume of regions of interest across all samples that are to be sequenced and imaged, and suggesting protocols that maximize sequencing of desired regions of interest in samples within the constraints. In some embodiments, the computer is further programmed to optimize sample sequencing parallelization depending on number of samples to be sequenced and imaging types to be used in sequencing.

In another embodiment, a computer implemented method is provided, the computer performing steps comprising: performing a rapid confocal sweep in Z at a starting XY position of a given sample montage to determine a Z profile of the sample at the starting XY position; determining the sample top and bottom interface using a segmentation method; and setting the objective Z position at a fixed distance from the interface at the beginning of the sample montage, wherein drift in Z of the sample relative to the stage and the objective across rounds is reduced to below a selected tolerance to facilitate downstream subpixel registration across rounds during post-acquisition processing.

The method can be implemented in digital electronic circuitry, or in computer software, firmware, or hardware. The disclosed and other embodiments can be implemented as one or more computer program products, i.e., one or more modules of computer program instructions encoded on a computer readable medium for execution by, or to control the operation of, a data processing apparatus. The computer readable medium can be a machine-readable storage device, a machine-readable storage substrate, a memory device, a composition of matter effecting a machine-readable propagated signal, or any combination thereof.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

In a further aspect, the system for performing the computer implemented method, as described, may include a processor, a storage component (i.e., memory), a display component, and other components typically present in general purpose computers. The storage component stores information accessible by the processor, including instructions that may be executed by the processor and data that may be retrieved, manipulated or stored by the processor.

The storage component includes instructions. For example, the storage component may include instructions for providing a user interface for the sequencing device, operating the sequencing device, and processing in situ sequencing imaging data, as described herein. The computer processor is coupled to the storage component and configured to execute the instructions stored in the storage component in order to receive in situ sequencing imaging data and analyze the data according to one or more algorithms, as described herein. The display component displays information and provides a user interface.

The storage component may be of any type capable of storing information accessible by the processor, such as a hard-drive, memory card, ROM, RAM, DVD, CD-ROM, USB Flash drive, write-capable, and read-only memories. The processor may be any well-known processor, such as processors from Intel Corporation. Alternatively, the processor may be a dedicated controller such as an ASIC.

In certain embodiments, the in situ sequencing imaging data are uploaded and stored in a cloud data storage system. In some embodiments, the cloud data storage system is a public cloud storage system. In other embodiments, the cloud data storage system is a private cloud storage system. Cloud data storage may be used to store raw images, intermediate processed files, and final data products. Processing may begin with the upload of a dataset into cloud storage by a data acquisition system. Configuration parameters such as the encoding scheme, codebook, image acquisition parameters, and sample metadata can be input by a user using a data management web interface or generated automatically from a configuration file uploaded into cloud storage along with the sequencing data. Each set of configuration parameters is stored in a cloud database. In some cases, multiple processing runs using different configuration parameters can be applied to a single dataset to optimize processing parameters.

The instructions may be any set of instructions to be executed directly (such as machine code) or indirectly (such as scripts) by the processor. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance.

Data may be retrieved, stored or modified by the processor in accordance with the instructions. For instance, although the system is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information which is used by a function to calculate the relevant data.

In certain embodiments, the processor and storage component may comprise multiple processors and storage components that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may comprise a collection of processors which may or may not operate in parallel.

In some embodiments, the method can be performed using a cloud computing system. In some embodiments, the image data files and programming for processing the imaging data can be exported to a cloud computer, which runs the program, and returns an output to the user. The method may include optional compression of the imaging data before transfer to reduce data size and increase transfer speed. During the data acquisition process, acquired images are coupled with metadata files detailing the optical specifications, stage positions, and sequencing information; the optional compression of imaging data as a separate process from the imaging acquisition; and the optional offloading of data from the acquisition to a remote cloud storage medium, a networked attached storage system, or a separate large file system.

Components of systems for carrying out the presently disclosed methods are further described in the examples below.

In Situ Gene Sequencing

The sequencing device disclosed herein may be used for in situ gene sequencing of a target nucleic acid in a cell in an intact tissue. In situ sequencing may be performed by a method comprising: (a) contacting a fixed and permeabilized intact tissue with at least a pair of oligonucleotide primers under conditions to allow for specific hybridization, wherein the pair of primers comprise a first oligonucleotide and a second oligonucleotide; wherein each of the first oligonucleotide and the second oligonucleotide comprises a first complementarity region, a second complementarity region sequence, and a third complementarity region; wherein the second oligonucleotide further comprises a barcode sequence; wherein the first complementarity region of the first oligonucleotide is complementary to a first portion of the target nucleic acid, wherein the second complementarity region of the first oligonucleotide is complementary to the first complementarity region of the second oligonucleotide, wherein the third complementarity region of the first oligonucleotide is complementary to the third complementarity region of the second oligonucleotide, wherein the second complementary region of the second oligonucleotide is complementary to a second portion of the target nucleic acid, wherein the first portion of the target nucleic is adjacent to the second portion of the target nucleic acid; (b) adding ligase to ligate the second oligonucleotide and generate a closed nucleic acid circle; (c) performing rolling circle amplification in the presence of a nucleic acid molecule, wherein the performing comprises using the second oligonucleotide as a template and the first oligonucleotide as a primer for a polymerase to form one or more amplicons; (d) embedding the one or more amplicons in the presence of hydrogel subunits to form one or more hydrogel-embedded amplicons; (e) contacting the one or more hydrogel-embedded amplicons having the barcode sequence with a set of sequencing primers under conditions to allow for ligation, wherein the set of sequencing primers comprises a third oligonucleotide configured to decode bases and a fourth oligonucleotide configured to convert decoded bases into a signal, wherein the ligation only occurs when both the third oligonucleotide and the fourth oligonucleotide are complementary to adjacent sequences of the same amplicon; (f) reiterating step (e); and (g) imaging the one or more hydrogel-embedded amplicons using the sequencing device described herein to determine a gene sequence of the target nucleic acid in situ in the cell in the intact tissue.

In some embodiments, in situ sequencing is performed using Sequencing with Error-correction by Dynamic Annealing and Ligation (SEDAL) to determine a sequence of a target nucleic acid. The SEDAL method comprises contacting one or more hydrogel-embedded amplicons having the barcode sequence with a pair of primers under conditions to allow for ligation, wherein the pair of primers include a third oligonucleotide and a fourth oligonucleotide, wherein the ligation only occurs when both the third oligonucleotide and the fourth oligonucleotide ligate to the same amplicon. In some embodiments, SEDAL is used with STARmap. In such embodiments, the method herein includes operating at room temperature for best preservation of tissue morphology with low background noise and error reduction. In such other embodiments, the contacting the one or more hydrogel-embedded amplicons includes eliminating error accumulation as sequencing proceeds.

In some embodiments, the contacting the one or more hydrogel-embedded amplicons occurs two times or more, including, but not limited to, e.g., three times or more, four times or more, five times or more, six times or more, or seven times or more. In certain embodiments, the contacting the one or more hydrogel-embedded amplicons occurs four times or more for thin tissue specimens. In other embodiments, the contacting the one or more hydrogel-embedded amplicons occurs six times or more for thick tissue specimens. In some embodiments, one or more amplicons can be contacted by a pair of primers for 24 or more hours, 24 or less hours, 18 or less hours, 12 or less hours, 8 or less hours, 6 or less hours, 4 or less hours, 2 or less hours, 60 or less minutes, 45 or less minutes, 30 or less minutes, 25 or less minutes, 20 or less minutes, 15 or less minutes, 10 or less minutes, 5 or less minutes, or 2 or less minutes.

Specimens prepared using the subject methods may be analyzed by any of a number of different types of microscopy, for example, optical microscopy (e.g. bright field, oblique illumination, dark field, phase contrast, differential interference contrast, interference reflection, epifluorescence, confocal, etc., microscopy), laser microscopy, electron microscopy, and scanning probe microscopy. In some aspects, a non-transitory computer readable medium transforms raw images acquired through microscopy of multiple rounds of in situ sequencing first into decoded gene identities and spatial locations and then analyzes the per-cell composition of gene expression.

SEDAL Oligonucleotide Primers

In some embodiments, the methods disclosed include a third oligonucleotide and a fourth oligonucleotide. In certain aspects, the third oligonucleotide is configured to decode bases and the fourth oligonucleotide is configured to convert decoded bases into a signal. In some aspects, the signal is a fluorescent signal. In exemplary aspects, the contacting the one or more hydrogel-embedded amplicons having the barcode sequence with a pair of primers under conditions to allow for ligation involves each of the third oligonucleotide and the fourth oligonucleotide ligating to form a stable product for imaging only when a perfect match occurs. In certain aspects, the mismatch sensitivity of a ligase enzyme is used to determine the underlying sequence of the target nucleic acid molecule.

The term "perfectly matched", when used in reference to a duplex means that the polynucleotide and/or oligonucleotide strands making up the duplex form a double stranded structure with one another such that every nucleotide in each strand undergoes Watson-Crick base pairing with a nucleotide in the other strand. The term "duplex" includes, but is not limited to, the pairing of nucleoside analogs, such as deoxyinosine, nucleosides with 2-aminopurine bases, peptide nucleic acids (PNAs), and the like, that may be employed. A "mismatch" in a duplex between two oligonucleotides means that a pair of nucleotides in the duplex fails to undergo Watson-Crick bonding.

In some embodiments, the method includes a plurality of third oligonucleotides, including, but not limited to, 5 or more third oligonucleotides, e.g., 8 or more, 10 or more, 12 or more, 15 or more, 18 or more, 20 or more, 25 or more, 30 or more, 35 or more that hybridize to target nucleotide sequences. In some embodiments, a method of the present disclosure includes a plurality of third oligonucleotides, including, but not limited to, 15 or more third oligonucleotides, e.g., 20 or more, 30 or more, 40 or more, 50 or more, 60 or more, 70 or more, and up to 80 different first oligonucleotides that hybridize to 15 or more, e.g., 20 or more, 30 or more, 40 or more, 50 or more, 60 or more, 70 or more, and up to 80 different target nucleotide sequences. In some embodiments, the methods include a plurality of fourth oligonucleotides, including, but not limited to, 5 or more fourth oligonucleotides, e.g., 8 or more, 10 or more, 12 or more, 15 or more, 18 or more, 20 or more, 25 or more, 30 or more, 35 or more. In some embodiments, a method of the present disclosure includes a plurality of fourth oligonucleotides including, but not limited to, 15 or more fourth oligonucleotides, e.g., 20 or more, 30 or more, 40 or more, 50 or more, 60 or more, 70 or more, and up to 80 different first oligonucleotides that hybridize to 15 or more, e.g., 20 or more, 30 or more, 40 or more, 50 or more, 60 or more, 70 or more, and up to 80 different target nucleotide sequences. A plurality of oligonucleotide pairs can be used in a reaction, where one or more pairs specifically bind to each target nucleic acid. For example, two primer pairs can be used for one target nucleic acid in order to improve sensitivity and reduce variability. It is also of interest to detect a plurality of different target nucleic acids in a cell, e.g. detecting up to 2, up to 3, up to 4, up to 5, up to 6, up to 7, up to 8, up to 9, up to 10, up to 12, up to 15, up to 18, up to 20, up to 25, up to 30, up to 40 or more distinct target nucleic acids.

In certain embodiments, SEDAL involves a ligase with activity hindered by base mismatches, a third oligonucleotide, and a fourth oligonucleotide. The term "hindered" in this context refers to activity of a ligase that is reduced by approximately 20% or more, such as by 25% or more, such as by 50% or more, such as by 75% or more, such as by 90% or more, such as by 95% or more, such as by 99% or more, such as by 100%. In some embodiments, the third oligonucleotide has a length of 5-15 nucleotides, including, but not limited to, 5-13 nucleotides, 5-10 nucleotides, or 5-8 nucleotides. In some embodiments, the $T_m$ of the third oligonucleotide is at room temperature (22-25° C.). In some embodiments, the third oligonucleotide is degenerate, or partially thereof. In some embodiments, the fourth oligonucleotide has a length of 5-15 nucleotides, including, but not limited to, 5-13 nucleotides, 5-10 nucleotides, or 5-8 nucleotides. In some embodiments, the $T_m$ of the fourth oligonucleotide is at room temperature (22-25° C.). After each cycle of SEDAL corresponding to a base readout, the fourth oligonucleotides may be stripped, which eliminates error accumulation as sequencing proceeds. In such embodiments, the fourth oligonucleotides are stripped by formamide.

In some embodiments, SEDAL involves the washing of the third oligonucleotide and the fourth oligonucleotide to remove unbound oligonucleotides, thereafter revealing a fluorescent product for imaging. In certain exemplary embodiments, a detectable label can be used to detect one or more nucleotides and/or oligonucleotides described herein. In certain embodiments, a detectable label can be used to detect the one or more amplicons. Examples of detectable markers include various radioactive moieties, enzymes, prosthetic groups, fluorescent markers, luminescent markers, bioluminescent markers, metal particles, protein-protein binding pairs, protein-antibody binding pairs and the like. Examples of fluorescent proteins include, but are not limited to, yellow fluorescent protein (YFP), green fluorescence protein (GFP), cyan fluorescence protein (CFP), umbelliferone, fluorescein, fluorescein isothiocyanate, rhodamine, dichlorotriazinylamine fluorescein, dansyl chloride, phycoerythrin and the like. Examples of bioluminescent markers include, but are not limited to, luciferase (e.g., bacterial, firefly, click beetle and the like), luciferin, aequorin and the like. Examples of enzyme systems having visually detectable signals include, but are not limited to, galactosidases, glucorimidases, phosphatases, peroxidases, cholinesterases and the like. Identifiable markers also include radioactive compounds such as $^{125}I$, $^{35}S$, $^{14}C$, or $^{3}H$. Identifiable markers are commercially available from a variety of sources.

Fluorescent labels and their attachment to nucleotides and/or oligonucleotides are described in many reviews, including Haugland, Handbook of Fluorescent Probes and Research Chemicals, Ninth Edition (Molecular Probes, Inc., Eugene, 2002); Keller and Manak, DNA Probes, 2nd Edition (Stockton Press, New York, 1993); Eckstein, editor, Oligonucleotides and Analogues: A Practical Approach (IRL Press, Oxford, 1991); and Wetmur, Critical Reviews in Biochemistry and Molecular Biology, 26:227-259 (1991). Particular methodologies applicable to the invention are disclosed in the following sample of references: U.S. Pat. Nos. 4,757,141, 5,151,507 and 5,091,519. In one aspect, one or more fluorescent dyes are used as labels for labeled target sequences, e.g., as disclosed by U.S. Pat. No. 5,188,934 (4,7-dichlorofluorescein dyes); U.S. Pat. No. 5,366,860 (spectrally resolvable rhodamine dyes); U.S. Pat. No. 5,847,162 (4,7-dichlororhodamine dyes); U.S. Pat. No. 4,318,846 (ether-substituted fluorescein dyes); U.S. Pat. No. 5,800,996

(energy transfer dyes); Lee et al.; U.S. Pat. No. 5,066,580 (xanthine dyes); U.S. Pat. No. 5,688,648 (energy transfer dyes); and the like. Labelling can also be carried out with quantum dots, as disclosed in the following patents and patent publications: U.S. Pat. Nos. 6,322,901, 6,576,291, 6,423,551, 6,251,303, 6,319,426, 6,426,513, 6,444, 143, 5,990,479, 6,207,392, 2002/0045045 and 2003/0017264. As used herein, the term "fluorescent label" includes a signaling moiety that conveys information through the fluorescent absorption and/or emission properties of one or more molecules. Such fluorescent properties include fluorescence intensity, fluorescence lifetime, emission spectrum characteristics, energy transfer, and the like.

Commercially available fluorescent nucleotide analogues readily incorporated into nucleotide and/or oligonucleotide sequences include, but are not limited to, Cy3-dCTP, Cy3-dUTP, Cy5-dCTP, Cy5-dUTP (Amersham Biosciences, Piscataway, N.J.), fluorescein-12-dUTP, tetramethylrhodamine-6-dUTP, TEXAS RED™-5-dUTP, CASCADE BLUE™-7-dUTP, BODIPY TMFL-14-dUTP, BODIPY TMR-14-dUTP, BODIPY TMTR-14-dUTP, RHODAMINE GREEN™-5-dUTP, OREGON GREENR™ 488-5-dUTP, TEXAS RED™-12-dUTP, BODIPY™ 630/650-14-dUTP, BODIPY™ 650/665-14-dUTP, ALEXA FLUOR™ 488-5-dUTP, ALEXA FLUOR™ 532-5-dUTP, ALEXA FLUOR™ 568-5-dUTP, ALEXA FLUOR™ 594-5-dUTP, ALEXA FLUOR™ 546-14-dUTP, fluorescein-12-UTP, tetramethyl-rhodamine-6-UTP, TEXAS RED™-5-UTP, mCherry, CASCADE BLUE™-7-UTP, BODIPY™ FL-14-UTP, BODIPY TMR-14-UTP, BODIPY™ TR-14-UTP, RHODAMINE GREEN™-5-UTP, ALEXA FLUOR™ 488-5-UTP, LEXA FLUOR™ 546-14-UTP (Molecular Probes, Inc. Eugene, Oreg.) and the like. Protocols are known in the art for custom synthesis of nucleotides having other fluorophores (See, Henegariu et al. (2000) Nature Biotechnol. 18:345).

Other fluorophores available for post-synthetic attachment include, but are not limited to, ALEXA FLUOR™ 350, ALEXA FLUOR™ 532, ALEXA FLUOR™ 546, ALEXA FLUOR™ 568, ALEXA FLUOR™ 594, ALEXA FLUOR™ 647, BODIPY 493/503, BODIPY FL, BODIPY R6G, BODIPY 530/550, BODIPY TMR, BODIPY 558/568, BODIPY 558/568, BODIPY 564/570, BODIPY 576/589, BODIPY 581/591, BODIPY 630/650, BODIPY 650/665, Cascade Blue, Cascade Yellow, Dansyl, lissamine rhodamine B, Marina Blue, Oregon Green 488, Oregon Green 514, Pacific Blue, rhodamine 6G, rhodamine green, rhodamine red, tetramethyl rhodamine, Texas Red (available from Molecular Probes, Inc., Eugene, Oreg.), Cy2, Cy3.5, Cy5.5, Cy7 (Amersham Biosciences, Piscataway, N.J.) and the like. FRET tandem fluorophores may also be used, including, but not limited to, PerCP-Cy5.5, PE-Cy5, PE-Cy5.5, PE-Cy7, PE-Texas Red, APC-Cy7, PE-Alexa dyes (610, 647, 680), APC-Alexa dyes and the like.

Metallic silver or gold particles may be used to enhance signal from fluorescently labeled nucleotide and/or oligonucleotide sequences (Lakowicz et al. (2003) Bio Techniques 34:62).

Biotin, or a derivative thereof, may also be used as a label on a nucleotide and/or an oligonucleotide sequence, and subsequently bound by a detectably labeled avidin/streptavidin derivative (e.g. phycoerythrin-conjugated streptavidin), or a detectably labeled anti-biotin antibody. Digoxigenin may be incorporated as a label and subsequently bound by a detectably labeled anti-digoxigenin antibody (e.g. fluoresceinated anti-digoxigenin). An aminoallyl-dUTP residue may be incorporated into an oligonucleotide sequence and subsequently coupled to an N-hydroxy succinimide (NHS) derivatized fluorescent dye. In general, any member of a conjugate pair may be incorporated into a detection oligonucleotide provided that a detectably labeled conjugate partner can be bound to permit detection. As used herein, the term antibody refers to an antibody molecule of any class, or any sub-fragment thereof, such as an Fab.

Other suitable labels for an oligonucleotide sequence may include fluorescein (FAM), digoxigenin, dinitrophenol (DNP), dansyl, biotin, bromodeoxyuridine (BrdU), hexahistidine (6×His), phosphor-amino acids (e.g. P-tyr, P-ser, P-thr) and the like. In one embodiment the following hapten/antibody pairs are used for detection, in which each of the antibodies is derivatized with a detectable label: biotin/α-biotin, digoxigenin/α-digoxigenin, dinitrophenol (DNP)/α-DNP, 5-Carboxyfluorescein (FAM)/α-FAMα

In certain exemplary embodiments, a nucleotide and/or an oligonucleotide sequence can be indirectly labeled, especially with a hapten that is then bound by a capture agent, e.g., as disclosed in U.S. Pat. Nos. 5,344,757, 5,702,888, 5,354,657, 5,198,537 and 4,849,336, PCT publication WO 91/17160 and the like. Many different hapten-capture agent pairs are available for use. Exemplary haptens include, but are not limited to, biotin, des-biotin and other derivatives, dinitrophenol, dansyl, fluorescein, CY5, digoxigenin and the like. For biotin, a capture agent may be avidin, streptavidin, or antibodies. Antibodies may be used as capture agents for the other haptens (many dye-antibody pairs being commercially available, e.g., Molecular Probes, Eugene, Oreg.).

In some embodiments, in situ sequencing is performed using sequencing by competitive annealing and ligation (SCAL) to determine a sequence of a target nucleic acid, the method comprising performing one or more sequencing cycles, each cycle comprising: (a) contacting the target nucleic acid with a read oligonucleotide and a set of fluorescently labeled decoding probes, wherein the read oligonucleotide comprises a first complementarity region that is complementary to a reading sequence on the target nucleic acid, and wherein each decoding probe comprises a second complementarity region that is complementary to a probe binding site on the target nucleic acid; (b) ligating the read oligonucleotide to one of the decoding probes of the set of fluorescently labeled decoding probes to generate a fluorescent ligation product, wherein the ligation only occurs when the read oligonucleotide and the decoding probe bind to adjacent sequences on the target nucleic acid and both the read oligonucleotide and the decoding probe have sequences that are exactly complementary to the sequence of the target nucleic acid; (c) removing unligated probes; (d) imaging the fluorescent ligation product to detect the fluorescent label of the decoding probe that ligated to the read oligonucleotide, wherein the fluorescent label identifies a nucleotide of the sequence of the target nucleic acid; and (e) removing the fluorescent ligation product from the target nucleic acid by binding a competitor oligonucleotide to the target nucleic acid, wherein the competitor oligonucleotide comprises a third complementarity region comprising a sequence that is complementary to the reading sequence on the target nucleic acid, wherein the fluorescent ligation product dissociates from the target nucleic acid.

In exemplary aspects, the ligation involves each of the read oligonucleotide and a fluorescently labeled decoding probe ligating to form a stable product for imaging only when a perfect match occurs. In certain aspects, the mismatch sensitivity of a ligase enzyme is used to determine the underlying sequence of the target nucleic acid molecule. Inclusion of a polyethylene glycol (PEG) polymer in the sequencing ligation mixture substantially accelerates signal addition onto target nucleic acids. Exemplary PEG polymers have molecular weights ranging from 300 g/mol to 10,000,000 g/mol. In some embodiments, a PEG 6000 polymer is present during ligation of the read oligonucleotide and a fluorescently labeled decoding probe.

In certain embodiments, the set of fluorescently labeled decoding probes comprises: a first probe encoding a guanine, wherein the first probe comprises a first fluorescent label, a second probe encoding an adenine, wherein the second probe comprises a second fluorescent label, a third probe encoding a cytosine, wherein the third probe comprises a third fluorescent label, and a fourth probe encoding a thymine, wherein the fourth probe comprises a fourth fluorescent label.

In certain embodiments, each fluorescently labeled decoding probe encodes 1 to 3 bases adjacent to a ligation junction where the read oligonucleotide is ligated to the fluorescently labeled decoding probe, wherein fluorescently labeled decoding probes encoding different sequences of bases comprise different fluorescent labels.

In certain embodiments, the sequences of the fluorescently labeled decoding probes for a current cycle of sequencing are optimized to minimize cross-hybridization with the fluorescently labeled decoding probes for other sequencing cycles.

In certain embodiments, the read oligonucleotide ranges in length from 8 to 11 nucleotides, including any length within this range such as 8, 9, 10, or 11 nucleotides in length. In some embodiments, the read oligonucleotide has a melting temperature ranging from 17° C. to 20° C., including any melting temperature within this range such as 17° C., 18° C., 19° C., or 20° C.

In certain embodiments, the competitor oligonucleotide further comprises a fourth complementarity region comprising a sequence that is complementary to at least a portion of the probe binding site. In some embodiments, the fourth complementarity region of the competitor oligonucleotide comprises a sequence that is fully complementary to the entire probe binding site on the target nucleic acid. In certain embodiments, the competitor oligonucleotide further comprises a fifth complementarity region comprising a sequence that is complementary to a competitor-specific complementary site adjacent to the reading sequence on the target nucleic acid. In some embodiments, the competitor-specific complementary site ranges in length from 2 nucleotides to 16 nucleotides, including any length within this range such as 2, 3, 4, 5, 6, 7, 8, 9, 10, 11, 12, 13, 14, 15, or 16 nucleotides. In certain embodiments, for sequencing cycles following an initial sequencing cycle, the competitor oligonucleotide used in a previous cycle of sequencing is present during one or more subsequent cycles of sequencing.

In certain embodiments, the read oligonucleotide further comprises a competitor-specific complementary sequence. In some embodiments, the competitor-specific complementary sequence of the read oligonucleotide ranges in length from 2 nucleotides to 16 nucleotides, including any length within this range such as 2, 3, 4, 5, 6, 7, 8, 9, 10, 11, 12, 13, 14, 15, or 16 nucleotides. In certain embodiments, the sequence of the read oligonucleotide for a current cycle of sequencing is optimized to minimize cross-hybridization with read oligonucleotides for other sequencing cycles.

In certain embodiments, multiple read oligonucleotides, sets of fluorescently labeled decoding probes, and competitor oligonucleotides having specificity for different target nucleic acids are used to sequence a plurality of different target nucleic acids simultaneously or sequentially.

In certain embodiments, the competitor oligonucleotides remove ligation products from a previous round of sequencing from different target nucleic acids than target nucleic acids currently undergoing steps (a) or (b) of a sequencing cycle. In certain embodiments, the competitor oligonucleotides remove ligation products from a previous round of sequencing from the same target nucleic acids currently undergoing steps (a) or (b) of a sequencing cycle. In certain embodiments, the competitor oligonucleotide is a round-specific competitor oligonucleotide comprising a fourth complementarity region comprising a sequence that is complementary to the reading sequence for the next cycle of sequencing.

The sequencing reads may be in a 5' to 3' forward direction or a 3' to 5' reverse direction. For sequencing reads in the forward direction, each fluorescently labeled decoding probe has a fluorophore modification at the 5' end and each read oligonucleotide has a phosphate at the 5' end. For sequencing reads in the reverse direction, each fluorescently labeled decoding probe has a phosphate at the 5' end and a fluorophore modification at the 3' end.

In certain embodiments, the sequencing is performed with sequential encoding. In some embodiments, each read oligonucleotide comprises a unique sequential orthogonal readout sequence and a unique adjacent competitor-specific complementary sequence for each cycle of sequencing. In some embodiments, the unique sequential orthogonal readout sequence ranges in length from 8 nucleotides to 11 nucleotides, including any length within this range such as 8, 9, 10, or 11 nucleotides. In some embodiments, the unique adjacent competitor-specific complementary sequence ranges in length from 2 nucleotides to 16 nucleotides, including any length within this range such as 2, 3, 4, 5, 6, 7, 8, 9, 10, 11, 12, 13, 14, 15, or 16 nucleotides. In some embodiments, each competitor oligonucleotide comprises a sequence that is complementary to the unique sequential orthogonal readout sequence and the unique adjacent competitor-specific complementary sequence of the read oligonucleotide and at least a portion of the sequence of the fluorescently labeled decoding probe for each cycle of sequencing. In some embodiments, the sequence of the competitor oligonucleotide has partial complementarity or full complementarity to the sequence of the fluorescently labeled decoding probe.

In certain embodiments, sequencing is performed with combinatorial encoding. In some embodiments, multiple read oligonucleotides are used for sequencing, wherein each read oligonucleotide comprises a first complementarity region comprising a combinatorial readout sequence that is complementary to a reading sequence at a separate combinatorial read position on the target nucleic acid, wherein the reading sequence at each separate position on the target nucleic is adjacent to a probe binding site. In some embodiments, each read oligonucleotide further comprises a competitor-specific complementary sequence adjacent to the reading sequence. In some embodiments, the competitor-specific complementary sequence is not complementary to the fluorescently labeled decoding probe. In some embodiments, the reading sequence ranges in length from 8 nucleotides to 11 nucleotides, including any length within this range such as 8, 9, 10, or 11 nucleotides. In some embodiments, the competitor-specific complementary sequence ranges in length from 2 nucleotides to 16 nucleotides, including any length within this range such as 2, 3, 4, 5, 6, 7, 8, 9, 10, 11, 12, 13, 14, 15, or 16 nucleotides. In some embodiments, for each separate combinatorial read position, the competitor oligonucleotide comprises a sequence that is complementary to the combinatorial readout sequence and the competitor-specific complementary sequence of the read oligonucleotide and at least a portion of the sequence of the fluorescently labeled decoding probe for each cycle of sequencing. In some embodiments, the combinatorial encoding uses a hamming code.

The sequencing methods described herein can be used for situ gene sequencing of a target nucleic acid in a cell in an intact tissue. In some embodiments, the method of in situ gene sequencing of a target nucleic acid in a cell in an intact tissue comprises: (a) contacting a fixed and permeabilized intact tissue with at least a pair of oligonucleotide primers under conditions to allow for specific hybridization, wherein the pair of primers comprise a first oligonucleotide and a second oligonucleotide; wherein each of the first oligonucleotide and the second oligonucleotide comprises a first complementarity region, a second complementarity region sequence, and a third complementarity region; wherein the second oligonucleotide further comprises a barcode sequence; wherein the first complementarity region of the first oligonucleotide is complementary to a first portion of the target nucleic acid, wherein the second complementarity region of the first oligonucleotide is complementary to the first complementarity region of the second oligonucleotide, wherein the third complementarity region of the first oligonucleotide is complementary to the third complementarity region of the second oligonucleotide, wherein the second complementary region of the second oligonucleotide is complementary to a second portion of the target nucleic acid, wherein the first portion of the target nucleic is adjacent to the second portion of the target nucleic acid; (b) adding ligase to ligate the second oligonucleotide and generate a closed nucleic acid circle; (c) performing rolling circle amplification in the presence of a nucleic acid molecule, wherein the performing comprises using the second oligonucleotide as a template and the first oligonucleotide as a primer for a polymerase to form one or more amplicons; (d) embedding the one or more amplicons in the presence of hydrogel subunits to form one or more hydrogel-embedded amplicons; (e) sequencing the one or more amplicons according to a method described herein. In certain embodiments, the sequencing is performed with sequential encoding. In other embodiments, the sequencing is performed with combinatorial encoding.

In some embodiments, the contacting the one or more hydrogel-embedded amplicons occurs two times or more, including, but not limited to, e.g., three times or more, four times or more, five times or more, six times or more, or seven times or more, eight times or more, nine times or more, ten times or more, eleven times or more, or twelve times or more. In certain embodiments, the contacting the one or more hydrogel-embedded amplicons occurs four times or more for thin tissue specimens. In other embodiments, the contacting the one or more hydrogel-embedded amplicons occurs six times or more for thick tissue specimens. In some embodiments, one or more amplicons can be contacted by a pair of primers for 24 or more hours, 24 or less hours, 18 or less hours, 12 or less hours, 8 or less hours, 6 or less hours, 4 or less hours, 2 or less hours, 60 or less minutes, 45 or less minutes, 30 or less minutes, 25 or less minutes, 20 or less minutes, 15 or less minutes, 10 or less minutes, 5 or less minutes, or 2 or less minutes. In some embodiments, 12 or more cycles of sequencing are performed, including 13 or more cycles, 14 or more cycles, 15 or more cycles, 16 or more cycles, 17 or more cycles, or 18 or more cycles of sequencing. In some embodiments, the methods are performed at room temperature for preservation of tissue morphology with low background noise and error reduction. In some embodiments, the contacting the one or more hydrogel-embedded amplicons includes eliminating error accumulation as sequencing proceeds.

Specimens prepared using the subject methods may be analyzed by any of a number of different types of microscopy, for example, optical microscopy (e.g. bright field, oblique illumination, dark field, phase contrast, differential interference contrast, interference reflection, epifluorescence, confocal, etc., microscopy), laser microscopy, electron microscopy, and scanning probe microscopy. In some aspects, a non-transitory computer readable medium transforms raw images acquired through microscopy of multiple rounds of in situ sequencing first into decoded gene identities and spatial locations and then analyzes the per-cell composition of gene expression.

The term "perfectly matched", when used in reference to a duplex means that the polynucleotide and/or oligonucleotide strands making up the duplex form a double stranded structure with one another such that every nucleotide in each strand undergoes Watson-Crick base pairing with a nucleotide in the other strand. The term "duplex" includes, but is not limited to, the pairing of nucleoside analogs, such as deoxyinosine, nucleosides with 2-aminopurine bases, peptide nucleic acids (PNAs), and the like, that may be employed. A "mismatch" in a duplex between two oligonucleotides means that a pair of nucleotides in the duplex fails to undergo Watson-Crick bonding.

In some embodiments, the method includes a plurality of read oligonucleotides, including, but not limited to, 5 or more read oligonucleotides, e.g., 8 or more, 10 or more, 12 or more, 15 or more, 18 or more, 20 or more, 25 or more, 30 or more, 35 or more that hybridize to target nucleotide sequences. In some embodiments, a method of the present disclosure includes a plurality of read oligonucleotides, including, but not limited to, 15 or more read oligonucleotides, e.g., 20 or more, 30 or more, 40 or more, 50 or more, 60 or more, 70 or more, and up to 80 different read oligonucleotides that hybridize to 15 or more, e.g., 20 or more, 30 or more, 40 or more, 50 or more, 60 or more, 70 or more, and up to 80 different target nucleotide sequences.

In some embodiments, the methods include a plurality of fluorescently labeled decoding probes, including, but not limited to, 4 or more fluorescently labeled decoding probes, e.g., 8 or more, 10 or more, 12 or more, 16 or more, 18 or more, 20 or more, 25 or more, 30 or more, 35 or more. In some embodiments, a method of the present disclosure includes a plurality of fluorescently labeled decoding probes including, but not limited to, 15 or more fluorescently labeled decoding probes, e.g., 20 or more, 30 or more, 40 or more, 50 or more, 60 or more, 70 or more, and up to 80 different fluorescently labeled decoding probes that hybridize to 15 or more, e.g., 20 or more, 30 or more, 40 or more, 50 or more, 60 or more, 70 or more, and up to 80 different target nucleotide sequences.

A plurality of pairs of oligonucleotide primers can be used in a reaction, where one or more pairs specifically bind to each target nucleic acid. For example, two primer pairs can be used for one target nucleic acid in order to improve sensitivity and reduce variability. It is also of interest to detect a plurality of different target nucleic acids in a cell, e.g. detecting up to 2, up to 3, up to 4, up to 5, up to 6, up to 7, up to 8, up to 9, up to 10, up to 12, up to 15, up to 18, up to 20, up to 25, up to 30, up to 40 or more distinct target nucleic acids.

In certain embodiments, sequencing is performed with a ligase with activity hindered by base mismatches, a read oligonucleotide, and a fluorescently labeled decoding probe. The term "hindered" in this context refers to activity of a ligase that is reduced by approximately 20% or more, such as by 25% or more, such as by 50% or more, such as by 75% or more, such as by 90% or more, such as by 95% or more, such as by 99% or more, such as by 100%. In some embodiments, the third oligonucleotide has a length of 5-15 nucleotides, including, but not limited to, 5-13 nucleotides, 5-10 nucleotides, or 5-8 nucleotides. In some embodiments, the $T_m$ of the third oligonucleotide is at room temperature (22-25° C.). In some embodiments, the read oligonucleotide is degenerate, or partially thereof. In some embodiments, the fluorescently labeled decoding probe oligonucleotide has a length of 5-15 nucleotides, including, but not limited to, 5-13 nucleotides, 5-10 nucleotides, or 5-8 nucleotides. In some embodiments, the $T_m$ of the fourth oligonucleotide is at room temperature (22°-25° C.). After each cycle of sequencing corresponding to a base readout, the fluorescent ligation product is removed from the target nucleic acid by binding a competitor oligonucleotide to the target nucleic acid, wherein the competitor oligonucleotide comprises a third complementarity region comprising a sequence that is complementary to the reading sequence on the target nucleic acid, wherein the fluorescent ligation product dissociates from the target nucleic acid.

In some embodiments, sequencing involves washing to remove unbound oligonucleotides and unligated probes, thereafter revealing a fluorescent product for imaging. In certain exemplary embodiments, a detectable fluorescent label is used to detect one or more nucleotides and/or oligonucleotides described herein. In certain embodiments, a detectable fluorescent label such as a fluorescent protein, fluorescent dye, or fluorescent quantum dot is used to label probes.

Fluorescent labels and their attachment to nucleotides and/or oligonucleotides are described in many reviews, including Haugland, Handbook of Fluorescent Probes and Research Chemicals, Ninth Edition (Molecular Probes, Inc., Eugene, 2002); Keller and Manak, DNA Probes, 2nd Edition (Stockton Press, New York, 1993); Eckstein, editor, Oligonucleotides and Analogues: A Practical Approach (IRL Press, Oxford, 1991); and Wetmur, Critical Reviews in Biochemistry and Molecular Biology, 26:227-259 (1991). Particular methodologies applicable to the invention are disclosed in the following sample of references: U.S. Pat. Nos. 4,757,141, 5,151,507 and 5,091,519. In one aspect, one or more fluorescent dyes are used as labels for labeled target sequences, e.g., as disclosed by U.S. Pat. No. 5,188,934 (4,7-dichlorofluorescein dyes); U.S. Pat. No. 5,366,860 (spectrally resolvable rhodamine dyes); U.S. Pat. No. 5,847, 162 (4,7-dichlororhodamine dyes); U.S. Pat. No. 4,318,846 (ether-substituted fluorescein dyes); U.S. Pat. No. 5,800,996 (energy transfer dyes); Lee et al.; U.S. Pat. No. 5,066,580 (xanthine dyes); U.S. Pat. No. 5,688,648 (energy transfer dyes); and the like. Labelling can also be carried out with quantum dots, as disclosed in the following patents and patent publications: U.S. Pat. Nos. 6,322,901, 6,576,291, 6,423,551, 6,251,303, 6,319,426, 6,426,513, 6,444, 143, 5,990,479, 6,207,392, 2002/0045045 and 2003/0017264. As used herein, the term "fluorescent label" includes a signaling moiety that conveys information through the fluorescent absorption and/or emission properties of one or more molecules. Such fluorescent properties include fluorescence intensity, fluorescence lifetime, emission spectrum characteristics, energy transfer, and the like.

Commercially available fluorescent nucleotide analogues readily incorporated into nucleotide and/or oligonucleotide sequences include, but are not limited to, Cy3-dCTP, Cy3-dUTP, Cy5-dCTP, Cy5-dUTP (Amersham Biosciences, Piscataway, N.J.), fluorescein-12-dUTP, tetramethylrhodamine-6-dUTP, TEXAS RED™-5-dUTP, CASCADE BLUE™-7-dUTP, BODIPY TMFL-14-dUTP, BODIPY TMR-14-dUTP, BODIPY TMTR-14-dUTP, RHODAMINE GREEN™-5-dUTP, OREGON GREENR™ 488-5-dUTP, TEXAS RED™-12-dUTP, BODIPY™ 630/650-14-dUTP, BODIPY™ 650/665-14-dUTP, ALEXA FLUOR™ 488-5-dUTP, ALEXA FLUOR™ 532-5-dUTP, ALEXA FLUOR™ 568-5-dUTP, ALEXA FLUOR™ 594-5-dUTP, ALEXA FLUOR™ 546-14-dUTP, fluorescein-12-UTP, tetramethylrhodamine-6-UTP, TEXAS RED™-5-UTP, mCherry, CASCADE BLUE™-7-UTP, BODIPY™ FL-14-UTP, BODIPY TMR-14-UTP, BODIPY™ TR-14-UTP, RHODAMINE GREEN™-5-UTP, ALEXA FLUOR™ 488-5-UTP, LEXA FLUOR™ 546-14-UTP (Molecular Probes, Inc. Eugene, Oreg.) and the like. Protocols are known in the art for custom synthesis of nucleotides having other fluorophores (See, Henegariu et al. (2000) Nature Biotechnol. 18:345).

Other fluorophores available for post-synthetic attachment include, but are not limited to, ALEXA FLUOR™ 350, ALEXA FLUOR™ 532, ALEXA FLUOR™ 546, ALEXA FLUOR™ 568, ALEXA FLUOR™ 594, ALEXA FLUOR™ 647, BODIPY 493/503, BODIPY FL, BODIPY R6G, BODIPY 530/550, BODIPY TMR, BODIPY 558/568, BODIPY 558/568, BODIPY 564/570, BODIPY 576/589, BODIPY 581/591, BODIPY 630/650, BODIPY 650/665, Cascade Blue, Cascade Yellow, Dansyl, lissamine rhodamine B, Marina Blue, Oregon Green 488, Oregon Green 514, Pacific Blue, rhodamine 6G, rhodamine green, rhodamine red, tetramethyl rhodamine, Texas Red (available from Molecular Probes, Inc., Eugene, Oreg.), Cy2, Cy3.5, Cy5.5, Cy7 (Amersham Biosciences, Piscataway, N.J.) and the like. FRET tandem fluorophores may also be used, including, but not limited to, PerCP-Cy5.5, PE-Cy5, PE-Cy5.5, PE-Cy7, PE-Texas Red, APC-Cy7, PE-Alexa dyes (610, 647, 680), APC-Alexa dyes and the like.

Examples of fluorescent proteins include, but are not limited to, green fluorescent protein, superfolder green fluorescent protein, enhanced green fluorescent protein, Dronpa (a photoswitchable green fluorescent protein), yellow-green fluorescent protein, yellow fluorescent protein, red fluorescent protein, orange fluorescent protein, blue fluorescent protein, cyan fluorescent protein, violet fluorescent protein, mApple, mNectarine, mNeptune, mCherry, mStrawberry, mPlum, mRaspberry, mCrimson3, mCarmine, mCardinal, mScarlet, mRuby2, FusionRed, mNeonGreen, TagRFP675, and mRFP1. and the like.

Metallic silver or gold particles may be used to enhance signal from fluorescently labeled nucleotide and/or oligonucleotide sequences (Lakowicz et al. (2003) Bio Techniques 34:62).

Biotin, or a derivative thereof, may also be used as a label on a nucleotide and/or an oligonucleotide sequence, and subsequently bound by a detectably labeled avidin/streptavidin derivative (e.g. phycoerythrin-conjugated streptavidin), or a detectably labeled anti-biotin antibody. Digoxigenin may be incorporated as a label and subsequently bound by a detectably labeled anti-digoxigenin antibody (e.g. fluoresceinated anti-digoxigenin). An aminoallyl-dUTP residue may be incorporated into an oligonucleotide sequence and subsequently coupled to an N-hydroxy succinimide (NHS) derivatized fluorescent dye. In general, any member of a conjugate pair may be incorporated into a detection oligonucleotide provided that a detectably labeled conjugate partner can be bound to permit detection. As used herein, the term antibody refers to an antibody molecule of any class, or any sub-fragment thereof, such as an Fab.

Other suitable labels for an oligonucleotide sequence may include fluorescein (FAM), digoxigenin, dinitrophenol (DNP), dansyl, biotin, bromodeoxyuridine (BrdU), hexahistidine (6×His), phosphor-amino acids (e.g. P-tyr, P-ser, P-thr) and the like. In one embodiment the following hapten/antibody pairs are used for detection, in which each of the antibodies is derivatized with a detectable label: biotin/α-biotin, digoxigenin/α-digoxigenin, dinitrophenol (DNP)/α-DNP, 5-Carboxyfluorescein (FAM)/α-FAM.

In certain exemplary embodiments, a nucleotide and/or an oligonucleotide sequence can be indirectly labeled, especially with a hapten that is then bound by a capture agent, e.g., as disclosed in U.S. Pat. Nos. 5,344,757, 5,702,888, 5,354,657, 5,198,537 and 4,849,336, PCT publication WO 91/17160 and the like. Many different hapten-capture agent pairs are available for use. Exemplary haptens include, but are not limited to, biotin, des-biotin and other derivatives, dinitrophenol, dansyl, fluorescein, CY5, digoxigenin and the like. For biotin, a capture agent may be avidin, streptavidin, or antibodies. Antibodies may be used as capture agents for the other haptens (many dye-antibody pairs being commercially available, e.g., Molecular Probes, Eugene, Oreg.).

In some embodiments, an antioxidant compound is included in the washing and imaging buffers (i.e., "anti-fade buffers") to reduce photobleaching during fluorescence imaging. Exemplary antioxidants include, without limitation, Trolox (6-hydroxy-2,5,7,8-tetramethylchroman-2-carboxylic acid) and Trolox-quinone, propyl-gallate, tertiary butylhydroquinone, butylated hydroxyanisole, butylated hydroxytoluene, glutathione, ascorbic acid, and tocopherols. Such antioxidants have an antifade effect on fluorophores. That is, the antioxidant reduces photobleaching during tiling, greatly enhances the signal-to-noise ratio (SNR) of sensitive fluorophores, and enables higher SNR imaging of thicker samples. For a fixed exposure time, including an antioxidant increases the SNR by increasing the concentration of the non-bleached fluorophore during exposure to light. Including an antioxidant also removes the diminishing returns of longer exposure times (caused by the limited fluorophore lifetime before photobleaching), providing for increased SNR by allowing increased exposure times.

An exemplary sequencing cycle optionally begins with a brief sample wash, before proceeding to the first signal addition. Depending on whether sequential or combinatorial encoding is being used for a particular round, the corresponding set of read oligonucleotides, fluorescently labeled decoding probes, and their round-specific competitors are added and ligated. In combinatorial encodings, the read oligonucleotide for a given position x is added, plus a set of fluorescently labeled dibase-encoding oligonucleotides, plus a competitor oligonucleotide for the previous position that was labeled (unless it is the first round of labeling, in which case competitor oligonucleotide is omitted). In sequential encodings, the read oligonucleotide for a given round x, a 4-channel fluorophore mixture, and a round x−1 competitor oligonucleotide are added, except if it is the first round of labeling. The presence of PEG in the sequencing ligation mixture substantially accelerates the signal addition onto the target. Following incubation of the sample in imaging buffer, the sample is imaged, and briefly rinsed before proceeding to the next sequencing cycle.

In addition, fluorophore cleavage from probes or probe stripping can be used to eliminate signal carryover from one round to the next when multiple sequencing cycles are used. For example, fluorophores can be stripped off with formamide. Alternatively, thiol-linked dyes can be used having a disulfide linkage between the fluorophore and an oligonucleotide probe, which enables cleavage of the fluorophore from the oligonucleotide probe in a reducing environment. Exemplary disulfide reducing agents, which can be used for cleaving disulfide bonds include, without limitation, tris(2-carboxyethyl)phosphine (TCEP), dithiothreitol (DTT), and β-mercaptoethanol (BME). Following fluorescence imaging during a sequencing round, a stripping agent and/or a reducing agent is added, and subsequent washing steps remove the diffusive fluorescent signal before performing another round of sequencing.

The methods disclosed herein also provide for a method of screening a candidate agent to determine whether the candidate agent modulates gene expression of a nucleic acid in a cell in an intact tissue by performing a method described herein to determine the gene sequence of a target nucleic acid in the cell in the intact tissue, and detecting the level of gene expression of the target nucleic acid, wherein an alteration in the level of expression of the target nucleic acid in the presence of the candidate agent relative to the level of expression of the target nucleic acid in the absence of the candidate agent indicates that the candidate agent modulates gene expression of the nucleic acid in the cell in the intact tissue.

In certain aspects, the methods disclosed herein provide for a faster processing time, higher multiplexity, higher efficiency, higher sensitivity, lower error rate, and more spatially resolved cell types, as compared to existing gene expression analysis tools. The methods provide improved sequencing-by-ligation techniques (SCAL and SEDAL2) for in situ sequencing with error reduction. In some other aspects, the methods disclosed herein include spatially sequencing (e.g. reagents, chips or services) for biomedical research and clinical diagnostics (e.g. cancer, bacterial infection, viral infection, etc.) with single-cell and/or single-molecule sensitivity.

Specific Amplification of Nucleic Acids via Intramolecular Ligation (SNAIL)

An efficient approach for generating cDNA libraries from cellular RNAs in situ may be utilized, which is referred to herein as SNAIL, for Specific Amplification of Nucleic Acids via Intramolecular Ligation. In certain embodiments, the method includes contacting a fixed and permeabilized intact tissue with at least a pair of oligonucleotide primers under conditions to allow for specific hybridization, wherein the pair of primers includes a first oligonucleotide and a second oligonucleotide.

More generally, the nucleic acid present in a cell of interest in a tissue serves as a scaffold for an assembly of a complex that includes a pair of primers, referred to herein as a first oligonucleotide and a second oligonucleotide. In some embodiments, the contacting the fixed and permeabilized intact tissue includes hybridizing the pair of primers to the same target nucleic acid. In some embodiments, the target nucleic acid is RNA. In such embodiments, the target nucleic acid may be mRNA. In other embodiments, the target nucleic acid is DNA.

As used herein, the terms "hybridize" and "hybridization" refer to the formation of complexes between nucleotide sequences which are sufficiently complementary to form complexes via Watson-Crick base pairing. Where a primer "hybridizes" with target (template), such complexes (or hybrids) are sufficiently stable to serve the priming function required by, e.g., the DNA polymerase to initiate DNA synthesis. It will be appreciated that the hybridizing sequences need not have perfect complementarity to provide stable hybrids. In many situations, stable hybrids will form where fewer than about 10% of the bases are mismatches, ignoring loops of four or more nucleotides. Accordingly, as used herein the term "complementary" refers to an oligonucleotide that forms a stable duplex with its "complement" under assay conditions, generally where there is about 90% or greater homology.

SNAIL Oligonucleotide Primers

In the subject methods, the SNAIL oligonucleotide primers include at least a first oligonucleotide and a second oligonucleotide; wherein each of the first oligonucleotide and the second oligonucleotide includes a first complementarity region, a second complementarity region, and a third complementarity region; wherein the second oligonucleotide further includes a barcode sequence; wherein the first complementarity region of the first oligonucleotide is complementary to a first portion of the target nucleic acid, wherein the second complementarity region of the first oligonucleotide is complementary to the first complementarity region of the second oligonucleotide, wherein the third complementarity region of the first oligonucleotide is complementary to the third complementarity region of the second oligonucleotide, wherein the second complementary region of the second oligonucleotide is complementary to a second portion of the target nucleic acid, and wherein the first complementarity region of the first oligonucleotide is adjacent to the second complementarity region of the second oligonucleotide. In an alternative embodiment, the second oligonucleotide is a closed circular molecule, and a ligation step is omitted.

The present disclosure provides methods where the contacting a fixed and permeabilized tissue includes hybridizing a plurality of oligonucleotide primers having specificity for different target nucleic acids. In some embodiments, the methods include a plurality of first oligonucleotides, including, but not limited to, 5 or more first oligonucleotides, e.g., 8 or more, 10 or more, 12 or more, 15 or more, 18 or more, 20 or more, 25 or more, 30 or more, 35 or more that hybridize to target nucleotide sequences. In some embodiments, a method of the present disclosure includes a plurality of first oligonucleotides, including, but not limited to, 15 or more first oligonucleotides, e.g., 20 or more, 30 or more, 40 or more, 50 or more, 60 or more, 70 or more, and up to 80 different first oligonucleotides that hybridize to 15 or more, e.g., 20 or more, 30 or more, 40 or more, 50 or more, 60 or more, 70 or more, and up to 80 different target nucleotide sequences. In some embodiments, the methods include a plurality of second oligonucleotides, including, but not limited to, 5 or more second oligonucleotides, e.g., 8 or more, 10 or more, 12 or more, 15 or more, 18 or more, 20 or more, 25 or more, 30 or more, 35 or more. In some embodiments, a method of the present disclosure includes a plurality of second oligonucleotides including, but not limited to, 15 or more second oligonucleotides, e.g., 20 or more, 30 or more, 40 or more, 50 or more, 60 or more, 70 or more, and up to 80 different first oligonucleotides that hybridize to 15 or more, e.g., 20 or more, 30 or more, 40 or more, 50 or more, 60 or more, 70 or more, and up to 80 different target nucleotide sequences. A plurality of oligonucleotide pairs can be used in a reaction, where one or more pairs specifically bind to each target nucleic acid. For example, two primer pairs can be used for one target nucleic acid in order to improve sensitivity and reduce variability. It is also of interest to detect a plurality of different target nucleic acids in a cell, e.g. detecting up to 2, up to 3, up to 4, up to 5, up to 6, up to 7, up to 8, up to 9, up to 10, up to 12, up to 15, up to 18, up to 20, up to 25, up to 30, up to 40 or more distinct target nucleic acids. The primers are typically denatured prior to use, typically by heating to a temperature of at least about 50° C., at least about 60° C., at least about 70° C., at least about 80° C., and up to about 99° C., up to about 95° C., up to about 90° C.

In some embodiments, the primers are denatured by heating before contacting the sample. In certain aspects, the melting temperature ($T_m$) of oligonucleotides is selected to minimize ligation in solution. The "melting temperature" or "Tm" of a nucleic acid is defined as the temperature at which half of the helical structure of the nucleic acid is lost due to heating or other dissociation of the hydrogen bonding between base pairs, for example, by acid or alkali treatment, or the like. The $T_m$ of a nucleic acid molecule depends on its length and on its base composition. Nucleic acid molecules rich in GC base pairs have a higher $T_m$ than those having an abundance of AT base pairs. Separated complementary strands of nucleic acid spontaneously reassociate or anneal to form duplex nucleic acid when the temperature is lowered below the $T_m$. The highest rate of nucleic acid hybridization occurs approximately 25 degrees C. below the $T_m$. The $T_m$ may be estimated using the following relationship: $T_m$=69.3+0.41(GC) % (Marmur et al. (1962) J. Mol. Biol. 5:109-118).

In certain embodiments, the plurality of second oligonucleotides includes a padlock probe. In some embodiments, the probe includes a detectable label that can be measured and quantitated. The terms "label" and "detectable label" refer to a molecule capable of detection, including, but not limited to, radioactive isotopes, fluorescers, chemiluminescers, enzymes, enzyme substrates, enzyme cofactors, enzyme inhibitors, chromophores, dyes, metal ions, metal sols, ligands (e.g., biotin or haptens) and the like. The term "fluorescer" refers to a substance or a portion thereof that is capable of exhibiting fluorescence in the detectable range. Particular examples of labels that may be used with the invention include, but are not limited to phycoerythrin, Alexa dyes, fluorescein, YPet, CyPet, Cascade blue, allophycocyanin, Cy3, Cy5, Cy7, rhodamine, dansyl, umbelliferone, Texas red, luminol, acradimum esters, biotin, green fluorescent protein (GFP), enhanced green fluorescent protein (EGFP), yellow fluorescent protein (YFP), enhanced yellow fluorescent protein (EYFP), blue fluorescent protein (BFP), red fluorescent protein (RFP), firefly luciferase, Renilla luciferase, NADPH, beta-galactosidase, horseradish peroxidase, glucose oxidase, alkaline phosphatase, chloramphenicol acetyl transferase, and urease.

In some embodiments, the one or more first oligonucleotides and second oligonucleotides bind to a different region of the target nucleic acid, or target site. In a pair, each target site is different, and the target sites are adjacent sites on the target nucleic acid, e.g. usually not more than 15 nucleotides distant, e.g. not more than 10, 8, 6, 4, or 2 nucleotides distant from the other site, and may be contiguous sites. Target sites are typically present on the same strand of the target nucleic acid in the same orientation. Target sites are also selected to provide a unique binding site, relative to other nucleic acids present in the cell. Each target site is generally from about 19 to about 25 nucleotides in length, e.g. from about 19 to 23 nucleotides, from about 19 to 21 nucleotides, or from about 19 to 20 nucleotides. The pair of first and second oligonucleotides are selected such that each oligonucleotide in the pair has a similar melting temperature for binding to its cognate target site, e.g. the $T_m$ may be from about 50° C., from about 52° C., from about 55° C., from about 58°, from about 62° C., from about 65° C., from about 70° C., or from about 72° C. The GC content of the target site is generally selected to be no more than about 20%, no more than about 30%, no more than about 40%, no more than about 50%, no more than about 60%, no more than about 70%, In some embodiments, the first oligonucleotide includes a first, second, and third complementarity region. The target site of the first oligonucleotide may refer to the first complementarity region. As summarized above, the first complementarity region of the first oligonucleotide may have a length of 19-25 nucleotides. In certain aspects, the second complementarity region of the first oligonucleotide has a length of 3-10 nucleotides, including, e.g., 4-8 nucleotides or 4-7 nucleotides. In some aspects, the second complementarity region of the first oligonucleotide has a length of 6 nucleotides. In some embodiments, the third complementarity region of the first oligonucleotide likewise has a length of 6 nucleotides. In such embodiments, the third complementarity region of the first oligonucleotide has a length of 3-10 nucleotides, including, e.g., 4-8 nucleotides or 4-7 nucleotides.

In some embodiments, second first oligonucleotide includes a first, second, and third complementarity region. The target site of the second oligonucleotide may refer to the second complementarity region. As summarized above, the second complementarity region of the second oligonucleotide may have a length of 19-25 nucleotides. In certain aspects, the first complementarity region of the first oligonucleotide has a length of 3-10 nucleotides, including, e.g., 4-8 nucleotides or 4-7 nucleotides. In some aspects, the first complementarity region of the first oligonucleotide has a length of 6 nucleotides. In some aspects, the first complementarity region of the second oligonucleotide includes the 5' end of the second oligonucleotide. In some embodiments, the third complementarity region of the second oligonucleotide likewise has a length of 6 nucleotides. In such embodiments, the third complementarity region of the second oligonucleotide has a length of 3-10 nucleotides, including, e.g., 4-8 nucleotides or 4-7 nucleotides. In further embodiments, the third complementarity region of the second oligonucleotide includes the 3' end of the second oligonucleotide. In some embodiments, the first complementarity region of the second oligonucleotide is adjacent to the third complementarity region of the second oligonucleotide.

In some aspects, the second oligonucleotide includes a barcode sequence, wherein the barcode sequence of the second oligonucleotide provides barcoding information for identification of the target nucleic acid. The term "barcode" refers to a nucleic acid sequence that is used to identify a single cell or a subpopulation of cells. Barcode sequences can be linked to a target nucleic acid of interest during amplification and used to trace back the amplicon to the cell from which the target nucleic acid originated. A barcode sequence can be added to a target nucleic acid of interest during amplification by carrying out amplification with an oligonucleotide that contains a region including the barcode sequence and a region that is complementary to the target nucleic acid such that the barcode sequence is incorporated into the final amplified target nucleic acid product (i.e., amplicon).

Tissue

As described herein, the methods disclosed include in situ sequencing technology of an intact tissue by at least contacting a fixed and permeabilized intact tissue with at least a pair of oligonucleotide primers under conditions to allow for specific hybridization. Tissue specimens suitable for use with the methods described herein generally include any type of tissue specimens collected from living or dead subjects, such as, e.g., biopsy specimens and autopsy specimens, of which include, but are not limited to, epithelium, muscle, connective, and nervous tissue. Tissue specimens may be collected and processed using the methods described herein and subjected to microscopic analysis immediately following processing, or may be preserved and subjected to microscopic analysis at a future time, e.g., after storage for an extended period of time. In some embodiments, the methods described herein may be used to preserve tissue specimens in a stable, accessible and fully intact form for future analysis. In some embodiments, the methods described herein may be used to analyze a previously-preserved or stored tissue specimen. In some embodiments, the intact tissue includes brain tissue such as visual cortex slices. In some embodiments, the intact tissue is a thin slice with a thickness of 5-20 μm, including, but not limited to, e.g., 5-18 μm, 5-15 μm, or 5-10 μm. In other embodiments, the intact tissue is a thick slice with a thickness of 20-200 μm, including, but not limited to, e.g., 20-150 μm, 50-100 μm, or 50-80 μm.

Aspects of the invention include fixing intact tissue. The term "fixing" or "fixation" as used herein is the process of preserving biological material (e.g., tissues, cells, organelles, molecules, etc.) from decay and/or degradation. Fixation may be accomplished using any convenient protocol. Fixation can include contacting the sample with a fixation reagent (i.e., a reagent that contains at least one fixative). Samples can be contacted by a fixation reagent for a wide range of times, which can depend on the temperature, the nature of the sample, and on the fixative(s). For example, a sample can be contacted by a fixation reagent for 24 or less hours, 18 or less hours, 12 or less hours, 8 or less hours, 6 or less hours, 4 or less hours, 2 or less hours, 60 or less minutes, 45 or less minutes, 30 or less minutes, 25 or less minutes, 20 or less minutes, 15 or less minutes, 10 or less minutes, 5 or less minutes, or 2 or less minutes.

A sample can be contacted by a fixation reagent for a period of time in a range of from 5 minutes to 24 hours, e.g., from 10 minutes to 20 hours, from 10 minutes to 18 hours, from 10 minutes to 12 hours, from 10 minutes to 8 hours, from 10 minutes to 6 hours, from 10 minutes to 4 hours, from 10 minutes to 2 hours, from 15 minutes to 20 hours, from 15 minutes to 18 hours, from 15 minutes to 12 hours, from 15 minutes to 8 hours, from 15 minutes to 6 hours, from 15 minutes to 4 hours, from 15 minutes to 2 hours, from 15 minutes to 1.5 hours, from 15 minutes to 1 hour, from 10 minutes to 30 minutes, from 15 minutes to 30 minutes, from 30 minutes to 2 hours, from 45 minutes to 1.5 hours, or from 55 minutes to 70 minutes.

A sample can be contacted by a fixation reagent at various temperatures, depending on the protocol and the reagent used. For example, in some instances a sample can be contacted by a fixation reagent at a temperature ranging from −22° C. to 55° C., where specific ranges of interest include, but are not limited to 50 to 54° C., 40 to 44° C., 35 to 39° C., 28 to 32° C., 20 to 26° C., 0 to 6° C., and −18 to −22° C. In some instances a sample can be contacted by a fixation reagent at a temperature of −20° C., 4° C., room temperature (22-25° C.), 30° C., 37° C., 42° C., or 52° C.

Any convenient fixation reagent can be used. Common fixation reagents include crosslinking fixatives, precipitating fixatives, oxidizing fixatives, mercurials, and the like. Cross-linking fixatives chemically join two or more molecules by a covalent bond and a wide range of cross-linking reagents can be used. Examples of suitable cross-liking fixatives include but are not limited to aldehydes (e.g., formaldehyde, also commonly referred to as "paraformaldehyde" and "formalin"; glutaraldehyde; etc.), imidoesters, NHS (N-Hydroxysuccinimide) esters, and the like. Examples of suitable precipitating fixatives include but are not limited to alcohols (e.g., methanol, ethanol, etc.), acetone, acetic acid, etc. In some embodiments, the fixative is formaldehyde (i.e., paraformaldehyde or formalin). A suitable final concentration of formaldehyde in a fixation reagent is 0.1 to 10%, 1-8%, 1-4%, 1-2%, 3-5%, or 3.5-4.5%, including about 1.6% for 10 minutes. In some embodiments the sample is fixed in a final concentration of 4% formaldehyde (as diluted from a more concentrated stock solution, e.g., 38%, 37%, 36%, 20%, 18%, 16%, 14%, 10%, 8%, 6%, etc.). In some embodiments the sample is fixed in a final concentration of 10% formaldehyde. In some embodiments the sample is fixed in a final concentration of 1% formaldehyde. In some embodiments, the fixative is glutaraldehyde. A suitable concentration of glutaraldehyde in a fixation reagent is 0.1 to 1%. A fixation reagent can contain more than one fixative in any combination. For example, in some embodiments the sample is contacted with a fixation reagent containing both formaldehyde and glutaraldehyde.

The terms "permeabilization" or "permeabilize" as used herein refer to the process of rendering the cells (cell membranes etc.) of a sample permeable to experimental reagents such as nucleic acid probes, antibodies, chemical substrates, etc. Any convenient method and/or reagent for permeabilization can be used. Suitable permeabilization reagents include detergents (e.g., Saponin, Triton X-100, Tween-20, etc.), organic fixatives (e.g., acetone, methanol, ethanol, etc.), enzymes, etc. Detergents can be used at a range of concentrations. For example, 0.001%-1% detergent, 0.05%-0.5% detergent, or 0.1%-0.3% detergent can be used for permeabilization (e.g., 0.1% Saponin, 0.2% tween-20, 0.1-0.3% triton X-100, etc.). In some embodiments methanol on ice for at least 10 minutes is used to permeabilize.

In some embodiments, the same solution can be used as the fixation reagent and the permeabilization reagent. For example, in some embodiments, the fixation reagent contains 0.1%-10% formaldehyde and 0.001%-1% saponin. In some embodiments, the fixation reagent contains 1% formaldehyde and 0.3% saponin.

A sample can be contacted by a permeabilization reagent for a wide range of times, which can depend on the temperature, the nature of the sample, and on the permeabilization reagent(s). For example, a sample can be contacted by a permeabilization reagent for 24 or more hours, 24 or less hours, 18 or less hours, 12 or less hours, 8 or less hours, 6 or less hours, 4 or less hours, 2 or less hours, 60 or less minutes, 45 or less minutes, 30 or less minutes, 25 or less minutes, 20 or less minutes, 15 or less minutes, 10 or less minutes, 5 or less minutes, or 2 or less minutes. A sample can be contacted by a permeabilization reagent at various temperatures, depending on the protocol and the reagent used. For example, in some instances a sample can be contacted by a permeabilization reagent at a temperature ranging from −82° C. to 55° C., where specific ranges of interest include, but are not limited to: 50 to 54° C., 40 to 44° C., 35 to 39° C., 28 to 32° C., 20 to 26° C., 0 to 6° C., −18 to −22° C., and −78 to −82° C. In some instances a sample can be contacted by a permeabilization reagent at a temperature of −80° C., −20° C., 4° C., room temperature (22-25° C.), 30° C., 37° C., 42° C., or 52° C.

In some embodiments, a sample is contacted with an enzymatic permeabilization reagent. Enzymatic permeabilization reagents that permeabilize a sample by partially degrading extracellular matrix or surface proteins that hinder the permeation of the sample by assay reagents. Contact with an enzymatic permeabilization reagent can take place at any point after fixation and prior to target detection. In some instances the enzymatic permeabilization reagent is proteinase K, a commercially available enzyme. In such cases, the sample is contacted with proteinase K prior to contact with a post-fixation reagent. Proteinase K treatment (i.e., contact by proteinase K; also commonly referred to as "proteinase K digestion") can be performed over a range of times at a range of temperatures, over a range of enzyme concentrations that are empirically determined for each cell type or tissue type under investigation. For example, a sample can be contacted by proteinase K for 30 or less minutes, 25 or less minutes, 20 or less minutes, 15 or less minutes, 10 or less minutes, 5 or less minutes, or 2 or less minutes. A sample can be contacted by 1 μg/ml or less, 2 μg/m or less, 4 μg/ml or less, 8 μg/ml or less, 10 μg/ml or less, 20 μg/ml or less, 30 μg/ml or less, 50 μg/ml or less, or 100 μg/ml or less proteinase K. A sample can be contacted by proteinase K at a temperature ranging from 2° C. to 55° C., where specific ranges of interest include, but are not limited to: 50 to 54° C., 40 to 44° C., 35 to 39° C., 28 to 32° C., 20 to 26° C., and 0 to 6° C. In some instances a sample can be contacted by proteinase K at a temperature of 4° C., room temperature (22-25° C.), 30° C., 37° C., 42° C., or 52° C. In some embodiments, a sample is not contacted with an enzymatic permeabilization reagent. In some embodiments, a sample is not contacted with proteinase K. Contact of an intact tissue with at least a fixation reagent and a permeabilization reagent results in the production of a fixed and permeabilized tissue.

Ligase

In some embodiments, the methods disclosed include adding ligase to ligate the second oligonucleotide and generate a closed nucleic acid circle. In some embodiments, the adding ligase includes adding DNA ligase. In alternative embodiments, the second oligonucleotide is provided as a closed nucleic acid circle, and the step of adding ligase is omitted. In certain embodiments, ligase is an enzyme that facilitates the sequencing of a target nucleic acid molecule.

The term "ligase" as used herein refers to an enzyme that is commonly used to join polynucleotides together or to join the ends of a single polynucleotide. Ligases include ATP-dependent double-strand polynucleotide ligases, NAD-i-dependent double-strand DNA or RNA ligases and single-strand polynucleotide ligases, for example any of the ligases described in EC 6.5.1.1 (ATP-dependent ligases), EC 6.5.1.2 (NAD+-dependent ligases), EC 6.5.1.3 (RNA ligases). Specific examples of ligases include bacterial ligases such as *E. coli* DNA ligase and Taq DNA ligase, Ampligase® thermostable DNA ligase (Epicentre® Technologies Corp., part of Illumina®, Madison, Wis.) and phage ligases such as T3 DNA ligase, T4 DNA ligase and T7 DNA ligase and mutants thereof.

Rolling Circle Amplification

In some embodiments, the methods of the invention include the step of performing rolling circle amplification in the presence of a nucleic acid molecule, wherein the performing includes using the second oligonucleotide as a template and the first oligonucleotide as a primer for a polymerase to form one or more amplicons. In such embodiments, a single-stranded, circular polynucleotide template is formed by ligation of the second nucleotide, which circular polynucleotide includes a region that is complementary to the first oligonucleotide. Upon addition of a DNA polymerase in the presence of appropriate dNTP precursors and other cofactors, the first oligonucleotide is elongated by replication of multiple copies of the template. This amplification product can be readily detected by binding to a detection probe. In some embodiments, the polymerase is preincubated without dNTPs to allow the polymerase to penetrate the sample uniformly before performing rolling circle amplification.

In some embodiments, only when a first oligonucleotide and second oligonucleotide hybridize to the same target nucleic acid molecule, the second oligonucleotide can be circularized and rolling-circle amplified to generate a cDNA nanoball (i.e., amplicon) containing multiple copies of the cDNA. The term "amplicon" refers to the amplified nucleic acid product of a PCR reaction or other nucleic acid amplification process. In some embodiments, amine-modified nucleotides are spiked into the rolling circle amplification reaction.

Techniques for rolling circle amplification are known in the art (see, e.g., Baner et al, Nucleic Acids Research, 26:5073-5078, 1998; Lizardi et al, Nature Genetics 19:226, 1998; Schweitzer et al. Proc. Natl Acad. Sci. USA 97:101 13-1 19, 2000; Faruqi et al, BMC Genomics 2:4, 2000; Nallur et al, Nucl. Acids Res. 29: el 18, 2001; Dean et al. Genome Res. 1 1:1095-1099, 2001; Schweitzer et al, Nature Biotech. 20:359-365, 2002; U.S. Pat. Nos. 6,054,274, 6,291, 187, 6,323,009, 6,344,329 and 6,368,801). In some embodiments the polymerase is phi29 DNA polymerase.

In certain aspects, the nucleic acid molecule includes an amine-modified nucleotide. In such embodiments, the amine-modified nucleotide includes an acrylic acid N-hydroxysuccinimide moiety modification. Examples of other amine-modified nucleotides include, but are not limited to, a 5-Aminoallyl-dUTP moiety modification, a 5-Propargylamino-dCTP moiety modification, a N6-6-Aminohexyl-dATP moiety modification, or a 7-Deaza-7-Propargylamino-dATP moiety modification.

Amplicon Embedding in a Tissue-Hydrogel Setting

In some embodiments, the methods disclosed include embedding one or more amplicons in the presence of hydrogel subunits to form one or more hydrogel-embedded amplicons. The hydrogel-tissue chemistry described includes covalently attaching nucleic acids to in situ synthesized hydrogel for tissue clearing, enzyme diffusion, and multiple-cycle sequencing while an existing hydrogel-tissue chemistry method cannot. In some embodiments, to enable amplicon embedding in the tissue-hydrogel setting, amine-modified nucleotides are spiked into the rolling circle amplification reaction, functionalized with an acrylamide moiety using acrylic acid N-hydroxysuccinimide esters, and copolymerized with acrylamide monomers to form a hydrogel.

As used herein, the terms "hydrogel" or "hydrogel network" mean a network of polymer chains that are water-insoluble, sometimes found as a colloidal gel in which water is the dispersion medium. In other words, hydrogels are a class of polymeric materials that can absorb large amounts of water without dissolving. Hydrogels can contain over 99% water and may include natural or synthetic polymers, or a combination thereof. Hydrogels also possess a degree of flexibility very similar to natural tissue, due to their significant water content. A detailed description of suitable hydrogels may be found in published U.S. patent application 20100055733, herein specifically incorporated by reference. As used herein, the terms "hydrogel subunits" or "hydrogel precursors" mean hydrophilic monomers, prepolymers, or polymers that can be crosslinked, or "polymerized", to form a three-dimensional (3D) hydrogel network. Without being bound by any scientific theory, it is believed that this fixation of the biological specimen in the presence of hydrogel subunits crosslinks the components of the specimen to the hydrogel subunits, thereby securing molecular components in place, preserving the tissue architecture and cell morphology.

In some embodiments, the embedding includes copolymerizing the one or more amplicons with acrylamide. As used herein, the term "copolymer" describes a polymer which contains more than one type of subunit. The term encompasses polymer which include two, three, four, five, or six types of subunits.

In certain aspects, the embedding includes clearing the one or more hydrogel-embedded amplicons wherein the target nucleic acid is substantially retained in the one or more hydrogel-embedded amplicons. In such embodiments, the clearing includes substantially removing a plurality of cellular components from the one or more hydrogel-embedded amplicons. In some other embodiments, the clearing includes substantially removing lipids and/or proteins from the one or more hydrogel-embedded amplicons. As used herein, the term "substantially" means that the original amount present in the sample before clearing has been reduced by approximately 70% or more, such as by 75% or more, such as by 80% or more, such as by 85% or more, such as by 90% or more, such as by 95% or more, such as by 99% or more, such as by 100%.

In some embodiments, clearing the hydrogel-embedded amplicons includes performing electrophoresis on the specimen. In some embodiments, the amplicons are electrophoresed using a buffer solution that includes an ionic surfactant. In some embodiments, the ionic surfactant is sodium dodecyl sulfate (SDS). In some embodiments, the specimen is electrophoresed using a voltage ranging from about 10 to about 60 volts. In some embodiments, the specimen is electrophoresed for a period of time ranging from about 15 minutes up to about 10 days. In some embodiments, the methods further involve incubating the cleared specimen in a mounting medium that has a refractive index that matches that of the cleared tissue. In some embodiments, the mounting medium increases the optical clarity of the specimen. In some embodiments, the mounting medium includes glycerol.

Cells

Methods disclosed herein include a method for in situ gene sequencing of a target nucleic acid in a cell in an intact tissue. In certain embodiments, the cell is present in a population of cells. In certain other embodiments, the population of cells includes a plurality of cell types including, but not limited to, excitatory neurons, inhibitory neurons, and non-neuronal cells. Cells for use in the assays of the invention can be an organism, a single cell type derived from an organism, or can be a mixture of cell types. Included are naturally occurring cells and cell populations, genetically engineered cell lines, cells derived from transgenic animals, etc. Virtually any cell type and size can be accommodated. Suitable cells include bacterial, fungal, plant and animal cells. In one embodiment of the invention, the cells are mammalian cells, e.g. complex cell populations such as naturally occurring tissues, for example blood, liver, pancreas, neural tissue, bone marrow, skin, and the like. Some tissues may be disrupted into a monodisperse suspension. Alternatively, the cells may be a cultured population, e.g. a culture derived from a complex population, a culture derived from a single cell type where the cells have differentiated into multiple lineages, or where the cells are responding differentially to stimulus, and the like.

Cell types that can find use in the subject invention include stem and progenitor cells, e.g. embryonic stem cells, hematopoietic stem cells, mesenchymal stem cells, neural crest cells, etc., endothelial cells, muscle cells, myocardial, smooth and skeletal muscle cells, mesenchymal cells, epithelial cells; hematopoietic cells, such as lymphocytes, including T-cells, such as Th1 T cells, Th2 T cells, ThO T cells, cytotoxic T cells; B cells, pre-B cells, etc.; monocytes; dendritic cells; neutrophils; and macrophages; natural killer cells; mast cells, etc.; adipocytes, cells involved with particular organs, such as thymus, endocrine glands, pancreas, brain, such as neurons, glia, astrocytes, dendrocytes, etc. and genetically modified cells thereof. Hematopoietic cells may be associated with inflammatory processes, autoimmune diseases, etc., endothelial cells, smooth muscle cells, myocardial cells, etc. may be associated with cardiovascular diseases; almost any type of cell may be associated with neoplasias, such as sarcomas, carcinomas and lymphomas; liver diseases with hepatic cells; kidney diseases with kidney cells; etc.

The cells may also be transformed or neoplastic cells of different types, e.g. carcinomas of different cell origins, lymphomas of different cell types, etc. The American Type Culture Collection (Manassas, VA) has collected and makes available over 4,000 cell lines from over 150 different species, over 950 cancer cell lines including 700 human cancer cell lines. The National Cancer Institute has compiled clinical, biochemical and molecular data from a large panel of human tumor cell lines, these are available from ATCC or the NCI (Phelps et al. (1996) Journal of Cellular Biochemistry Supplement 24:32-91). Included are different cell lines derived spontaneously, or selected for desired growth or response characteristics from an individual cell line; and may include multiple cell lines derived from a similar tumor type but from distinct patients or sites.

Cells may be non-adherent, e.g. blood cells including monocytes, T cells, B-cells; tumor cells, etc., or adherent cells, e.g. epithelial cells, endothelial cells, neural cells, etc. In order to profile adherent cells, they may be dissociated from the substrate that they are adhered to, and from other cells, in a manner that maintains their ability to recognize and bind to probe molecules.

Such cells can be acquired from an individual using, e.g., a draw, a lavage, a wash, surgical dissection etc., from a variety of tissues, e.g., blood, marrow, a solid tissue (e.g., a solid tumor), ascites, by a variety of techniques that are known in the art. Cells may be obtained from fixed or unfixed, fresh or frozen, whole or disaggregated samples. Disaggregation of tissue may occur either mechanically or enzymatically using known techniques.

EXAMPLES OF NON-LIMITING ASPECTS OF THE DISCLOSURE

Aspects, including embodiments, of the present subject matter described above may be beneficial alone or in combination, with one or more other aspects or embodiments. Without limiting the foregoing description, certain non-limiting aspects of the disclosure numbered 1-34 are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below:

1. A sequencing device comprising:

(a) an illumination and detection module comprising a spinning disk confocal component comprising a plurality of laser lines for illumination with flat illumination correction, wherein the plurality of laser lines are used to illuminate a sample with excitation light at one or more wavelengths, a bandpass emission filter, a long-pass image splitter, a first camera that detects fluorescence emissions in a first wavelength range and a second camera that detects fluorescence emissions in a second wavelength range, wherein the first camera and the second camera can detect emissions simultaneously;

(b) a microscope module comprising a motorized stage capable of multi-axis positioning along x, y, and z axes, an objective Z drive, an objective turret wheel comprising multiple objectives, wherein each objective provides a different magnification, wherein one or more objectives are immersion objectives, wherein each immersion objective has an objective immersion collar, and optics, wherein the optics route light from the objectives to the illumination and detection module;

(c) an automated immersion media module comprising i) a container comprising immersion media, ii) fluidic lines coupled to the container and to the objective immersion collars of the immersion objectives of the microscope module, wherein the fluidic lines carry immersion media to and from the objective immersion collars, wherein the immersion collars capture excess immersion media, and iii) a series of pumps connected to the fluidic lines and to a microcontroller, wherein the microcontroller controls the pumps addition and removal of the immersion media through the fluidic lines, wherein the automated immersion media module provides controlled volumes of the immersion media to the objective immersion collars at the tops of the immersion objectives during imaging;

(d) a multi-well plate, wherein the motorized stage can be moved to position a well of the multi-well plate under the objective used for imaging;

(e) a fluidic coupling tower, wherein the fluidic coupling tower is on top of the motorized stage and positions the fluidic lines in wells of the multi-well plate;

(f) a fluidic management module comprising a symmetrical rotary valve comprising a rotary valve mechanism, a pump, wherein the pump is connected to the fluidic lines, and bubble detectors, wherein the bubble detectors are positioned on either side of the fluidic lines leading to the pump, wherein the fluidic management module allows unidirectional or bidirectional movement of reagents, buffers, and waste through the fluidic lines;

(g) a reagent, buffer, and waste module comprising a i) sliding tray, wherein reagent cartridges and buffer cartridges can be positioned in the sliding tray and coupled to the fluidic management module, ii) a waste module comprising a waste container, wherein the waste container is coupled to a fluidic line from the fluid management pump, and iii) a capping mechanism, wherein the capping mechanism closes the waste container when the waste container is removed from the system for waste disposal and opens the waste container when the waste container is placed back into the system;

(h) an electrical module comprising: i) a first firmware board controlling media dispensing from the automated immersion media module and ii) a second firmware board controlling the fluid management module and the reagent, buffer, and waste module, wherein the electrical module regulates power to the other modules of the system; and (i) a processor programmed to provide a user interface and operate the modules of the sequencing device.

2. The sequencing device of aspect 1, wherein the plurality of laser lines comprises at least 5 laser lines.

3. The sequencing device of aspect 2, wherein the bandpass emission filter is a penta-bandpass emission filter.

4. The sequencing device of any one of aspects 1-3, wherein the motorized stage has a piezo z-axis.

5. The sequencing device of any one of aspects 1-4, wherein the immersion media is water.

6. The sequencing device of any one of aspects 1-5, wherein the immersion media is filtered and bubble-free.

7. The sequencing device of any one of aspects 1-6, further comprising an O-ring and a shrink-wrapped coating over each objective.

8. The sequencing device of any one of aspects 1-7, further comprising a pressure monitor to monitor pressure in the fluidic lines, wherein increases in pressure in a fluidic line can be used to detect a potential blockage of the fluidic line.

9. The sequencing device of any one of aspects 1-8, further comprising a plurality of light-emitting diodes (LEDs), wherein each LED can emit light to provide a status indication for the system.

10. The sequencing device of any one of aspects 1-9, further comprising a display component for displaying information and providing a user interface.

11. The sequencing device of any one of aspects 1-10, wherein the processor is further programmed to perform steps comprising:

(a) locating a selected sample in the multi-well plate;

(b) detecting a signal in the XY plane from the selected sample at low magnification using widefield imaging mode acquisition with camera binning;

(c) using the signal to segment an XY bounding box around the sample;

(d) imaging the sample within the XY bounding box to produce an image, wherein imaging is performed in confocal imaging mode in Z at higher magnification than used in step (b) with camera binning in order to determine the approximate Z extent of the sample, wherein a single Z plane is collected through the midpoint of the Z extent previously determined and across the XY extent;

(e) displaying the image produced in step (d);

(f) providing an interface for a user to select a desired XY region of interest in the sample to be further imaged during sequencing of the selected sample;

(g) imaging the sample in the selected XY region of interest across the previously sampled Z extents;

(h) calculating a volume of the region of interest in the sample and displaying the calculated sample volume of the region of interest to the user;

(i) segmenting the image of the sample in the region of interest along the Z extents;

(j) providing an interface to the user for the user to adjust the Z extents of the sample volume before beginning sequencing, wherein the imaging extents derived from the region of interest defined by the user are automatically converted into appropriate montaged fields of view for a given imaging objective and to adjust microscope stage positions, objective Z positioning, and piezo bounds for imaging of the region of interest along XYZ axes during sequencing; and (k) reiterating steps (a)-(j) to define regions of interest for each sample in the multi-well plate that the user intends to sequence.

12. The sequencing device of any one of aspects 1-11, wherein the processor is further programmed to perform steps comprising:

providing an interface to the user for the user to select one or more samples for sequencing and a sequencing protocol, wherein the user is limited in how many samples can be selected depending on amounts of buffer and reagents that are available and the selected sequencing protocol;

providing constraints on total sequencing time, total data acquired, rate of acquisition, and maximum total volume of regions of interest across all samples that are to be sequenced and imaged, and suggesting protocols that maximize sequencing of desired regions of interest in samples within the constraints.

13. The sequencing device of any one of aspects 1-12, wherein the processor is further programmed to optimize sample sequencing parallelization depending on number of samples to be sequenced and imaging types to be used in sequencing.

14. The sequencing device of any one of aspects 1-13, wherein the processor is further programmed to perform steps comprising:

performing a rapid confocal sweep in Z at a starting XY position of a given sample montage to determine a Z profile of the sample at the starting XY position;

determining the sample top and bottom interface using a segmentation method; and setting the objective Z position at a fixed distance from the interface at the beginning of the sample montage, wherein drift in Z of the sample relative to the stage and the objective across rounds is reduced to below a selected tolerance to facilitate downstream sub-pixel registration across rounds during post-acquisition processing.

15. The sequencing device of any one of aspects 1-14, wherein the sequencing is in situ sequencing of a target nucleic acid in a tissue sample.

16. The sequencing device of aspect 15, wherein the tissue sample is a tissue slice having a thickness of 20 μm to 200 μm.

17. The sequencing device of any one of aspects 1-16, wherein the in situ sequencing is sequential or combinatorial in situ sequencing.

18. The sequencing device of anyone of aspects 1-17, wherein the microscope module comprises an epifluorescent microscope, a confocal microscope, a structured illumination microscope, or a light sheet or oblique-plane light sheet microscope.

19. The sequencing device of aspect 18, wherein the confocal microscope is a spinning disk or point scanning confocal microscope.

20. A method of using the sequencing device of any one of aspects 1-19, the method comprising:

loading samples into the multi-well plate;

selecting which samples in the multi-well plate are sequenced;

selecting a sequencing protocol; and sequencing nucleic acids in the selected samples using the sequencing device of any one of aspects 1-19.

21. The method of aspect 20, wherein the sequencing is in situ volumetric sequencing of tissue samples.

22. The method of aspect 20 or 21, wherein the tissue samples are tissue slices having a thickness of 20-200 μm.
23. The method of any one of aspects 20-22, wherein the in situ sequencing is sequential or combinatorial in situ sequencing.
24. A computer implemented method, the computer performing steps comprising:
(a) locating a selected sample in the multi-well plate;
(b) detecting a signal in the XY plane from the selected sample at low magnification using widefield imaging mode acquisition with camera binning;
(c) using the signal to segment an XY bounding box around the sample;
(d) imaging the sample within the XY bounding box to produce an image, wherein imaging is performed in confocal imaging mode in Z at higher magnification than used in step (b) with camera binning in order to determine the approximate Z extent of the sample, wherein a single Z plane is collected through the midpoint of the Z extent previously determined and across the XY extent;
(e) displaying the image produced in step (d);
(f) providing an interface for a user to select a desired XY region of interest in the sample to be further imaged during sequencing of the selected sample;
(g) imaging the sample in the selected XY region of interest across the previously sampled Z extents;
(h) calculating a sample volume of the region of interest and displaying the calculated sample volume of the region of interest to the user;
(i) segmenting the image of the sample in the region of interest along Z extents;
(j) providing an interface to the user for the user to adjust the Z extents of the sample volume before beginning sequencing, wherein the imaging extents derived from the region of interest defined by the user are automatically converted into appropriate montaged fields of view for a given imaging objective and to adjust microscope stage positions, objective Z positioning, and piezo bounds for imaging of the region of interest along XYZ axes during sequencing; and
(k) reiterating steps (a)-(j) to define regions of interest for each sample in the multi-well plate that the user intends to sequence.
25. A non-transitory computer-readable medium comprising program instructions that, when executed by a processor in a computer, causes the processor to perform the method of aspect 24.
26. A computer implemented method, the computer performing steps comprising:
providing an interface to the user for the user to select one or more samples for sequencing and a sequencing protocol, wherein the user is limited in how many samples can be selected depending on amounts of buffer and reagents available and the selected sequencing protocol;
providing constraints on total sequencing time, total data acquired, rate of acquisition, and maximum total volume of regions of interest across all samples that are to be sequenced and imaged, and
suggesting protocols that maximize sequencing of desired regions of interest in samples within the constraints.
27. The computer implemented method of aspect 26, wherein the computer is further programmed to optimize sample sequencing parallelization depending on number of samples to be sequenced and imaging types to be used in sequencing.
28. A non-transitory computer-readable medium comprising program instructions that, when executed by a processor in a computer, causes the processor to perform the method of aspect 26 or 27.
29. A computer implemented method, the computer performing steps comprising:
performing a rapid confocal sweep in Z at a starting XY position of a given sample montage to determine a Z profile of the sample at the starting XY position;
determining the sample top and bottom interface using a segmentation method; and
setting the objective Z position at a fixed distance from the interface at the beginning of the sample montage, wherein drift in Z of the sample relative to the stage and the objective across rounds is reduced to below a selected tolerance to facilitate downstream subpixel registration across rounds during post-acquisition processing.
30. A non-transitory computer-readable medium comprising program instructions that, when executed by a processor in a computer, causes the processor to perform the method of aspect 29.
31. An automated immersion media module comprising:
(a) a container comprising immersion media;
(b) fluidic lines coupled to the container and to the objective immersion collars of the objectives of the microscope module, wherein the fluidic lines carry immersion media to and from an objective immersion collar on an immersion objective, wherein the immersion collar captures excess immersion media; and
(c) a series of pumps connected to the fluidic lines and to a microcontroller, wherein the microcontroller controls the pumps addition and removal of the immersion media through the fluidic lines, wherein the automated immersion media module provides controlled volumes of the immersion media to the objective immersion collars at the tops of the objectives during imaging.
32. A method of using the automated immersion media module of aspect 31, the method comprising using the automated immersion media module of aspect 31 to deliver immersion media to an objective immersion collar attached to an immersion objective of a microscope.
33. A fluidic management module comprising a symmetrical rotary valve comprising a rotary valve mechanism, a pump, wherein the pump is connected to the fluidic lines, and bubble detectors, wherein the bubble detectors are positioned on either side of the fluidic lines leading to the pump, wherein the fluidic management module allows bidirectional or unidirectional movement of reagents, buffers, and waste through the fluidic lines.
34. A reagent, buffer, and waste module comprising:
(a) a sliding tray, wherein reagent cartridges and buffer cartridges can be positioned in the sliding tray and coupled to the fluidic management module;
(b) a waste module comprising a waste container, wherein the waste container is coupled to a fluidic line from the fluid management pump; and
(c) a capping mechanism, wherein the capping mechanism closes the waste container when the waste container is removed from the system for waste disposal and opens the waste container when the waste container is placed back into the system.

EXPERIMENTAL

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

All publications and patent applications cited in this specification are herein incorporated by reference as if each individual publication or patent application were specifically and individually indicated to be incorporated by reference.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. For example, due to codon redundancy, changes can be made in the underlying DNA sequence without affecting the protein sequence. Moreover, due to biological functional equivalency considerations, changes can be made in protein structure without affecting the biological action in kind or amount. All such modifications are intended to be included within the scope of the appended claims.

Example 1

Volumetric Next-Generation In Situ Sequencer

Overview

1. Integrated fluidics and rapid confocal platform and up to 5 channel imaging
2. Automated immersion media module
   Routines for robust bubble prevention
3. Sample/fluidic coupling tower
4. Custom waste container
5. Sequencer software
   a. GUI
   b. Rapid sample find algorithms (general for 3D sequencing samples)
   c. Sequencing time, parallelism, reagent consumption, and disk space joint optimization (general for 3D sequencing samples)
   d. Closed-loop detection of sample interface and xyz position for minimal drift of data across multiple rounds.

Technical Description

Samples were sequenced on an automated, integrated fluidic and imaging platform capable of conducting multiple rounds of sequencing and imaging cycles on many samples in parallel. The sequencer has several key modules:

The illumination and detection module, integrating components from Andor Technologies, consists of a spinning disk confocal component, 5 laser line illumination, Borealis flat illumination correction, a penta-bandpass emission filter, a long-pass image splitter, and two detection cameras for simultaneous detection of emissions generated by short and long wavelength illumination.

The custom microscope module combines a motorized XYZ stage (with a piezo Z), objective Z drive, turret wheel, multiple objectives ranging low to high magnification, and optics routing light from the objectives to the illumination and detection module.

A novel automated immersion media module, which couples to objectives requiring immersion media between the objective and the coverglass, provides precisely controlled volumes of filtered, bubble-free media (such as water) to the tops of objectives, managing both inflow and outflow. This module enables sequencing in parallel of samples with a high-magnification immersion objective that otherwise would require manual addition of immersion media. The addition and removal of the immersion media is managed by a series of pumps and a microcontroller such that surface tension forces on the coverglass are minimized (minimize shifts in the Z dimension of the sample), bubbles are avoided, liquid overflow is prevented, and sufficient volume is present on the objective for prolonged imaging. This involves algorithmic coordination of the liquid flowrate, position of the objective in x, y, and z relative to the sample, liquid replacement steps to remove bubbles, and fluid replacement timing. For instance, after feeding a calibrated volume of immersion media (typically water) onto the objective through the collar, diagonal stage movements are performed that preclude bubble formation from occurring. The immersion collar captures excess immersion media, preventing media access to the objectives through multiple O-rings and a shrink-wrapped coating over the objectives. Fluidic lines bringing immersion media to and from the objective immersion collars are managed by a central tower that integrates into the objective turret.

A novel fluidic coupling tower placed on the XYZ stage positions fluidic lines into a multi-well sample plate. This coupler enables easy addition and removal of the sample from the microscope stage and mating of fluidic lines to the samples, while minimizing the structural load on the automated microscope stage (excess weight on the stage inhibits precise positioning and rapid movements). Beam breaks detect whether the sample is fully coupled into the system and structural elements prevent damage to the fluidic lines or harm to the user during operation.

The fluid management module allows bidirectional movement of reagents, buffers, and waste via a symmetrical rotary valve, pump, rotary valve mechanism. Pump movements are controlled and line pressures monitored by custom firmware. Liquids moving towards the pump are primed for precise volume movements via the use of bubble detectors on either side of the lines leading to the pump (before the rotary valves). Pressures in the lines are monitored for nominal fluid flow and to detect potential blockages of the lines.

The reagent, buffer, and waste module organizes the addition of sequencing reagents and buffers to the system and the removal of waste from the system. It consists of a sliding tray into which custom reagent and buffer cartridges are positioned and subsequently coupled to the fluidic management module in an automated fashion. The waste module receives an outflow line from the fluid management pump via a capping mechanism design that ensures that the waste container is closed when removed from the system for waste disposal, but open when placed back into the system.

An electrical module regulates power for the various components of the system. One firmware board controls the automated immersion media dispensers and a second firmware board controls the fluid management module and the reagent, buffer, and waste modules, in addition to LEDs displaying relevant status indications for the system.

A custom computer software program, including both backend and GUI modules, provides interface between a user and the sequencer firmware and hardware, including sequencing run set up, sequencing run options, sample region of interest (ROI) definition, the high level operations required for sequencing and imaging, high level control of the automated immersion system, parallelization of sequencing across samples, logging, error monitoring, data acquisition, management and transfer, and run progress monitoring. The computer software program contains several novel algorithms for run set up and for consistent imaging of sequencing rounds. An automated, 3D sample-find and ROI specification algorithm rapidly detects signal in the XY plane from a sample via low magnification, widefield imaging mode acquisition with maximal camera binning. This signal is used to segment an XY bounding box around the sample. Subsequently, this XY bound is rapidly sub-sampled in confocal imaging mode in Z, with higher magnification but maximal camera binning, in order to determine the approximate Z extent of the sample. A single Z plane is rapidly collected through the midpoint of the Z extents previously determined, across the XY extent, and displayed to the user. At this point, the user can select through an interface the desired XY ROI to be imaged during sequencing for a given sample. Subsequently, a more detailed acquisition of the XY ROI is acquired across the previously sampled Z extent. This volume is displayed to the user and is additionally used to segment in Z the sample extents in the given ROI. The user may more finely adjust the Z extent of the volume via the interface before sequencing begins. The imaging extents derived from this ROI definition are automatically converted into the appropriate montaged fields of view for a given imaging objective, and further into microscope stage positions, objective Z positioning, and piezo bounds for optimal imaging of the XYZ ROI during sequencing. Using this ROI definition algorithm affords rapid, semi-automatic ROI definition in 3D and minimizes the amount of user interaction (for example, arbitrary manual control and search of a well for a sample and montage definition and testing, which is excessively time consuming and difficult to an inexperienced user). This automated ROI procedure is performed for each sample well that the user intends to sequence.

A second algorithm guides the user in sequencing run set up to ensure optimal sample parallelism and sequencer time efficiency, while preventing collection of a prohibitive (to store or transfer) amount of data or use of more buffer and reagent than is available. This algorithm is essential for spatial sequencing approaches, especially volumetric ones, since users are interested in ROIs of varying XYZ extents across different sample types, and excess imaging volume beyond the ROI is irrelevant to the user. Moreover, a single sample acquisition can produce many terabytes of raw data, which need to be stored and/or transferred. Further, because a sequencing kit has a maximum capacity of buffer and reagent, the user is limited in how many samples can be defined for use, especially depending on the exact sequencing protocol and number of rounds that are required. Thus, an optimization algorithm is required that balances multiple sample sequencing time, buffer/reagent availability, sequencing protocols, total data collection and transfer capacity, and ROI extents in XYZ. The algorithm may place hard constraints on the total sequencing time (for example, three days), the total data acquired and rate of acquisition (related to available data transfer/offloading rate), maximum ROI budget across all samples, and maximum available buffer/reagents, while suggesting combinations of ROIs and sample protocols that pack the maximum amount of desired sequencing into these constraints. This optimization also involves a subroutine optimizer for sample sequencing parallelization, as different numbers of samples and imaging types may yield optimal parallelization solutions of varying time.

Another algorithm applied during sequencing of the sample obviates the need for so-called perfect focus system hardware, which utilize angled infrared laser light reflected from the coverglass to find, in closed loop, a Z position set point. This algorithm uses a rapid confocal sweep in Z, at the starting XY position of a given sample montage, to determine the characteristic Z profile of the sample at that position. Segmentation methods are used to determine the sample top and bottom interface, and the objective Z position is set at a fixed distance from this interface at the beginning of a montage. This ensures that, even if there has been drift in Z of the sample relative to the stage and objective across rounds, that the sample Z drift is reduced to below some tolerance, facilitating downstream subpixel registration across rounds during post-acquisition processing. This algorithm is especially important in the absence of a perfect focus hardware system for combinatorial sequencing, in which the precise position of diffraction limited spots must be aligned across rounds, and is additionally important when the sample thickness is small, in which case drift in Z that may occur otherwise on any round is large relative to the total sample extent in Z, resulting in a larger percentage of data loss on each round at the edges of the sample extents. Such an algorithm may also be performed for alignment in XY, though due to the aspect ratio of acquisitions, the percentage of data loss from unanticipated sample movement in XY is generally minimal.

What is claimed is:

1. A method comprising:

(a) providing an objective immersion collar fluidically coupled to a fluid delivery line, wherein said objective immersion collar is coupled to an optical immersion lens, wherein said fluid delivery line is coupled to a bubble detector;

(b) dispensing a controlled volume of immersion fluid to said objective immersion collar via said fluid delivery line and said bubble detector; and (c) automatically maintaining said controlled volume of said immersion fluid during imaging.

2. The method of claim 1, wherein said maintaining comprises coordination of a liquid flowrate and a fluid replacement timing.

3. The method of claim 2, wherein said coordination comprises controlling addition and removal of said immersion fluid through said fluid delivery line using a microcontroller.

4. The method of claim 2, wherein said maintaining comprises use of a pressure monitor to monitor pressure in said fluid delivery line.

5. The method of claim 1, further comprising using said optical immersion lens to image at least a portion of biological sample.

6. The method of claim 1, wherein said objective immersion collar is configured to capture excess immersion fluid.

7. The method of claim 1, further comprising using a fluid removal line to remove said immersion fluid from said objective immersion collar.

8. The method of claim 7, wherein said fluid delivery line and said fluid removal line carry said immersion fluid to and from said objective immersion collar under control of a microcontroller.

9. An automated fluidic module for an optical immersion lens, comprising: a pump coupled to a fluid delivery line configured to dispense an immersion fluid into an immersion fluid collar disposed on said optical immersion lens, wherein said fluid delivery line is coupled to a bubble detector; and a processor configured to control said pump to dispense a controlled volume of said immersion fluid to said immersion fluid collar via said fluid delivery line and said bubble detector and automatically maintain said controlled volume during imaging.

10. The automated fluidic module of claim 9, wherein said immersion fluid comprises water.

11. The automated fluidic module of claim 9, wherein said immersion collar is configured to hold said immersion fluid on said optical immersion lens.

12. The automated fluidic module of claim 9, further comprising another optical immersion lens and another fluid delivery line configured to dispense said immersion fluid onto said another optical immersion lens.

13. The automated fluidic module of claim 12, wherein said automated fluidic module is configured to maintain said controlled volume of said immersion fluid on both said optical immersion lens and said another optical immersion lens.

14. The automated fluidic module of claim 9, wherein said automated fluidic module maintains said optical immersion lens under said immersion fluid without manual addition of said immersion fluid during said imaging.

15. The automated fluidic module of claim 9, further comprising an additional optical immersion lens coupled to an additional immersion fluid collar.

16. The automated fluidic module of claim 9, wherein said immersion fluid collar is configured to capture excess immersion fluid.

17. The automated fluidic module of claim 9, further comprising an additional pump configured to remove said immersion fluid from said immersion fluid collar.

* * * * *